(12) United States Patent
Rodriguez

(10) Patent No.: US 6,406,586 B1
(45) Date of Patent: *Jun. 18, 2002

(54) FASTENING METHOD AND STATIONERY ARTICLES PRODUCED THEREBY

(76) Inventor: Luis Joaquin Rodriguez, 60 Fourth St., South Orange, NJ (US) 07079-1851

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,534

(22) Filed: Aug. 4, 1998

Related U.S. Application Data

(63) Continuation-in-part of application No. 09/093,301, filed on Jun. 8, 1998, now abandoned, which is a continuation-in-part of application No. 08/986,394, filed on Dec. 8, 1997, now abandoned.

(51) Int. Cl.$^7$ .............................................. B32B 31/00

(52) U.S. Cl. ....................... 156/289; 156/227; 156/247; 156/249; 156/290; 156/291; 40/341; 229/80; 229/80.5

(58) Field of Search ................................. 156/227, 247, 156/249, 289, 290, 291; 229/80, 80.5; 400/622; 428/41.7, 41.8, 41.9; 429/264; 40/341, 702, 751, 768, 773

(56) References Cited

U.S. PATENT DOCUMENTS

| | | | | |
|---|---|---|---|---|
| 2,118,706 A | * | 5/1938 | Heywood |
| 2,367,440 A | * | 1/1945 | Schieman |
| 2,384,223 A | * | 9/1945 | Wilbur |
| 3,024,553 A | * | 3/1962 | Rowley |
| 3,740,879 A | * | 6/1973 | Patterson |
| 3,791,572 A | | 2/1974 | Gendron |
| 3,900,642 A | * | 8/1975 | Michel |
| 4,066,206 A | | 1/1978 | Peterson |
| 4,072,264 A | * | 2/1978 | Kranz |
| 4,168,196 A | | 9/1979 | Nemeth |
| 4,335,845 A | | 6/1982 | Dierks |
| 4,404,243 A | | 9/1983 | Terpay |
| 4,460,634 A | * | 7/1984 | Hasegawa |
| 4,478,384 A | | 10/1984 | Julseth |
| 4,545,517 A | | 10/1985 | Olson |
| 4,586,651 A | | 5/1986 | Bradley |
| 4,662,093 A | * | 5/1987 | Suttles et al. |
| 4,715,531 A | * | 12/1987 | Stewart et al. |
| 4,732,631 A | | 3/1988 | Shimizu |
| 4,738,391 A | * | 4/1988 | Wiseman |
| 4,768,810 A | | 9/1988 | Mertens |

FOREIGN PATENT DOCUMENTS

| EP | 0 468 256 | * | 1/1992 |
| WO | 90/11943 | * | 10/1990 |

OTHER PUBLICATIONS

Avery Dennison Technology. 201 1996–2000 [Online] [retreived on Jan. 11, 2001]Retrieved from the internet: <URL:http//www.averydennison.com/ad/corporate_$_o$info/tech.htm>.

Avery Dennison Technology. The basic self–adhesive product consists of four elements. ©1996–2000 [Online] [retrieved on Jan. 11, 2001]Retrieved from the Internet: <URL:http://www.averydennison.com/ad/corporate–info/tech1.htm>.

Avery Dennison Technology. Avery dennison'adhesive coating technology, is a highly controlled mix of process engineering and application of the material sciences. ©1996–2000 [Online] [Retrieved on Jan. 11, 2001]Retrieved from the internet: <http://www.averydennison.com/ad/corporate$_0$_info/tech2.htm>.

Avery Dennison Technology. Pressure–sensitive coated materials are converted into labels primarily for product identification and information management. ©1996–2000 [Online] [retrieved on Jan. 11, 2001] Retrieved from the internet: <http:/www.averydennison.com/ad/corporate–info/tech3.htm>.

MEAD. Press it–Seal it ®Self adhesive envelopes. (Package) Front panel. Product 75024®1997 The Mead Corportion, Dayton Ohio.

USPS (United States Postal Service). Product code 9840020, "Brigth Eyes Stamps". (Package) (Front panel) ©1998United States Postal Service.

(List continued on next page.)

*Primary Examiner*—Curtis Mayes

(57) ABSTRACT

This invention relates to a novel fastening method with multiple applications, and different stationery products derived therefrom. The method offers practical and economical solution to different problems and needs associated with many different fastening functions. This method is particularly useful and advantageous in the paper, cardboard and film products industries. The method eliminates the need to moisten coatings of adhesive, or the need to use removable release liners to protect the adhesive coatings on the articles that need to be fastened. The method further enables the creation of new products, to solve existing needs, as for instance, self sealing and self contained forms suitable for desktop and any other type of printers. In very broad terms, the method consists of applying layers of a fastener, such as a pressure sensitive adhesive (PSA) substance 202 and layers of a fastening inhibitor substance, such as a release substance 206 to the surfaces on planes 201 and 203 that need to be fastened, in such a manner that they can be in direct contact and remain unattached or be temporarily attached until a more permanent attachment is desired, which is usually achieved by positioning another surface, or surfaces free of any layers on plane 205 between them. Features of this method can be discretionarily expanded by the use of additional layers of adhesive or other fastener with different properties, as for example, lower strength pressure sensitive adhesive layers 204, that can be repositionable.

62 Claims, 50 Drawing Sheets

U.S. PATENT DOCUMENTS

| | | | |
|---|---|---|---|
| 4,793,758 A | * | 12/1988 | Hanson et al. |
| 4,884,826 A | | 12/1989 | Stagsvol |
| 4,903,844 A | * | 2/1990 | Oglesby |
| 4,915,288 A | | 4/1990 | Kao |
| 4,928,875 A | | 5/1990 | Hutchinson |
| 4,937,040 A | * | 6/1990 | Holcomb et al. |
| 5,041,072 A | * | 8/1991 | McClelland |
| 5,044,776 A | | 9/1991 | Schramer |
| 5,069,969 A | | 12/1991 | McClintock |
| 5,084,317 A | | 1/1992 | Epple |
| 5,087,238 A | | 2/1992 | Olson |
| 5,125,562 A | | 6/1992 | Bendel |
| 5,154,956 A | | 10/1992 | Fradrich |
| 5,176,939 A | | 1/1993 | Shepherd |
| 5,180,618 A | | 1/1993 | Kessler |
| 5,194,299 A | | 3/1993 | Fry |
| 5,202,169 A | | 4/1993 | Spendlove |
| 5,282,914 A | | 2/1994 | Spendlove |
| 5,292,468 A | | 3/1994 | Colombani |
| 5,362,106 A | | 11/1994 | Longtin |
| 5,398,867 A | | 3/1995 | Murphy |
| 5,429,576 A | * | 7/1995 | Doderer-Winkler |
| 5,474,229 A | * | 12/1995 | Shimazaki ............... 229/80 X |
| 5,499,757 A | | 3/1996 | Back |
| 5,502,912 A | | 4/1996 | Leboff |
| 5,505,376 A | | 4/1996 | Kent |
| 5,507,526 A | | 4/1996 | Petkovsek |
| 5,508,084 A | | 4/1996 | Reeves |
| 5,508,247 A | | 4/1996 | Tran |
| 5,524,929 A | | 6/1996 | Emmel |
| 5,553,774 A | | 9/1996 | Goodno |
| 5,558,913 A | | 9/1996 | Sasaki |
| 5,560,608 A | | 10/1996 | Silverschotz |
| 5,571,097 A | | 11/1996 | Seth |
| 5,573,277 A | | 11/1996 | Petkovseck |
| 5,575,574 A | * | 11/1996 | Mertens |
| 5,591,290 A | | 1/1997 | Walter |
| 5,616,385 A | | 4/1997 | Rothrum |
| 5,618,062 A | * | 4/1997 | Mertens et al. |
| 5,633,071 A | | 5/1997 | Murphy |
| 5,640,835 A | | 6/1997 | Muscoplat |
| 5,656,116 A | | 8/1997 | Soltysiak |
| 5,660,659 A | | 8/1997 | Caldwell |
| 5,664,725 A | | 9/1997 | Walz |
| 5,687,903 A | | 11/1997 | Akridge |
| 5,687,904 A | | 11/1997 | Potter |
| 5,691,026 A | | 11/1997 | Zinke |
| 5,691,437 A | | 11/1997 | Main |
| 5,700,340 A | | 12/1997 | Johnson |
| 5,711,477 A | | 1/1998 | Jenkins |
| 5,713,511 A | | 2/1998 | Diamond |
| 5,722,585 A | | 3/1998 | Redl |
| 5,738,274 A | | 4/1998 | Stude |
| 5,740,957 A | | 4/1998 | Wenkman |
| 5,743,462 A | | 4/1998 | Stone |
| 5,743,997 A | | 4/1998 | Podsialo |
| 5,766,385 A | | 6/1998 | Pollard |
| 5,782,496 A | | 7/1998 | Casper |
| 5,807,623 A | | 9/1998 | Chess |
| 5,811,183 A | | 9/1998 | Shaw |
| 5,874,142 A | | 2/1999 | Hoffman |
| 5,893,585 A | * | 4/1999 | Worthen |
| 5,918,394 A | * | 7/1999 | Babcock |
| 6,179,336 B1 | * | 1/2001 | Peterson |

OTHER PUBLICATIONS

USPS (United States Postal Service). Product code 9840020, "Bright Eyes Stamps". (Actual product) (Interior side).

Avery Dennison Corporation. Self–Seal Mailer (Package) Rear Panel. ©1997 Avery Dennison Corporation.

Avery Dennison Corporation. Self–Seal Mailers Formatting and Printing Tips (Booklet). Front p. (General Information). ©1997 Avery Dennison Corporation.

* cited by examiner

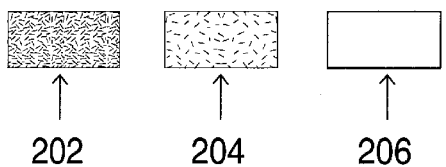
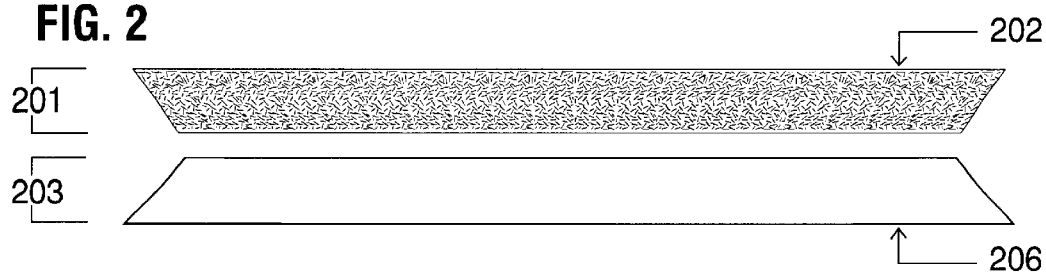
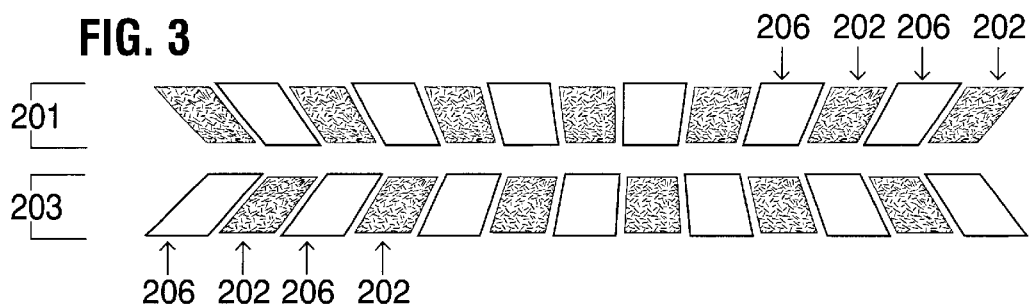
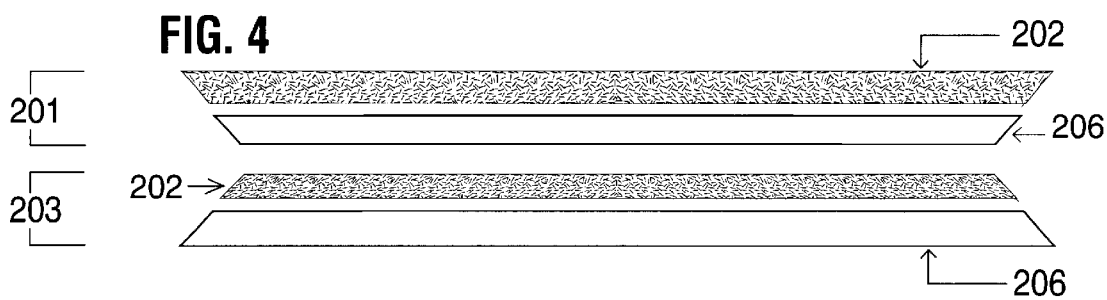
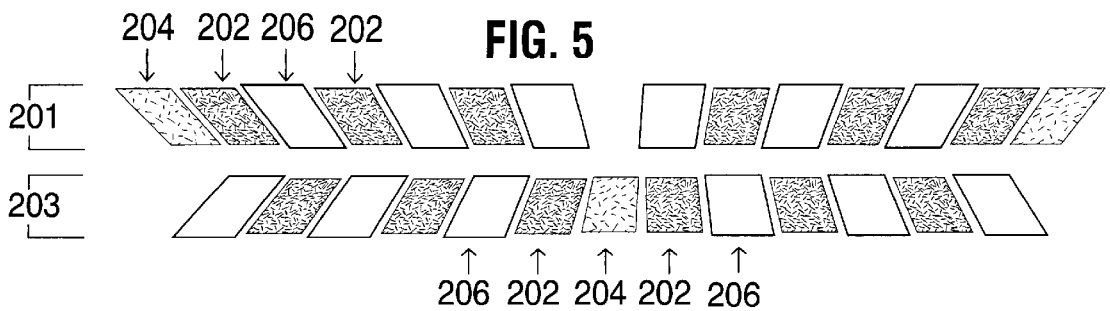

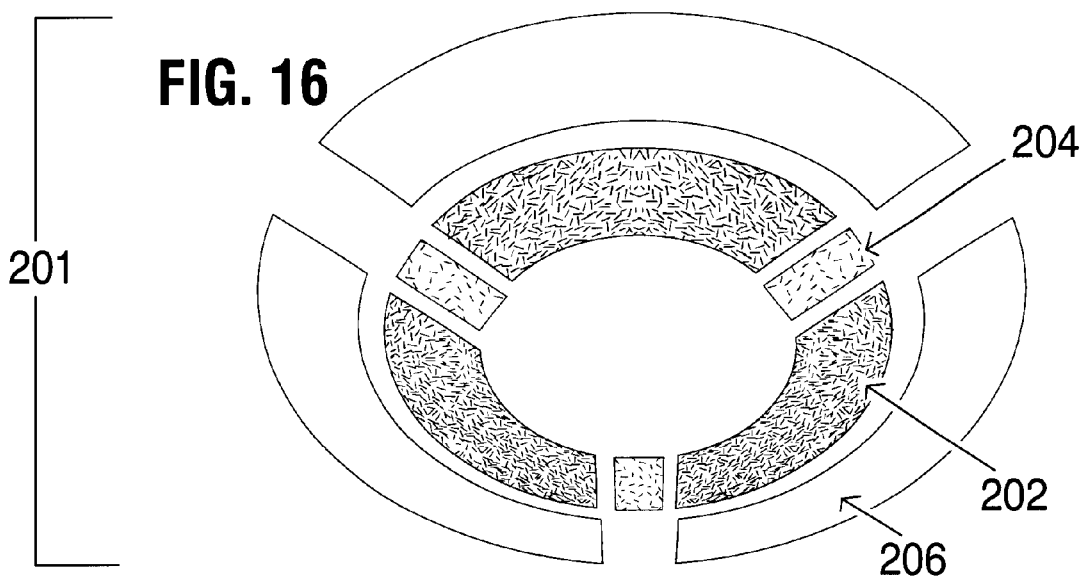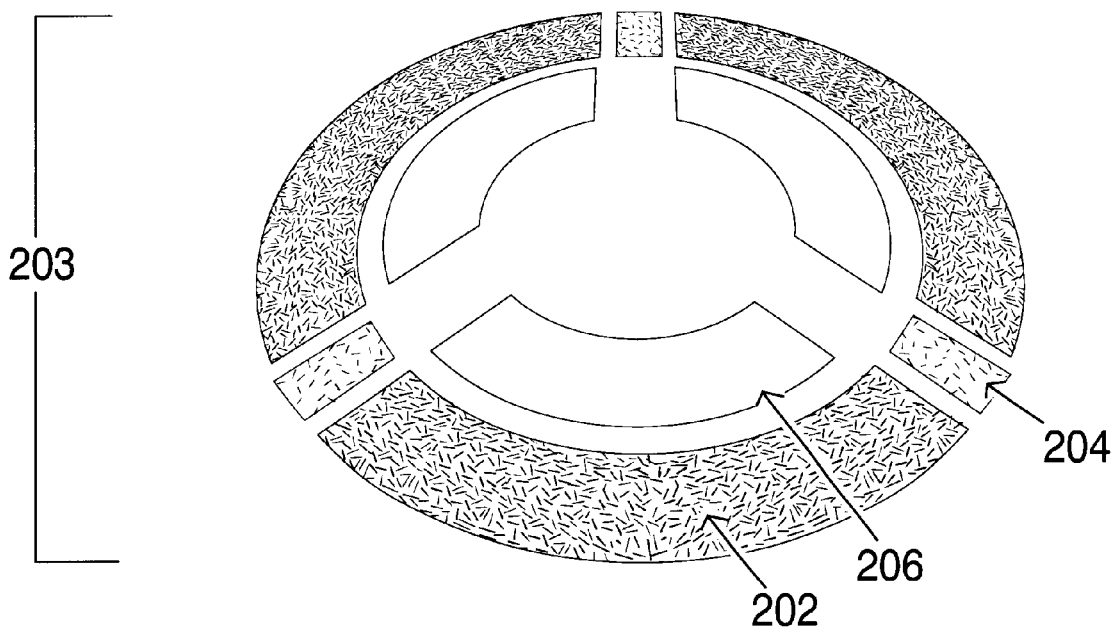
FIG. 16

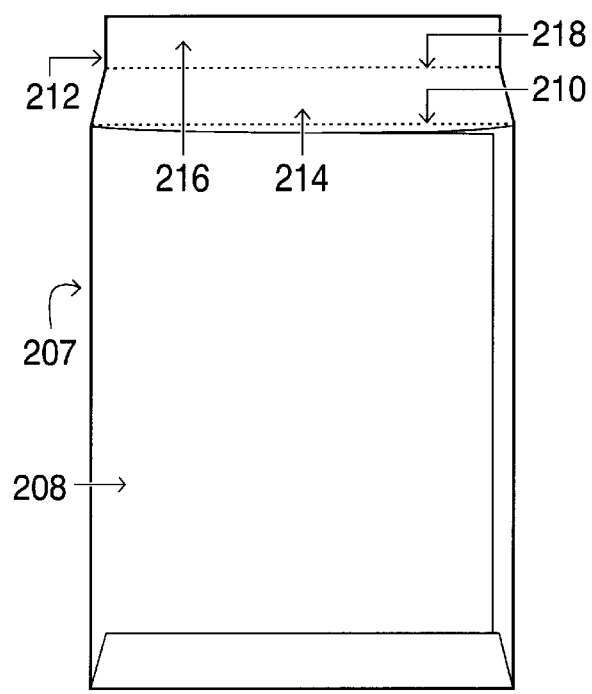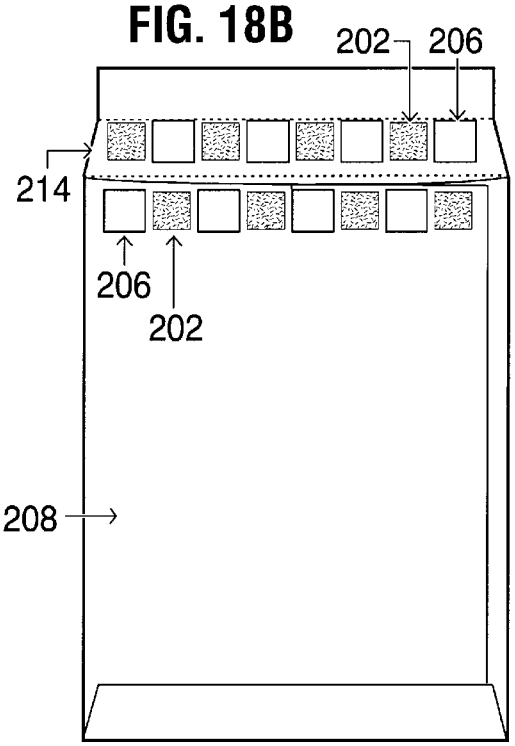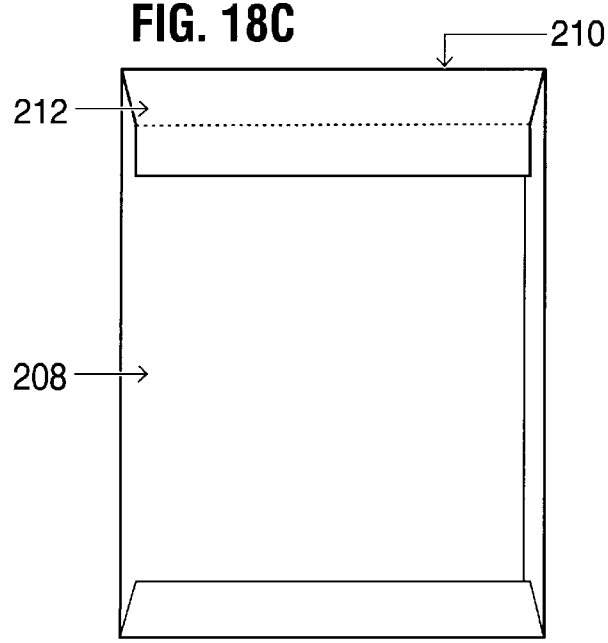

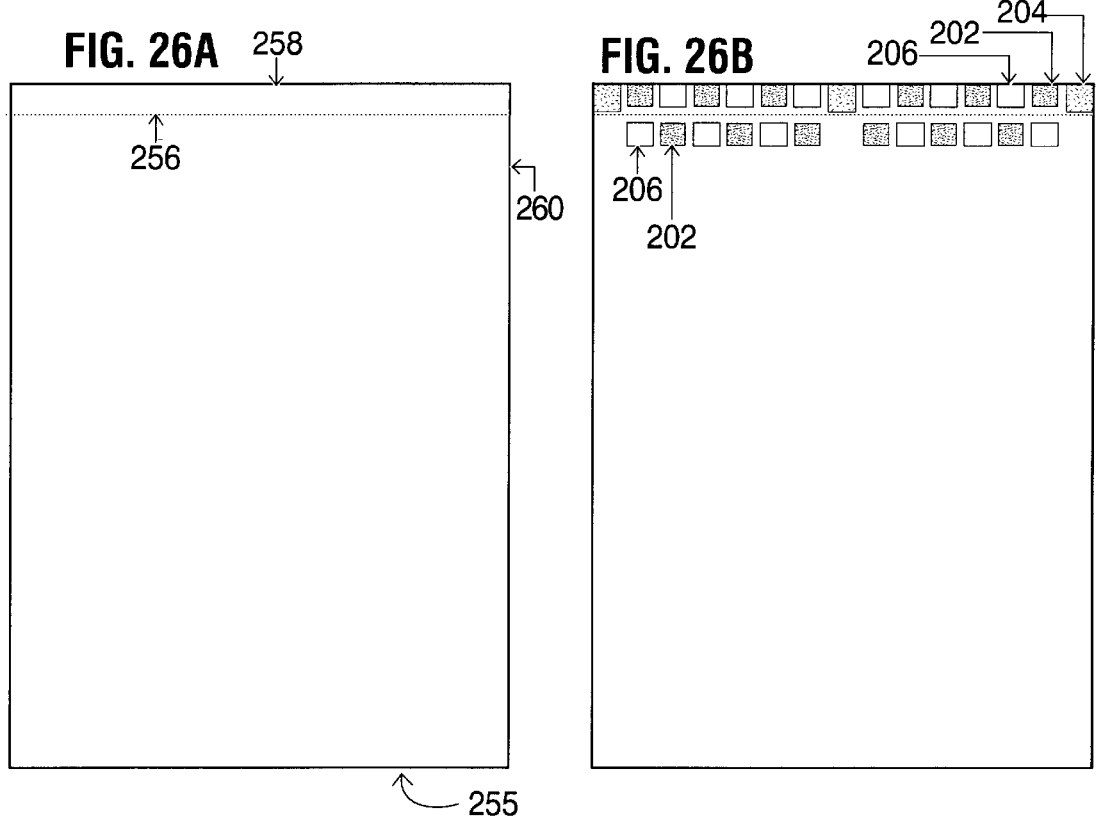
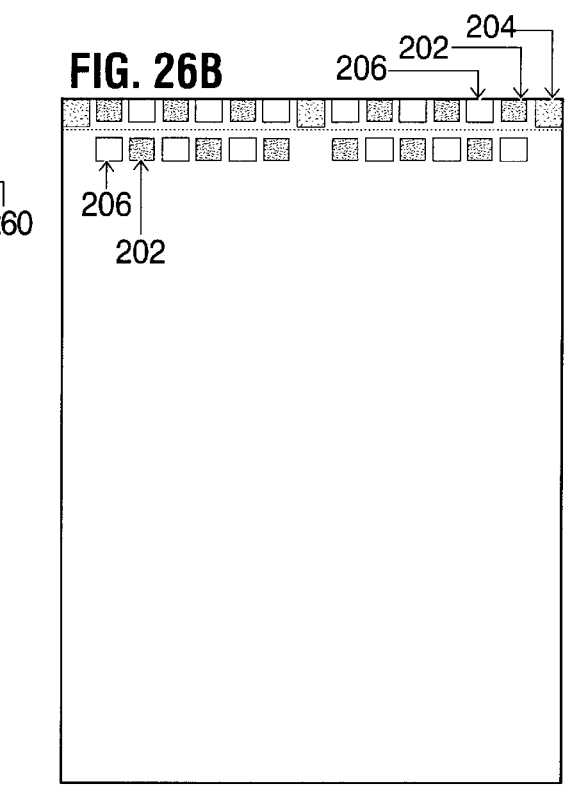
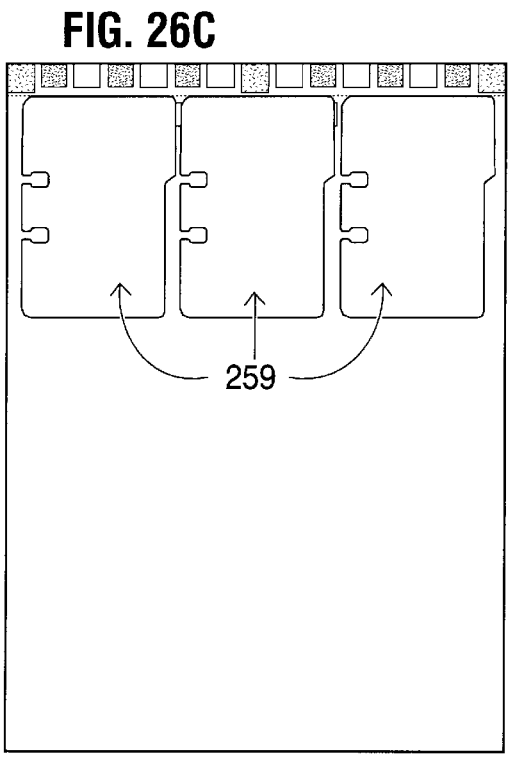
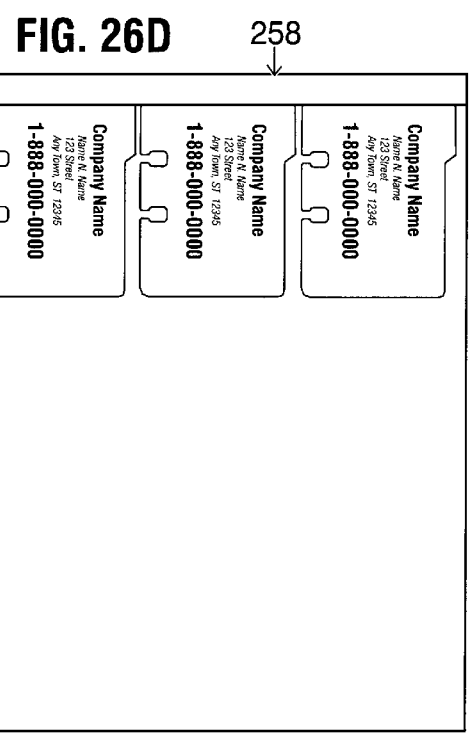

261

264, 266, 262, 264, 263, 202, 206

FIG. 31A
FIG. 31B
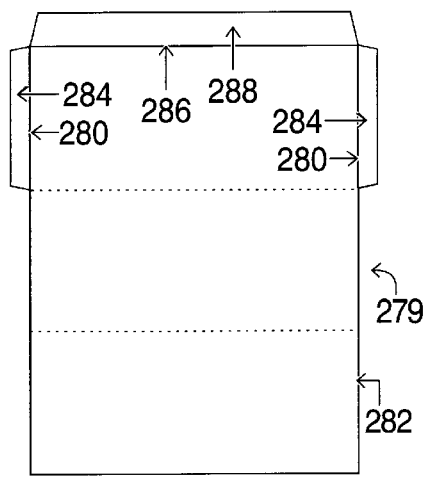
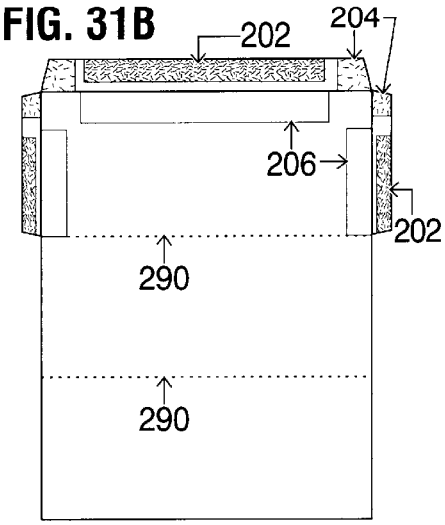
FIG. 31C
FIG. 31D
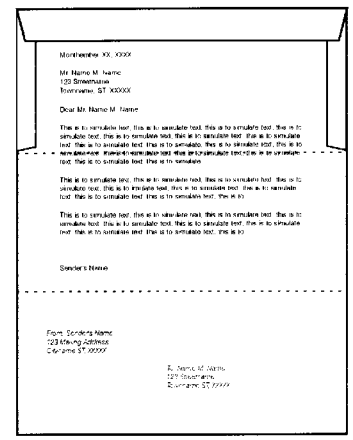
FIG. 31E
FIG. 31F
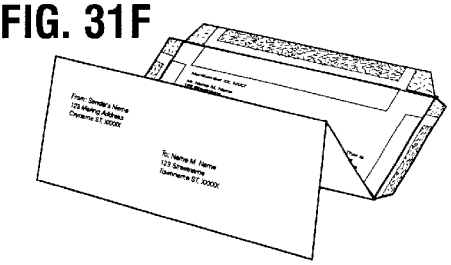
FIG. 31G
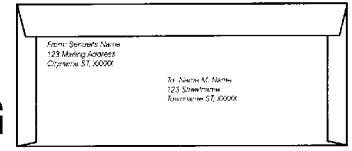

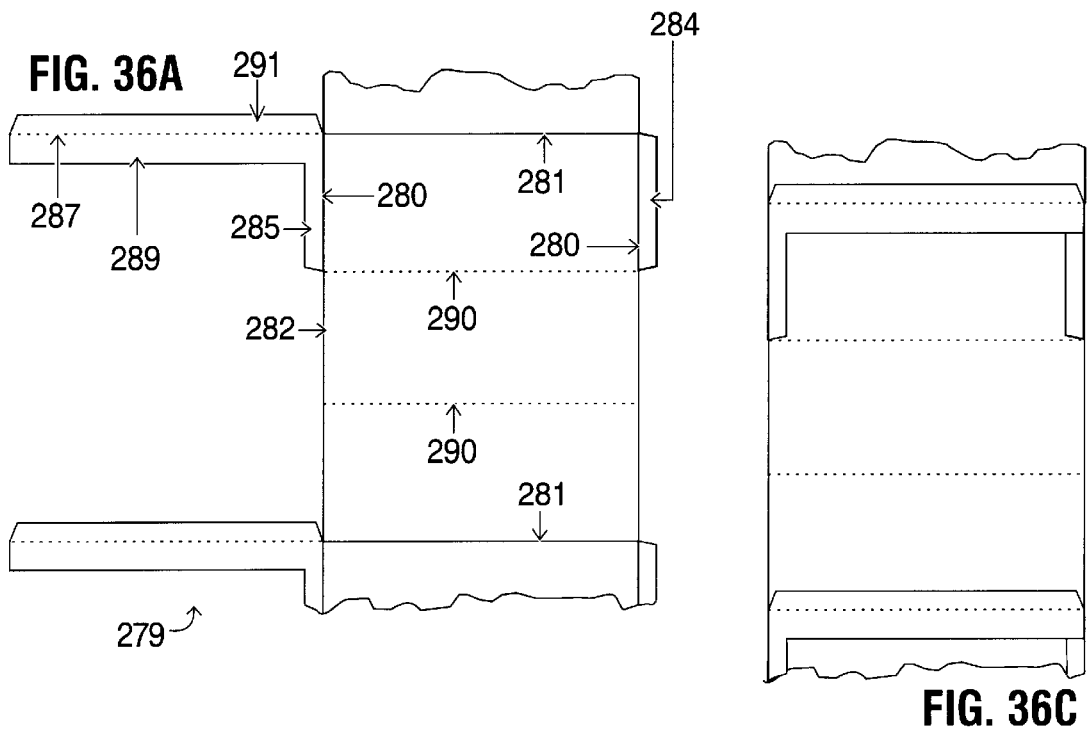
FIG. 36A
FIG. 36C
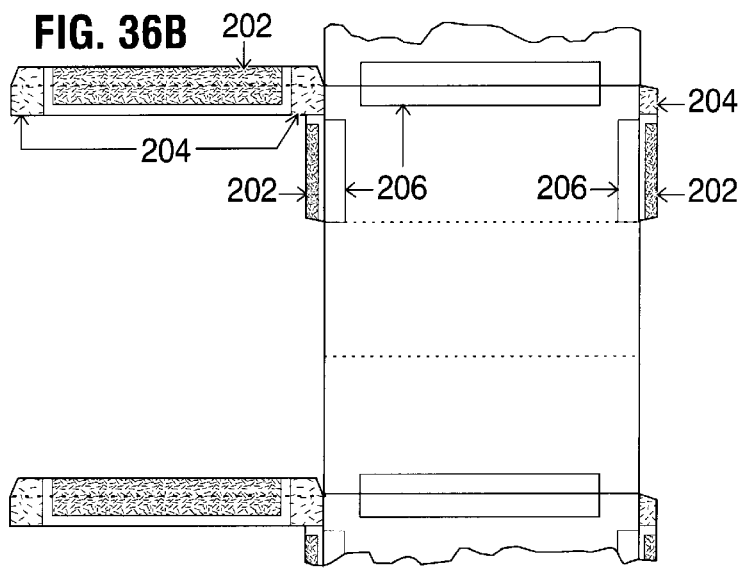
FIG. 36B
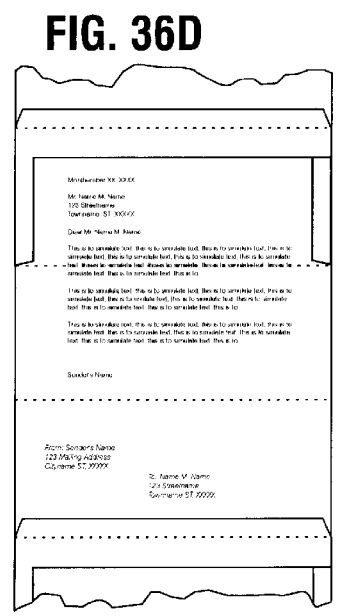
FIG. 36D

FIG. 38A
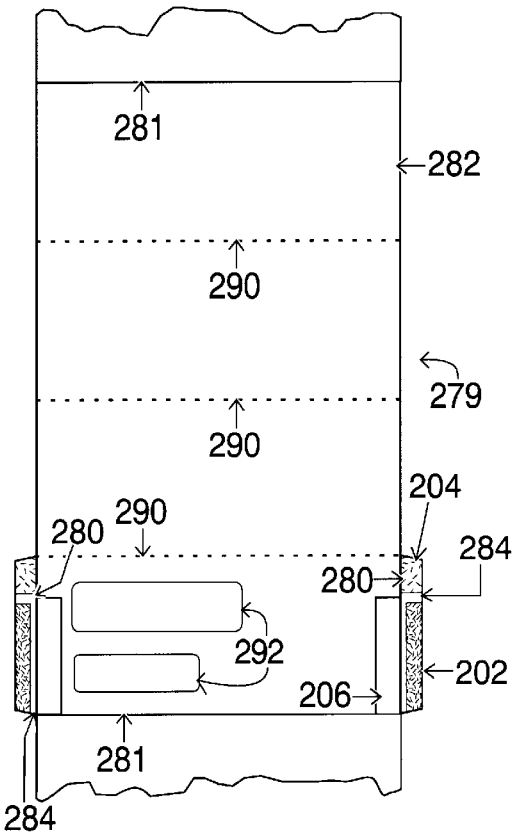
FIG. 38B
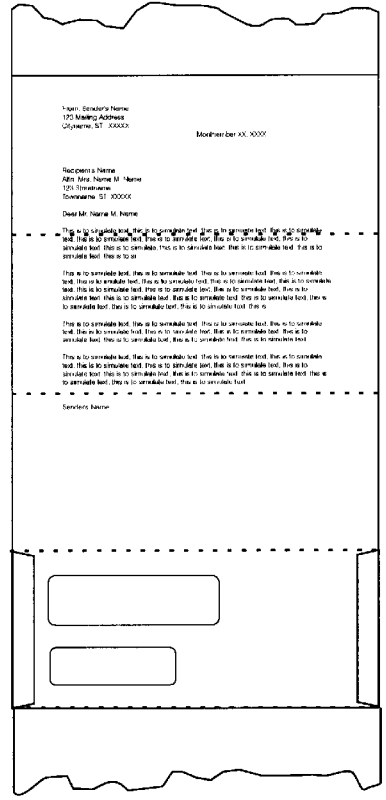
FIG. 38C
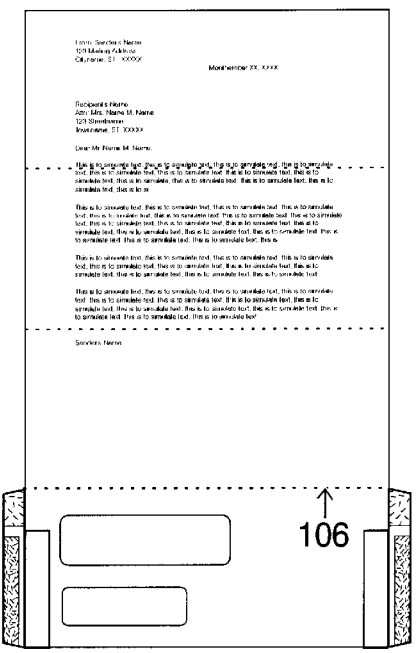
FIG. 38D
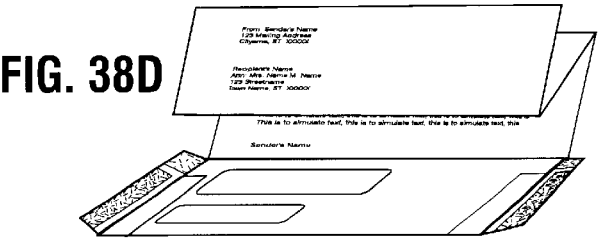
FIG. 38E
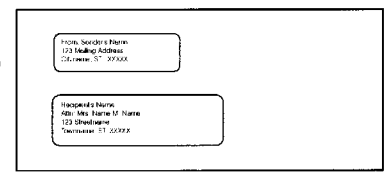
FIG. 38F

FIG. 39A
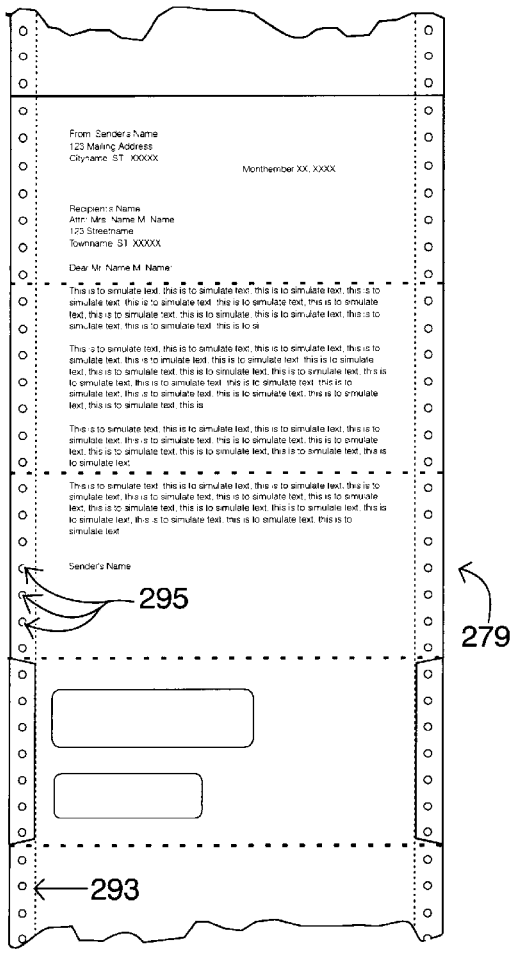
FIG. 39B
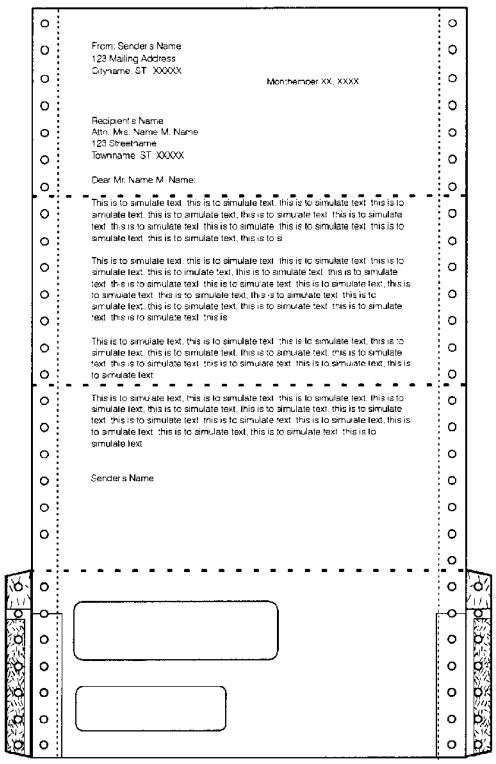
FIG. 39C
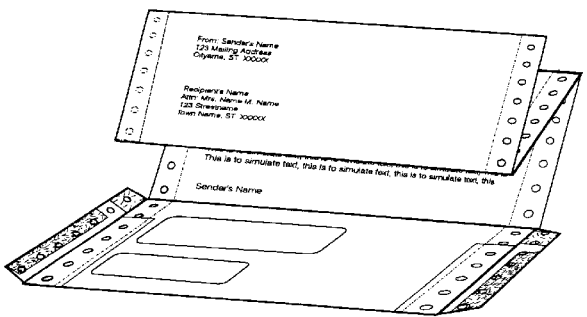
FIG. 39D
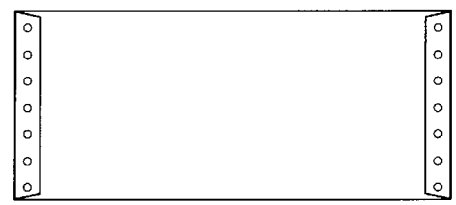
FIG. 39E

316    318

FASTENING METHOD AND STATIONERY ARTICLES PRODUCED THEREBY

This is a continuation in part of Ser. No. 09/093,301 filed Jun. 8, 1998, now abandoned, which is a continuation in part of Ser. No. 08/986,394, filed Dec. 8, 1997, now abandoned.

BACKGROUND OF THE INVENTION

1. Field of the Invention

This invention relates to assembling, connecting, securing, packaging, sealing and other fastening functions applied to different products and with notable particularity to products generated from sheet materials, as paper, cardboard, acetate, fabrics and others.

Traditional fastening methods have inherent practicality and convenience limitations, and do not offer a solution to a number of other specific needs as this invention does.

Attempts to overcome these restrictions have resulted in substantially higher production costs to the industries involved, and consequently to the end user; only to achieve a trade of these limitations for others, while producing no answer to the other specific needs that this invention addresses, as the following prior art summary indicates.

2. Prior Art

Examples of the prior art are listed as they relate to different applications of this invention. AS A SYSTEM TO SEAL ENVELOPES, BAGS, BOXES, PACKAGING, ETC. A conventional system uses a dry glue coating that needs to be moistened to promote adhesion of the surfaces involved.

Depending on the scale and nature of each task, this moistening is normally achieved by different means, including the use of wet sponges, roll-on bottles with water, and the actual licking of the dry glue with the user's tongue. Regardless of the means used, the need to moisten a dry adhesive coating is precisely the first disadvantage of this system. Also the implementation of this system is highly challenged by the high temperatures used by roller friction printers which in many cases cause an undesirable premature fastening of the envelope.

In recent years, the inconveniences of this archaic system have prompted different attempts to create a more practical solution, but the success of these attempts has been very relative, since new inconveniences are created in the process.

One of these systems requires two opposite coatings of dry glue (normally rubber cement like) that when contacting one another, the envelope, packaging, box etc. is sealed, eliminating thereby the need to moisten the coating. These are some disadvantages of this system:

1) A higher cost is apparent, since two coatings of glue are necessary.
2) These coatings are exposed at all times, risking the good bonding quality of the glue.
3) The impediment to feed envelopes or other flat objects through machines, such as printers, since the glue and the parts of said machines will disturb each other.
4) The piece must remain unfastened before its use, occupying therefore more shelf or floor space during packaging, display and storage.

Another system uses a pressure sensitive adhesive coating on one of the surfaces that need to be fastened. This pressure sensitive coating is protected with a paper, plastic or synthetic liner carrying a release substance before its use. An example of this system is an envelope manufactured and marketed by Mead Corp. of Dayton, Ohio, under the name of Press it-Seal it™ (Product #43100 75024.)

This system does eliminate the need to moisten the adhesive coating, yet it has its own significant disadvantages:

1) There is an obvious higher cost of production, since foreign parts and additional production steps are required.
2) The presence of this foreign liner may prevent the capability of envelopes and other flat objects to be fed through printers or other machines.
3) The user needs to incur in the additional steps of peeling and disposing of this foreign liner
4) Depending on the material used, this liner might not be biodegradable.

As examples of these new systems, U.S. Pat. No. 5,722,585 to RedI proposes the use of pressure sensitive adhesive coupled with the release liner to seal a box; U.S. Pat. No. 5,499,757 to Back proposes as an alternative embodiment, the use of the pressure sensitive adhesive coupled with the release liner and additionally, having said arrangement mounted on the two surfaces that are being connected.

U.S. Pat. No. 4,072,264 to Kranz discloses a duplex envelope that in one of its double aspects requires a removable release liner to protect a coating of pressure sensitive adhesive entailing additional expenses and impracticalities.

U.S. Pat. No. 4,738,391 to Wiseman discloses an envelope that can be temporarily or permanently sealed. To that end, Wisemar proposes two procedures that are unnecessary with the present invention: a) The need to moisten a dry adhesive coating; and b) the need to use removable release liners.

U.S. Pat. No. 5,429,576 to Doderer-Winkler discloses a reusable envelope that needs a removable release liner to protect a coating of adhesive on a flap, and then a protective strip of tape on the body of the envelope to permit the temporary sealing of the envelope, so it can be repeatedly used.

U.S. Pat. No. 5,474,229 to Shimazaki proposes a stack of pressure sensitive adhering envelopes, having on the back of each flap a coating of release, and on the front a coating of adhesive, so that when the envelopes are stacked with the flaps open, the adhering interface between the pressure sensitive adhesive and the release is not permanent and each envelope could be sealed without having to moisten the adhesive.

The following are problems and limitations of this system:

1) The need to package and sell the envelopes in quantities. Individual envelopes could not be marketed.
2) The absolute need of having the envelopes in an open condition, prior to their final use,
3) The impossibility to feed them through a printer, copier or any other machine. 4) A removable release liner needs to be applied to the flap of the bottom envelope, to protect it.

AS A FASTENING SYSTEM TO PRODUCE BINDERS AND FOLDERS. Some existing systems require the perforation of the sheets to be bound, others require stitching, others require insertion of pages into plastic sleeves. In many cases, any or all of these systems are viable, in others, depending on the articles to be bound, these means are simply undesirable.

U.S. Pat. 5,524,929 to Emmel offers an alternative to these systems, yet requiring a significantly more complex construction and with a more complicated mode of operation. Also, there is a product in the market by the name "Picture Post ™" Photo Mailing Card (Product #984 60060) bearing a patent pending notice, manufactured by Deluxe Craft Mfg. of Chicago, Ill.; which according to its packaging was custom designed for the United States Postal Service (USPS), and which is sold at post offices.

This product has 4 plastic sleeves mounted on a printed cardboard assembly and it is intended to carry photographs for mailing, after being placed into an envelope.

The product appears functional and attractive, yet its production costs are reflected in a fairly high retail price.

AS A SYSTEM TO CARRY FORMS OR OTHER SHEET MATERIALS THAT ARE TOO SMALL OR TOO UNSTEADY OR WITH IRREGULAR SHAPES THROUGH PRINTERS, TYPEWRITERS, FAXES OR OTHER MACHINES. This situation is illustrated by the need to feed checks through desktop printers. Normally, checks for these printers come in detachable sets of three checks per sheet.

When the three checks are simultaneously printed, this system is sufficiently satisfactory. But printing three checks at the same time is a rare occurrence. Hence, after printing one or two checks, there is a remnant of two or one check, depending on the case, which can not be a)set up in the accounting software and b)fed trough the printer.

This impediment causes substantial waste of time and pre-printed-numbered checks, which in turn affects the efficiency of bookkeeping and accounting, as loose checks must be either filled out by hand or voided, and then manually entered into the program, which entails an additional risk of error.

To reduce these adverse consequences, New England Business Services (NEBS), of Groton, Mass., provides as a complement to its laser and inkjet check orders a device by the name of "Laser Taxi™", by Hico Products, Inc. (U.S. Pat. No. 5,087,238 to Olson.) This system consists of a single rectangular sheet of paper, folded in two sections, a larger section and a smaller section. The smaller section has an adhesive strip, or as an alternative, two sided tape instead of the adhesive strip; and the form or document to be carried is positioned between the two sections.

The following are deficiencies of this existing method:
1) If this adhesive strip is not covered and the forms carrier is kept unfolded, the adhesive will be ruined by the friction of the printer's rollers, heat and the natural adhesion of dust and other particles.
2) The manual removing and repositioning of a protective strip, before and after each use, makes the process impractical, and imposes an excessive wear and tear to the material and construction of the forms carrier, reducing thereby its durability.
3) When this protective strip is in use, and the form carrier is not carrying a form, it can not maintain a defined, steady shape, since the natural tendency of the smaller section is to raise and form an angle with the larger section, making uneasy its handling and storage. AS A FASTENING SYSTEM FOR POSTING CARDS, NOTES, BILLS, SIGNS, ETC. An example of this function are receipt cards, such as those used by the USPS, and other courier companies for certified or registered correspondence. To affix these cards the pressure sensitive adhesive plus protective liner system, already discussed, is normally used. In this case also, the system presents the disadvantages explained before. (High production costs; difficulty to feed through printers and machines, the need to remove this foreign liner and discard it, etc.)

AS A FASTENING SYSTEM FOR BULLETIN BOARDS. A popular system consists of affixing the documents with a tack onto a cork board.

In many cases this is viable. In others, the following disadvantages make the system undesirable:
1) The document will suffer a perforation
2) The tacks represent a risk of accidental harm, particularly when they fall on the floor and may be stepped on, or be reached by children.

Another system is just attaching the document with adhesive tape. In certain cases this is acceptable, in other cases one of these two situations may make the system undesirable:
1) Too strong adhesion of the tape to the document may make impossible its removal without damaging the document.
2) Since the adhesion of the tape affects only one surface of the document, weather conditions and different levels of humidity may cause the document to be untimely detached.

AS A SYSTEM TO SECURE DOCUMENT ENCLOSURES. An example of this function is the need to secure checks or currency to greeting cards. Normally, a built in loose pouch is used. These are disadvantages of this system:
1) The support and safety offered is directly related to the position in which the card is handled, therefore there is a risk of losing its contents.
2) And as a result of this, this system further imposes creative and design limitations to the production of these cards.

Another example of this function is the need to attach cards or other flat objects onto a mailing piece. Normally a coating of glue is applied to the mailing piece, and the card or flat object is simply attached to it. In certain cases this system is not viable, as for example:
1) If more than one layer of objects has to be attached to the mailing piece.
2) If the mailing piece and attachment have to run through a machine, like a continues printer and a substantial support is required.

AS A CUSTOM FASTENING SYSTEM CAPABLE OF HAVING TWO SURFACE AREAS COATED WITH A FASTENING AGENT IN CONTACT, BUT DETACHED, AND ATTACHING THEM BY POSITIONING AN ARTICLE, FREE OF ANY FASTENING AGENT BETWEEN THEM (IN A SANDWICH-LIKE MANNER). No reference was found. AS A SYSTEM TO ASSIST IN MOUNTING A PHOTOGRAPH ON A MAT FRAME. Commonly, photographs are positioned from the back of the mat, and arranged so the desired area shows through the aperture of the mat, then they are secured also from the back with adhesive tape. The disadvantages of the system are the need to incur in this step of applying the adhesive tape, and the risk of damaging the photograph when it needs to be removed.

Another system, as proposed by U.S. Pat. No. 5,740,957 to Wenkman requires a more complex construction, since it can also be used for mailing the photograph, requiring therefore additional mounting steps with an apparent higher cost, unnecessary when the mailing function will not be used.

AS A SYSTEM TO PRODUCE SELF CONTAINED FORMS. Multiple mailing assignments have become a customary situation at all levels in today's private and public sectors. Therefore, functionality, economy and versatility are very desirable qualities associated with these assignments.

Many attempts have been made to achieve these qualities, and most of these efforts have been restricted to continuous feeding systems.

The following are notable exponents of the known art: U.S. Pat. No. 4,586,651 to Bradley, assigned to Bedford Engineering Co. of Armonk, N.Y.; U.S. Pat. No. 5,125,562 to Bendel; U.S. Pat. No. 5,398,867 to Murphy; U.S. Pat. No. 5,553,774 to Goodno, assigned to Moore Business Forms, Inc. of Grand Island, N.Y.; and U.S. Pat. No. 5,640,835 to Muscoplat.

These are specific shortcomings of these exponents of the known art:

1) No system addresses both, continuous and non continues feeding printing needs,
2) Some of the known systems require the forming of enclosure and envelope separately, utilizing thereby additional materials and assembly time, also increasing the postage cost due to its higher weight,
3) Some of the known systems require double sided printing of the piece, increasing the costs and also increasing the risk of mismatch due to human error,
4) Some of the known systems require a complex industrial set-up, limiting thereby the options of the end user, and preventing the on-location final output by end user,
5) Some of the known systems use unprotected and exposed coatings of adhesive, during the preparation, printing and forming of the piece, compromising thereby the effectiveness of the adhesive, the appearance of the finished piece, the privacy of the message, and the good flow of the overall project,
6) Some of the known systems require adhesive coatings to be moistened to promote adhesion, and some require the peeling of a liner to expose adhesive, incurring thereby in additional steps.

Also, related to these self contained forms, the USPS (United States Postal Service) sells non-continuous forms that don't require an envelope for mailing.

One version is sold under the brand name "Aerogramme", which appears to be intended mainly for letters and similar correspondence.

Another version is sold under the brand name "Bright Eyes Stamps", made of a card stock and, with decorative imprinting on it, which appears to be intended for greetings and similar correspondence.

Both products require layers of dry adhesive to be moistened for sealing of the form, which constitutes its first disadvantage.

Another significant disadvantage resulting from this system is the inability to feed the form through a desktop printer for personalized imprinting.

And yet another disadvantage is the need to enter the addressing information on the outside of the form, as an additional step.

There is also a self seal mailer in the marketplace by Avery Dennison Corp. of Pasadena, Calif., (Product #8325) bearing a patent pending notice, which is an 8 ½×11" rectangular sheet with two score lines, dividing the rectangle in three panels, and having a narrow extension of about ⅝" (For a total length of 11 ⅝") that carries a layer of pressure sensitive adhesive and which needs to be protected by a removable strip carrying a release substance.

This self seal mailer has the following disadvantages with respect to the self sealing forms possible by this invention:

1) It is necessary to separately produce and then affix this strip liner, which represents additional manufacturing costs that obviously translate into a higher retail price.
2) It is necessary to remove and then discard this strip liner to seal the envelope.
3) It is necessary to install and use customizing software prior to printing of the form via a computer, due to the extension that causes the form to have a non standard size, as those pre-formatted by most word processing, desktop publishing, accounting and other computer programs.
3) The additional costs associated with this software.
4) The need to print separately the message and the addressing information.
5) Due to its open side panels, the contents of the message can be easily seen by anyone with a minimal effort. Hence, the mailer can not be used when privacy and confidentiality are desirable.

Also, some patent documents disclose other individual products incorporating the use of alternated adhesive coatings and release coatings, directed to solve needs different to those addressed by this application, as:

U.S. Pat. No. 3,862,634 to Small titled "Fastener For Disposable Diaper" discloses a fastener specifically designed to aid in the securing of opposite ends of a disposable diaper. The fastener is a separate piece that requires to be mounted onto the diaper. U.S. Pat. No. 3,900,642 to Michel, titled "Binding Strip For Book Leaves" refers specifically to individual strips to connect book leaves, that then need to be connected together and then need to be connected to a cover to conform a book. But this patent does not disclose how this is done. The use of alternated coatings of adhesive and release substances seems to fail to offer any practical solution or advantage to any problem or need, as it is proposed by this patent. The steps to obtain a functional purpose by this method seem by far much more complex than any previously established binding method.

U.S. Pat. No. 4,050,121 to Richman, titled "Single Substrate Tab Fastener" discloses a fineness tab that is specifically designed to aid in the fastening of diapers. The fastener is a separate piece that requires to be mounted onto the diaper.

U.S. Pat. No. 4,460,634 to Hasegawa, titled "Adhesive Sheet and Method For manufacturing The same". The use of alternated adhesive and release coatings is restricted to a specific type of product, defined in this patent as posters and signs.

U.S. Pat. No. 4,768,810 to Mertens, titled "Fanfolded Tablet of a Web Which is Separable Into Sheets Each Bearing A Pressure-Sensitive Adhesive Pattern". The use of alternated adhesive and release coatings is restricted to a specific product, which is a variation of an existing product, commercially known as "Post-it"™ pads, produced and marketed by Minnesota Mining and Manufacturing Co. (3M) of St. Paul, Minn., the same assignee of Mertens's patent, and the intended function of the invention disclosed is to overcome the tendency of the adhesive properties to expire over certain periods of time, or to add strength to the adhesive properties.

U.S. Pat. No. 4,902,141 to Linnnewiel titled "Resealable Flexible Packaging and Sealing Tape Therefor" discloses a packaging system designed to seal bags and the like. The tape is a separate piece that requires to be mounted onto the bag.

U.S. Pat. No. 5,575,574 to Mertens titled "Sheet Composite Adapted To Be Printed", discloses a method to produce note pads for the posterior customized individual imprinting of each component sheet of said pad, one at a time, which suggests that the invention is oriented primarily to personal use.

Conversely, U.S. Pat. No. 5,618,062 to Mertens et al titled "Note or Note Pad Preparation" discloses a method to produce note pads for the posterior customized printing of said pads. Subsequent to said imprinting, said note pads must be cut to obtain individual notes, which suggests that the invention is restricted to industrial applications.

U.S. Pat. No. 5,264,264 to Shibata et al, titled "Pressure-Sensitive Tape, Pressure-Sensitive Tape-Fixing Structure, and Roll of Pressure-Sensitive Tape" discloses a pressure sensitive tape for use in fixing one member to another member, as for example, opposite parts of a diaper. The tape is a separate piece that needs to be mounted onto the member(s) involved.

U.S. Pat. No. 5,332,607 to Nakamura et al, titled "Water-Soluble Double Faced Adhesive Tape For Splicing" discloses a double faced tape for splicing two substrates, in a fashion that prevents the spliced area to have a sudden increase in thickness. By its own definition the tape is a separate element that needs to be attached to the substrates being spliced.

U.S. Pat. No. 5,591,498 to Arakawa, titled "Structure of Releasing Part" discloses a structure added to parts that need to be fastened, like diapers, for example, and with particular focus on the adhesive and releasing properties of the coatings. Also, the release and adhesive coatings respectively are always proposed to be applied to different surfaces. The structure is a separate part that needs to be applied to the parts that need fastening.

U.S. Pat. No. 5,624,069 to Coats et al, titled "International Document Shipping Pouch" discloses the assembly of envelopes and matching labels connected in an intertwined fashion by the use of adhesive and release coatings, which is restrictively intended to solve a specific function, which is to expedite the handling of international shipments. WO Patent 95/14064, titled "Adhesive Products" (Applicant Ko Pack KK; Ko Pack UK; Inventor: Kobayashi, Junichi) discloses the alternated use of adhesive and release coatings to produce linerless tapes, labels and sheet materials. (The term sheet materials does not offer any further specification, since the already mentioned tape and labels, are of necessity sheet materials). The use of these coatings is proposed in a restrictive manner applied to those products, that perform specific functions, as follows: 1) Adhesive tape is a separate part used to connect two separate parts. 2) A label is a separate part used to identify another part or article.

Patent Abstracts of Japan Publication Number JP9263737, titled "Process and Apparatus For Production of Double Adhesive Seal" (Patentee: Ko Pack International KK; Inventor: Kobayashi Junichi) which consists of two facing sheets with adhesive and release coatings alternated and disposed in inverse position. The invention is restricted to that sealing product, which is perceived as a separate part, since it is intended to seal other parts. The invention is very similar to preceding WO 95/14064 to the same applicant and by the same inventor.

Patent Abstracts of Japan publication Number JP63066280, titled "Tape for Pasting", (Patentee and Inventor: Keiichiro Matsuda) discloses two facing strips of tape in an identical manner as the preceding document. The invented tape, of course is also restricted to the intended function of connecting two different parts, which defines the tape as a separate part.

EP 0 472 376 A1 patent, titled "Absorbent Articles With Integral Release System and Methods of Making the Same" discloses different absorbent articles that can be fastened to an underwear garment and that do not require removable release liners. The invention and method applies to those specific products and uses.

EP 0512 153 A patent, titled "Labeling Product Using Adhesive Seal" (Applicant: Ko-Pack Corporation; Inventor: Kobayashi, Junichi) discloses a product very similar to the preceding documents JP9263737, and WO 95 14064 to the same applicant and by the same inventor), having its function restricted to label other articles.

All of these patent documents refer to different specific products, and none of these products addresses the different novel uses and applications that this invention does, permitting the solution of different existing problems and needs, in a practical, useful and economical manner.

Summarily, as all the preceding examples under this "Prior Art" title indicate, a distinct and clear need exists for a more efficient and practical fastening method related to the multiple applications of this invention. Furthermore, this need is magnified by the lack of any prior art addressing other types of problems and needs also mentioned in this prior art discussion.

Summarily, as all the preceding examples under this "Prior Art" title indicate, a distinct and clear need exists for a more efficient and practical fastening method related to the multiple applications of this invention. Furthermore, this need is magnified by the lack of any prior art addressing other types of problems and needs also mentioned in this prior art discussion.

SUMMARY OF THE INVENTION

This invention relates to a fastening method and the products made possible by it. As summarily described by FIGS. 2–16, the method consists of having a layer or layers of a fastener 202 and a layer or layers of a fastener inhibitor 206, disposed in a mutually facing arrangement on surfaces (planes) 201 and 203, so said surfaces do not fasten to each other in a permanent manner, and the position of a double surface plane 205, void of any layers between said surfaces 201 and 203, to enable the fastening function in a more permanent or in a temporary manner, depending on the properties of the fastener 202, as shown in more detail by FIG. 9. Additionally, other fastening attributes are possible by the use of a layer or layers of a lower strength fastener 204.

A primary object of this invention is:
1) To provide with a novel fastening system that overcomes the deficiencies of the prior art, in a practical and economical manner and that further expands possibilities related to connecting, securing, packaging sealing and other fastening functions of different products, and with notable particularity to products generated from sheet flexible materials, as paper, cardboard, film, acetate and others.

As a result, the following are other objects of this invention:
2) To eliminate the need to moisten coatings of dry glue to activate it, and avoid all the disadvantages of this system, for sealing envelopes, boxes, etc.
3) To eliminate the need to use double coatings of adhesive and avoid all the disadvantages of this system for sealing envelopes, boxes, etc.
4) To eliminate the need to use foreign strips to protect adhesive coatings, for the sealing of envelopes, boxes and other containers; and all the disadvantages that this system entails, like higher production costs, that naturally translate into higher retail prices, as this foreign strip must be produced separately, and then affixed to the product. 4a) And yet another object is to eliminate the need to remove and then discard this foreign strip by the end user.

5) To eliminate the need to use these foreign strips for other fastening functions, as for example, the posting of cards, signs, etc., the carrying of forms through printers, etc. and all the disadvantages that this system entails, like higher production costs that later translate into higher retail prices, and the need to remove and discard these foreign strips by the end user.

6) To provide with an efficient and practical system of sealing envelopes and packages.

7) To further provide with a fastening system that makes evident any tampering with envelopes, boxes and other means of packaging.

8) To provide with an efficient and practical system to feed sheets of paper or other materials that are too small, too unsteady or that have irregular shapes through printers, faxes, typewriters and other machines.

9) To offer alternative solutions for binding and other related functions.

10) To offer alternative solutions for bulletin boards and other related functions.

11) To offer alternative solutions for fastening correspondence enclosures and other related functions.

12) To provide means to assist in the mounting of photographs and pictures onto mat frames, and other related functions.

13) To provide means to secure checks and currency to greeting cards, and other related functions.

14) To provide with a practical and economical method to produce self contained forms, such as letters, accounting and legal correspondence, advertising messages, etc. for the personalized printing of both, a private message and the address and return information as well as any other information, achieving this with one single printing command, and one single trip of said form across the printer, and being said form also capable of containing enclosures, such as return envelopes, cards, etc. As a result of this object, the following are further objects of this invention:

14a) To save paper, when used to produce self contained forms, thanks to its form plus envelope dual function.

14b) To provide with different assembly configurations to suit continues and non continuous feeding systems, making possible its use with virtually any industrial, commercial and personal printers, and the handling of long runs, short runs or individual printing assignments.

14c) To increase the efficiency of personalized printing by including additional areas that become separate personalized documents as cards, stubs, etc., after they are detached, which in combination with an enclosure, as a return envelope, for example, can maximize the results of a personalized mailing project.

14d) To further provide nesting capabilities that enable the insertion of enclosures.

14e) To satisfy a diversity of personalized mailing specifications, by working in conjunction with software customized to said specifications, creating additionally other marketing opportunities.

15) Another object of this invention is to further enable the incorporation of these fastening principles to any desired articles for any particular needs, by the use of adaptable fastening means as tape, containing the principles of this system. The various objects and multiple advantages of this invention are further explained by the following description and embodiment examples taken in conjunction with the accompanying drawings.

BRIEF DESCRIPTION OF THE DRAWINGS

FIG. 1: is a plan view of layers of adhesive, lower strength adhesive and adhesive inhibitor, as respective examples of a fastener, a lower strength fastener and a fastener inhibitor.

FIG. 2: is a perspective view of a pattern arrangement of layers.

FIG. 3: is a perspective view of a pattern arrangement of layers.

FIG. 4: is a perspective view of a pattern arrangement of layers.

FIG. 5: is a perspective view of a pattern arrangement of layers.

FIG. 16: is a perspective view of a pattern arrangement of layers.

FIG. 18A: is a plan view of an envelope.

FIG. 18B: is a plan view of the envelope of FIG. 18A, further illustrating the different layers used.

FIG. 18C: is a plan view of the envelope of FIG. 18B, further illustrating the configuration of the envelope before its use.

FIG. 24F: is a perspective view of the card of

FIG. 24E, in reverse view, further illustrating the card being removed from the envelope.

FIG. 26A: is a plan view of a forms carrier.

FIG. 26B: is a plan view of the forms carrier of FIG. 26A, further illustrating the layers used.

FIG. 26C: is a plan view of the forms carrier of FIG. 26B, further illustrating the attachment of three rotary filing cards.

FIG. 26D: is a plan view of the forms carrier of FIG. 26C, further illustrating the three rotary filing cards, after printing.

FIG. 31A: is a plan view of a sheet material cut into a shape to produce a self contained form.

FIG. 31B: is a plan view of the sheet of FIG. 31A, further illustrating the layers used, defining the form.

FIG. 31C: is a plan view of the form of FIG. 31B, further illustrating the form prepared for feeding into a printer.

FIG. 31D: is a plan view of the form of FIG. 31C, further illustrating the form after printing.

FIG. 31E: is a plan view of the form of FIG. 31D, further illustrating the flaps unfolded.

FIG. 31F: is a perspective view of the form of FIG. 31E, further illustrating the folding of the form.

FIG. 31G: is a plan view of the form of FIG. 31F, further illustrating the form sealed.

FIG. 36A: is a fragmentary plan view of a sheet material cut into a shape to produce a self contained form.

FIG. 36B: is a fragmentary plan view of the sheet of FIG. 36A, further illustrating the layers used, defining the form.

FIG. 36C: is a fragmentary plan view of the form of FIG. 36B, further illustrating the flaps folded for feeding into the printer.

FIG. 36D: is a fragmentary plan view of the form of FIG. 36C, further illustrating the form printed.

FIG. 38A: is a fragmentary plan view of a sheet material cut into a shape to produce a self contained form, and illustrating the layers used.

FIG. 38B: is a fragmentary plan view of the sheet of FIG. 38A, after the form is defined, further illustrating the flaps temporarily folded, and the form printed.

FIG. 38C: is a plan view of the individual form of FIG. 38B after detachment.

FIG. 38D: is a perspective view of the form of FIG. 38C, being folded for its sealing.

FIG. 38E: is a plan view of the form of FIG. 38D, further illustrating the form sealed.

FIG. 38F: is a plan reverse view of the form of FIG. 38E.

FIG. 39A: is a fragmentary plan view of a continuous form assembly.

FIG. 39B: is a plan view of an individual form detached from assembly of FIG. 39A, illustrating the layers used.

FIG. 39C: is a perspective view of the form of FIG. 39B, further illustrating the folding pattern for sealing the form.

FIG. 39D: is a plan view of the form of FIG. 39C, further illustrating the form sealed.

FIG. 39E: is a reverse plan view of the form of FIG. 39D.

Figure 40A:
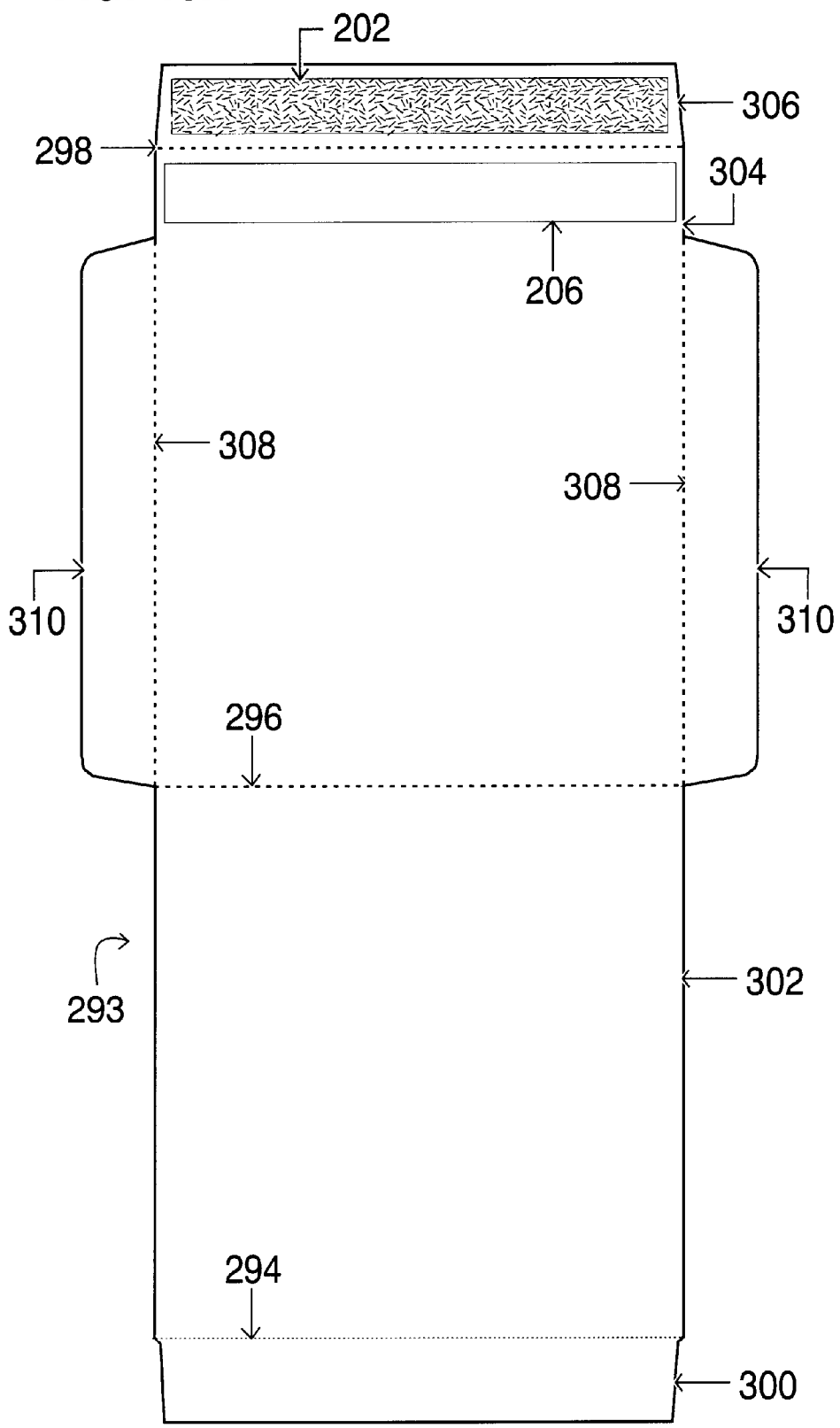

FIG. 40A: is a plan view of a sheet material cut into a shape to produce an envelope showing two of the layers used.

Figure 40B:
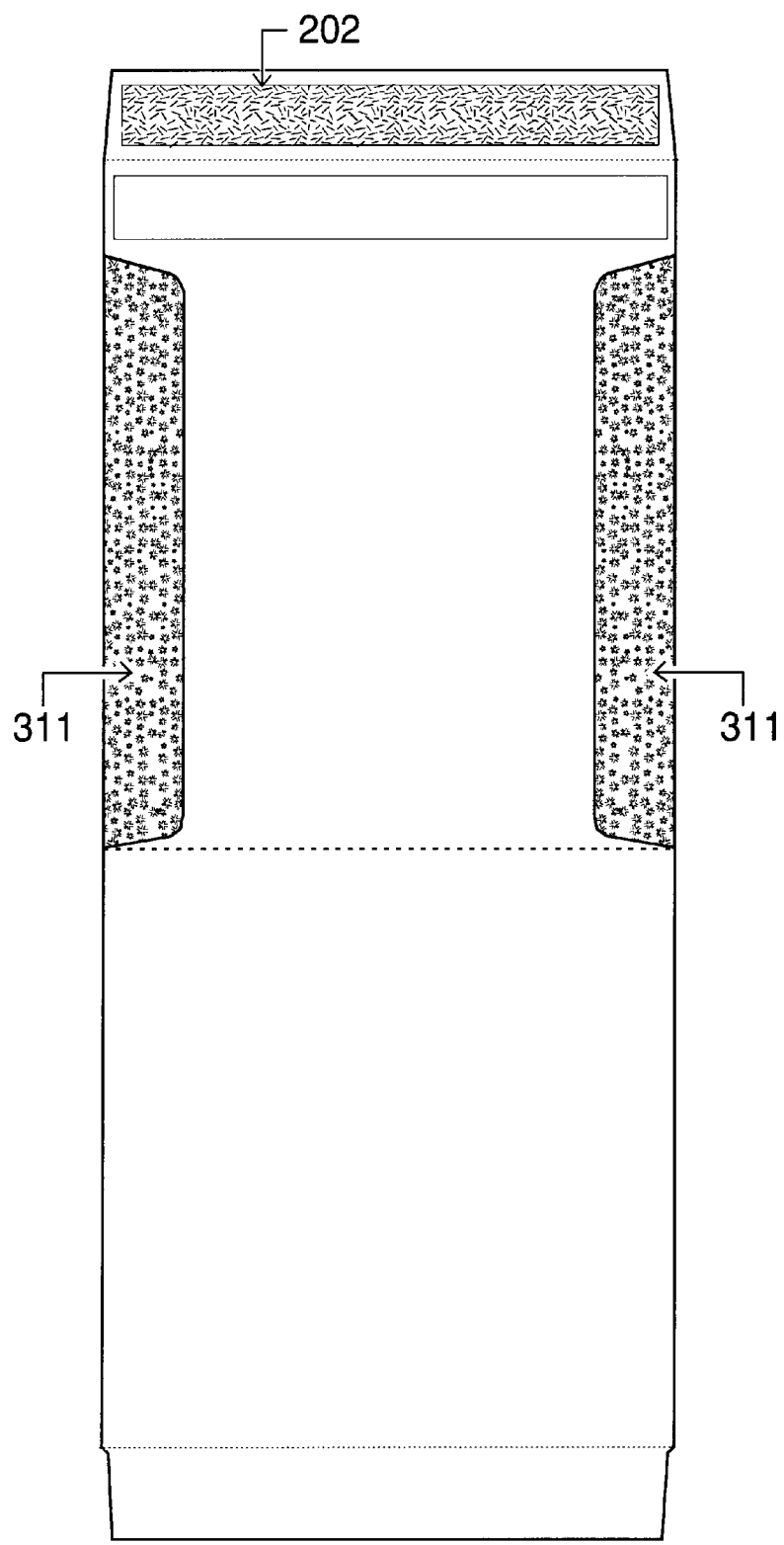

FIG. 40B: is a plan view of the sheet of FIG. 40A, after the first step of forming the envelope has occurred, and further showing layers of adhesive used to form the envelope.

Figure 40C:
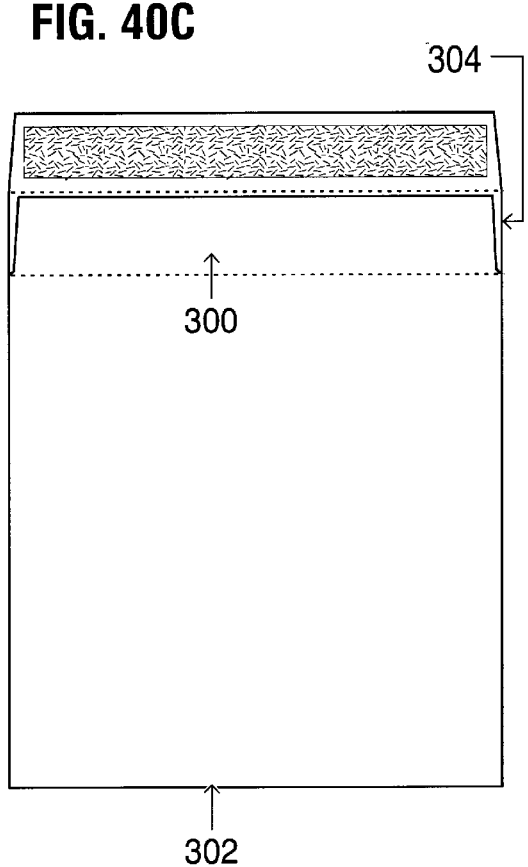
Figure 40D:
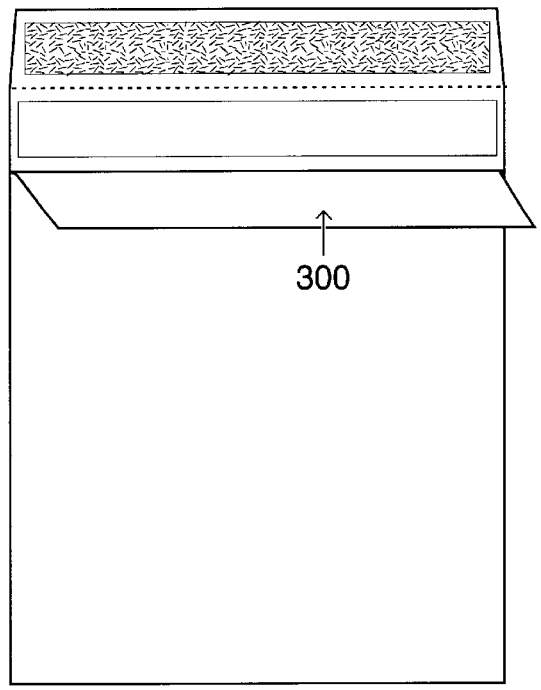

FIG. 40C: is a plan view of the envelope of FIG. 40B after it is formed,

FIG. 40D: is a plan isometric view of the envelope of FIG. 40C, further showing the first step to set its configuration before its use.

Figure 40E:
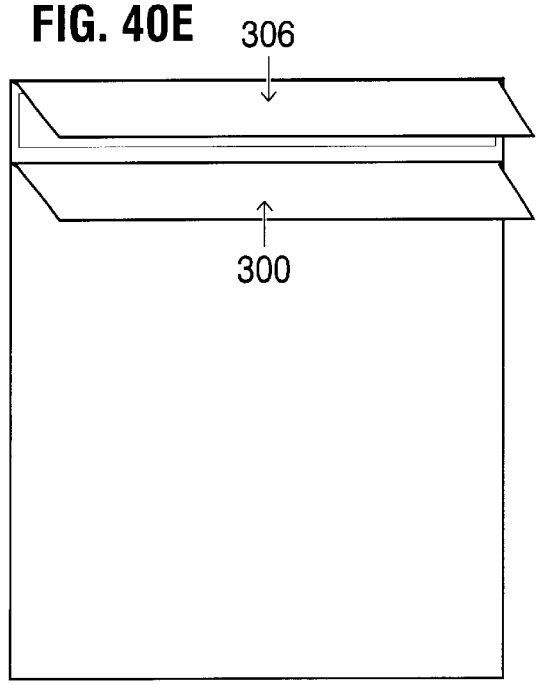

FIG. 40E: is a plan isometric view of the envelope of FIG. 40D, further showing the second step to set its configuration before its use.

Figure 40F:
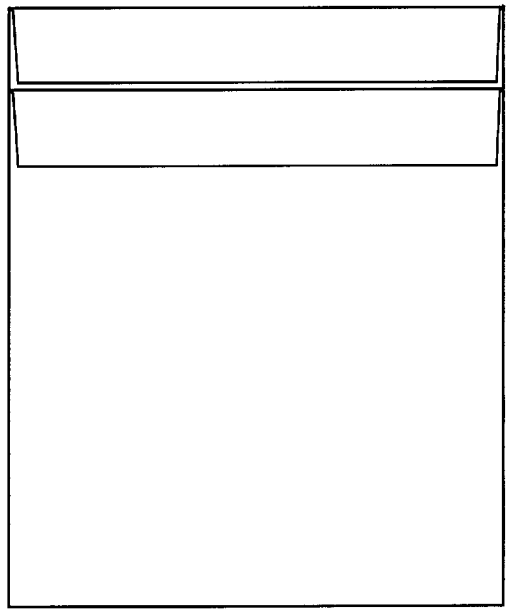

FIG. 40F: is a plan view of the envelope of FIG. 40E, further showing the envelope's configuration before its use.

Figure 40G:
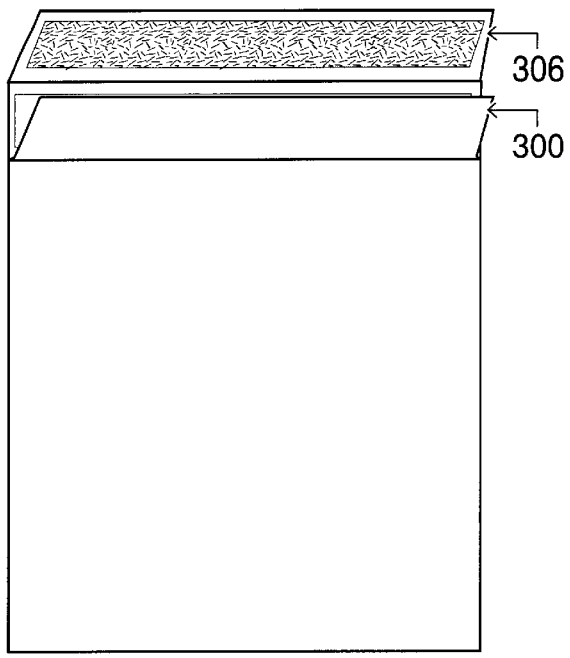

FIG. 40G: is a plan isometric view of the envelope of FIG. 40F further showing the first step to seal the envelope.

Figure 40H:
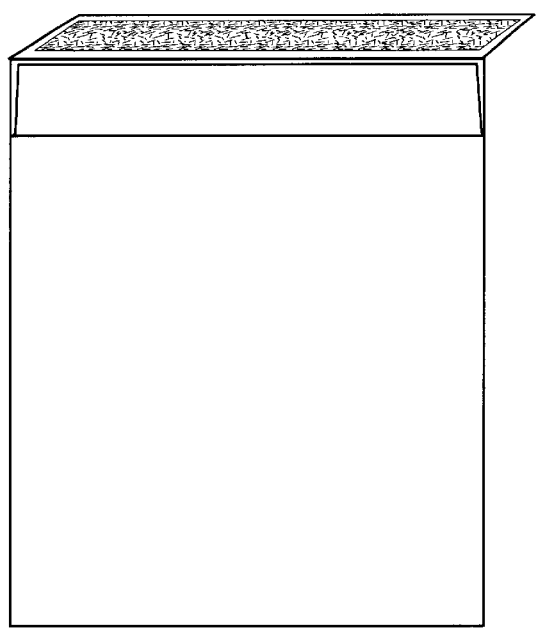

FIG. 40H: is a plan isometric view of the envelope of FIG. 40G further illustrating the second step to seal the envelope.

Figure 40I:
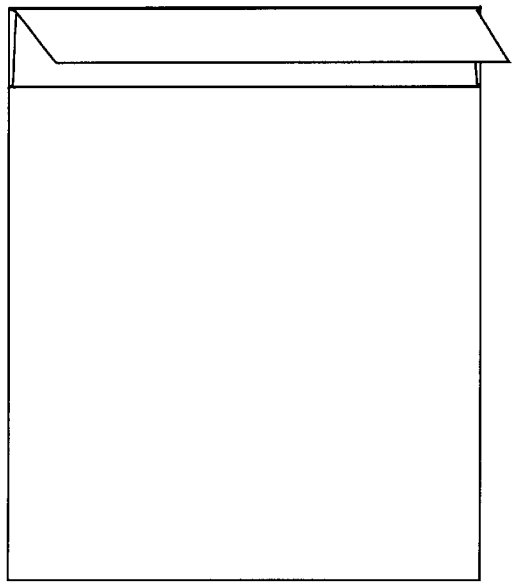

FIG. 40I: is a plan isometric view of the envelope of FIG. 40H further illustrating a more advanced stage of the second step to seal the envelope.

Figure 40J:
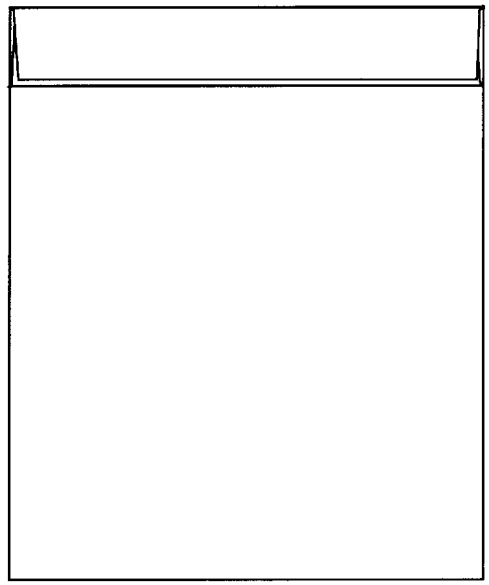

FIG. 40J: is a plan view of the envelope of FIG. 40I, further illustrating the envelope fully sealed.

Figure 41A:
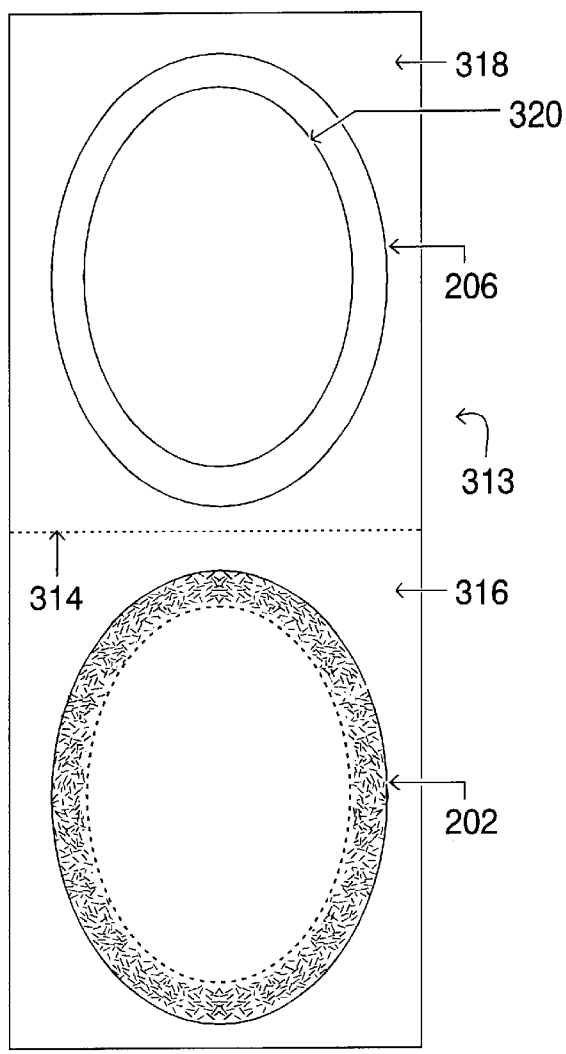

FIG. 41A: is a plan view of a mat frame illustrating the different layers used.

Figure 41B:
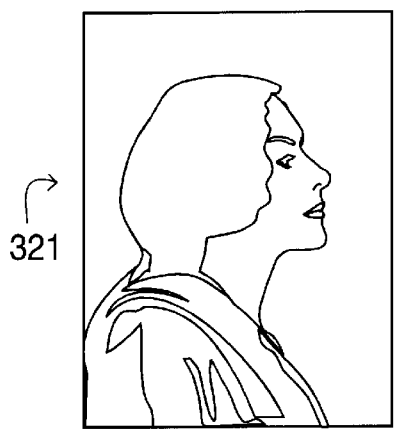

FIG. 41B: is a plan view of a photograph.

Figure 41C:
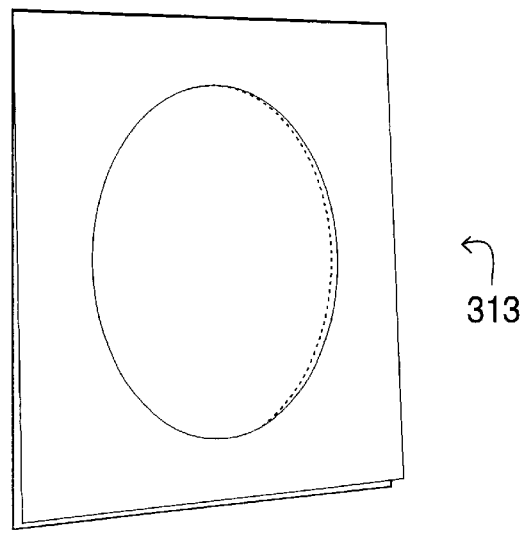

FIG. 41C: is a perspective view of the mat frame of FIG. 41A, further illustrating its configuration when not in use.

Figure 41D:
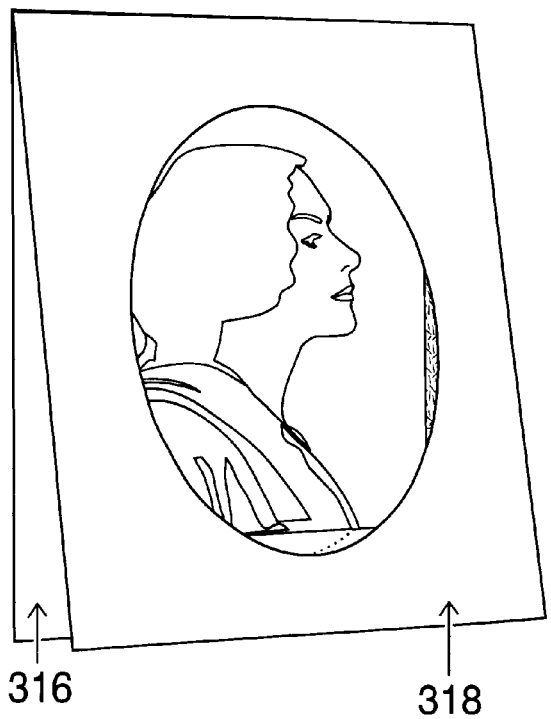

FIG. 41D: is a perspective view of the mat frame of FIG. 41C further illustrating the positioning of the photograph of FIG. 41B.

Figure 41E:

FIG. 41E: is a plan view of the mat frame and photograph of FIG. 41D, fully mounted.

Figure 42A:
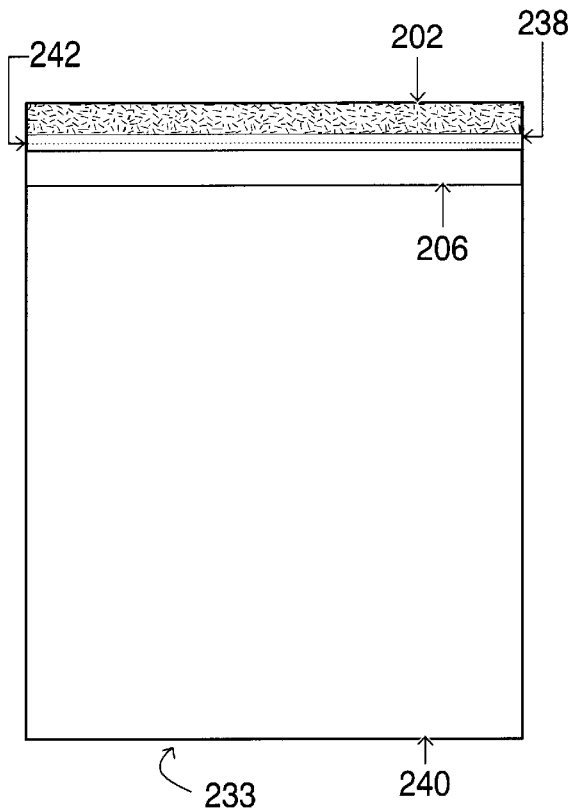

FIG. 42A: is a plan view of a piece of wrap material illustrating the different layers used.

Figure 42B:
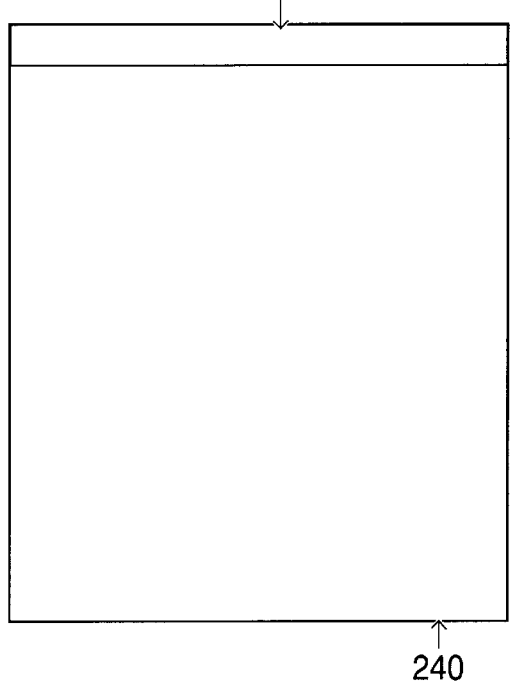

FIG. 42B: is a plan view of the wrap material of FIG. 42A, further illustrating its configuration before its use.

Figure 42C:
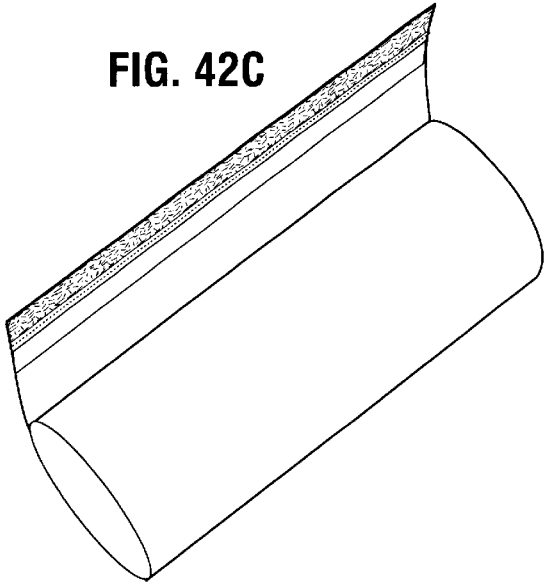

FIG. 42C: is an isometric view of the wrap material of FIG. 42B, further illustrating the first step of sealing.

Figure 42D:
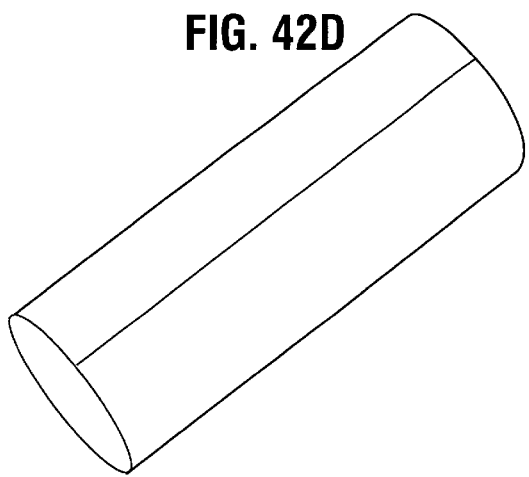

FIG. 42D: is an isometric view of the wrap material of FIG. 42C, further illustrating it, after it has been sealed.

Figure 43A:
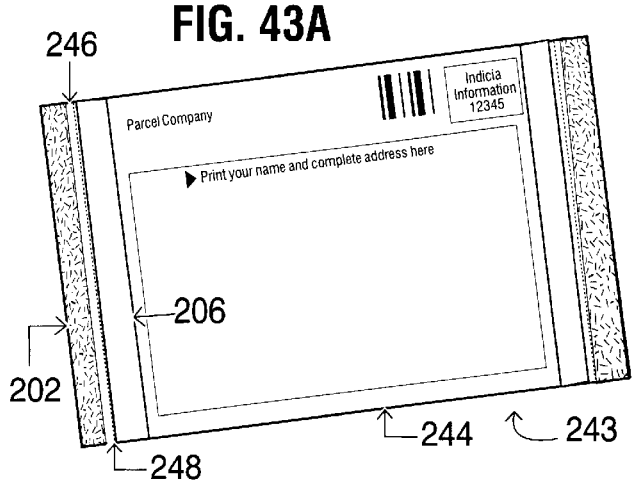

FIG. 43A: is a plan front view of a shipment receipt card illustrating the layers used.

Figure 43B:
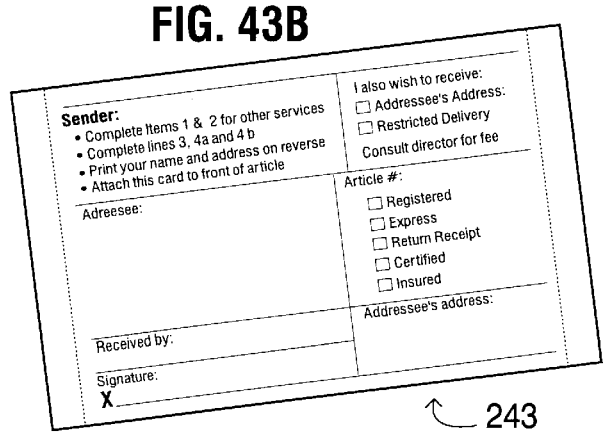

FIG. 43B: is a plan reverse view of the card of FIG. 43A.

Figure 43C:

FIG. 43C: is a plan front view of the card of FIG. 43B, further illustrating its configuration before its use.

Figure 43D:
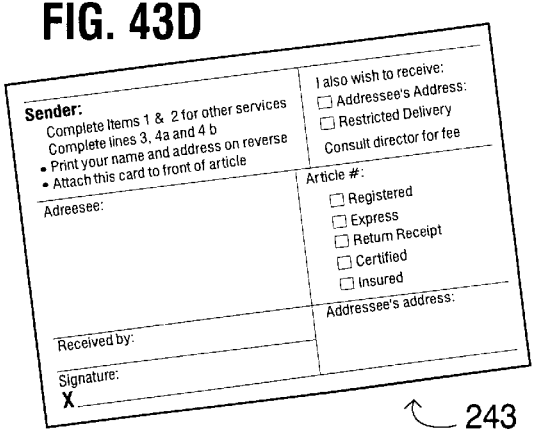

FIG. 43D: is A plan reverse view of the card of FIG. 43C.

Figure 43E:
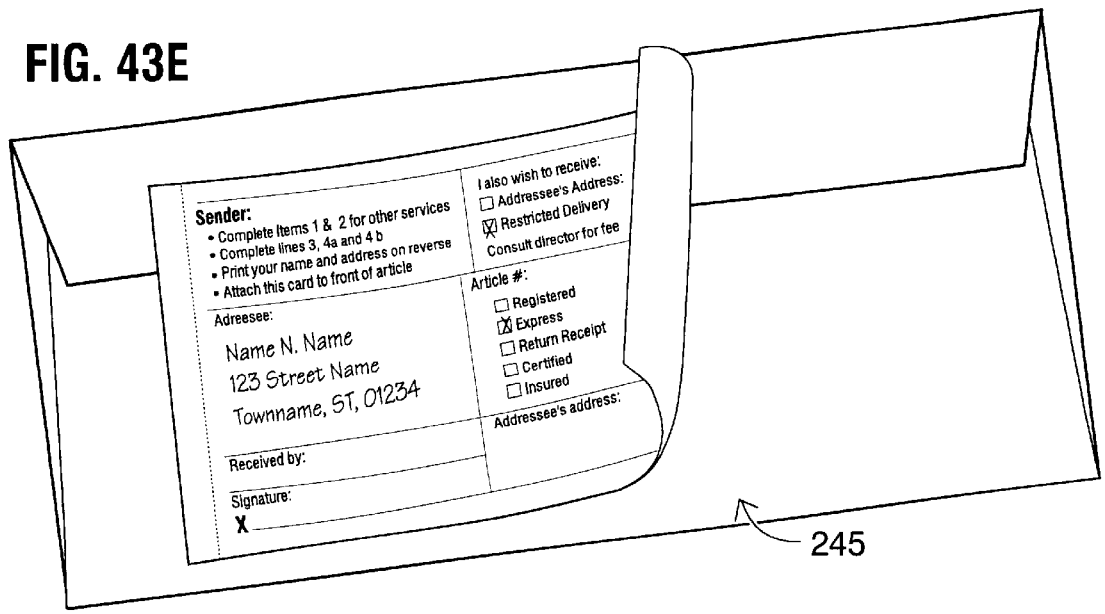

FIG. 43E: is a perspective view of the shipment card of FIG. 43D, in reverse view while being attached to an envelope.

Figure 43F:
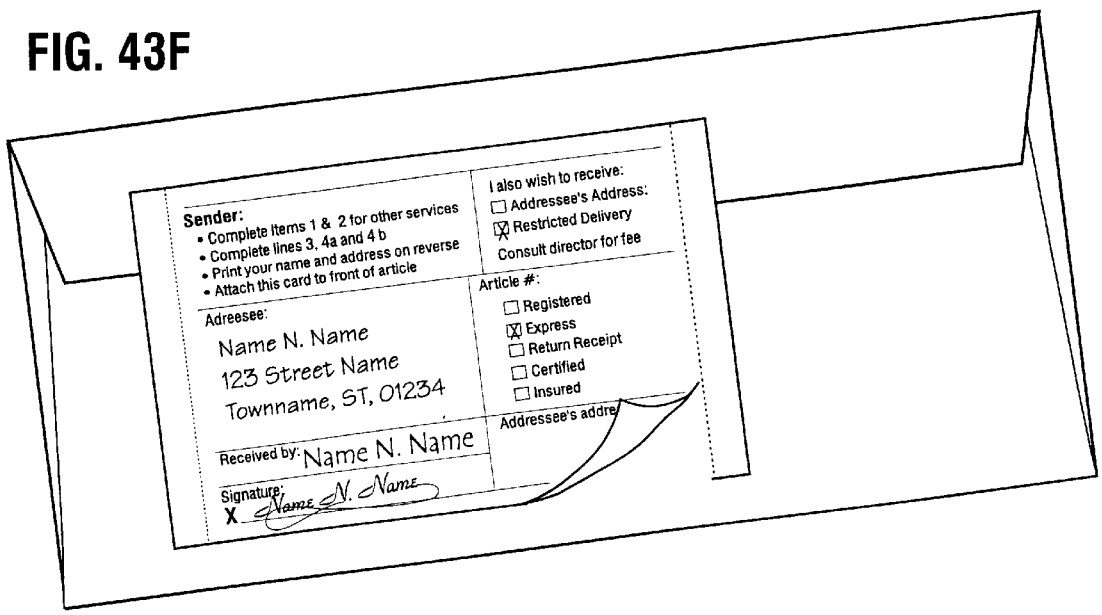

FIG. 43F: is a perspective view of the card of FIG. 43E, in reverse view, further illustrating the card being removed from the envelope.

Figure 43G:
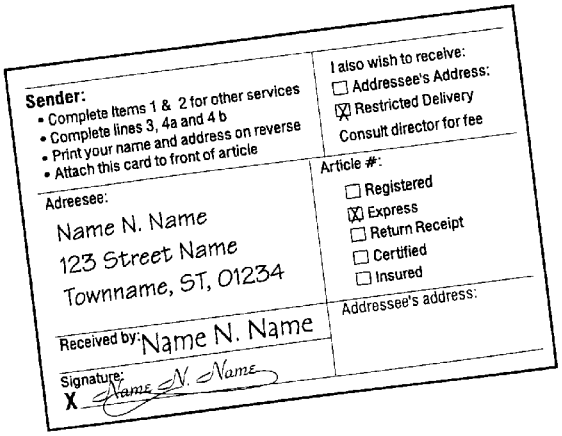

FIG. 43G: is a plan reverse view of the card of FIG. 151, after it has been removed from the envelope.

Figure 44A:
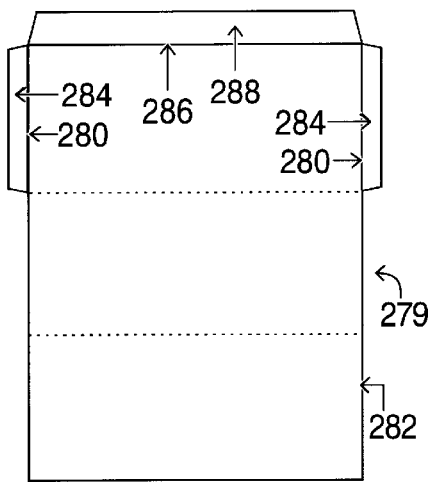

FIG. 44A: is a plan view of a sheet material die or otherwise cut to produce a self contained form.

Figure 44B:
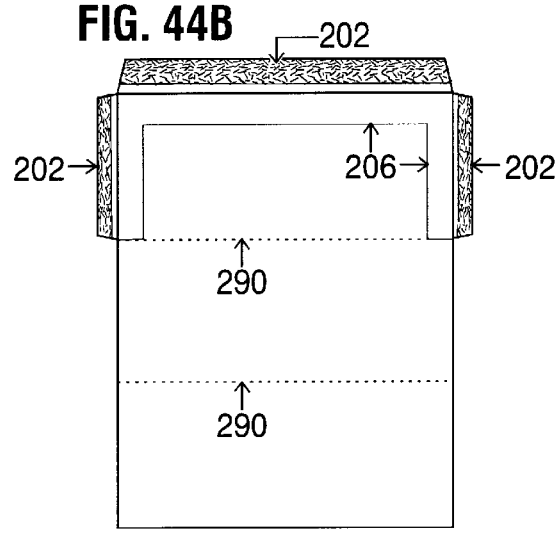

FIG. 44B: is a plan view of the sheet of FIG. 44A, further illustrating the layers used to define the form.

Figure 44C:
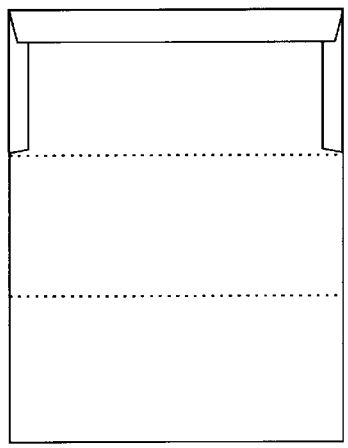

FIG. 44C: is a plan view of the form of FIG. 44B, further illustrating the form prepared for feeding into a printer.

Figure 44D:
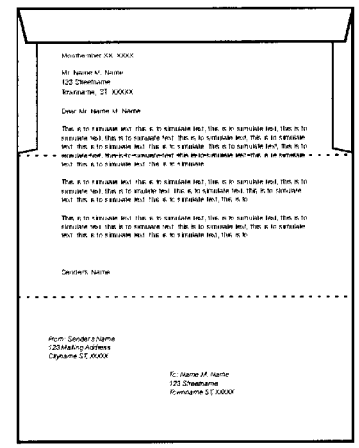

FIG. 44D: is a plan view of the form of FIG. 44C, further illustrating the form after printing.

Figure 44E:
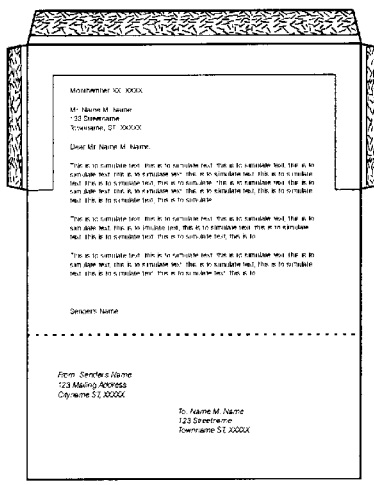

FIG. 44E: is a plan view of the form of FIG. 44D, further illustrating the flaps unfolded.

Figure 44F:
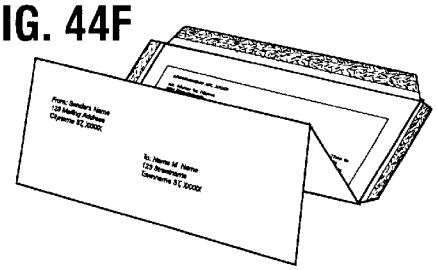

FIG. 44F: is a perspective view of the form of FIG. 44E, further illustrating the final folding of the form.

Figure 44G:
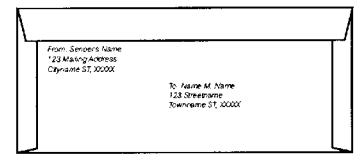

FIG. 44G: is a plan view of the form of FIG. 44F, further illustrating the form sealed.

Figure 45A:
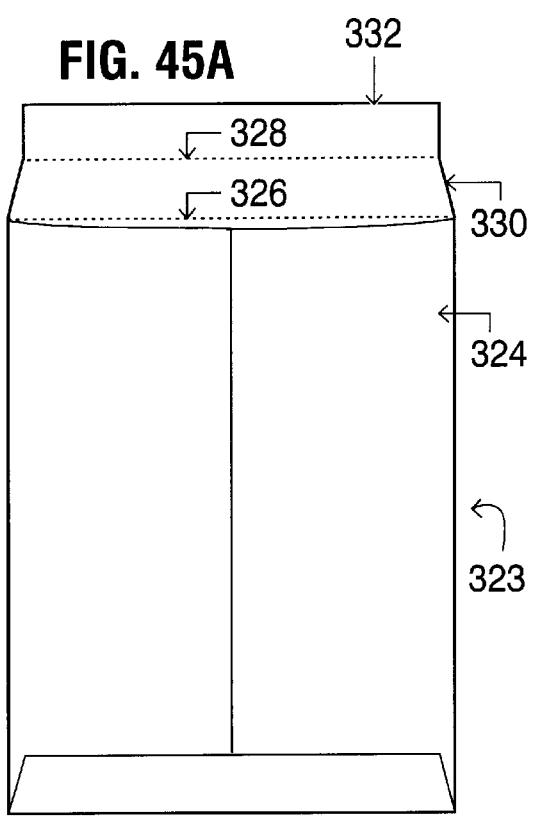

FIG. 45A: is a plan view of an envelope.

Figure 45B:
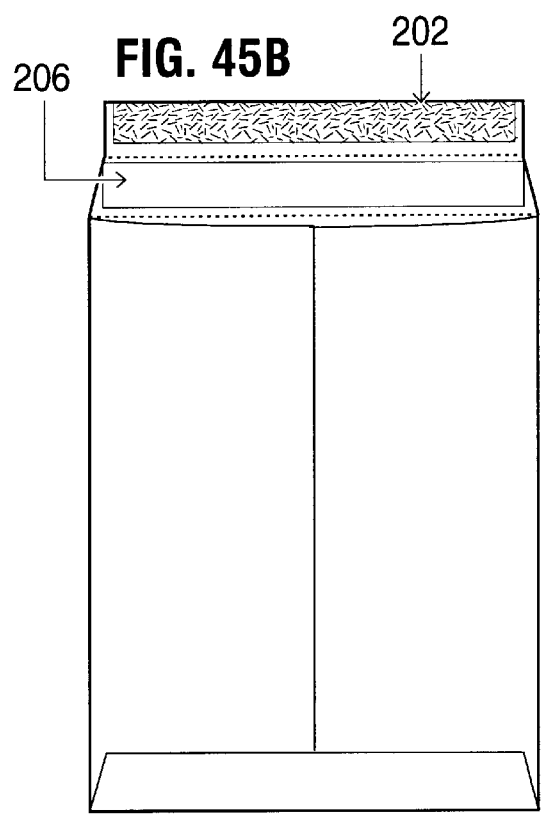

FIG. 45B: is a plan view of the envelope of FIG. 45A, further illustrating the different layers used.

Figure 45C:
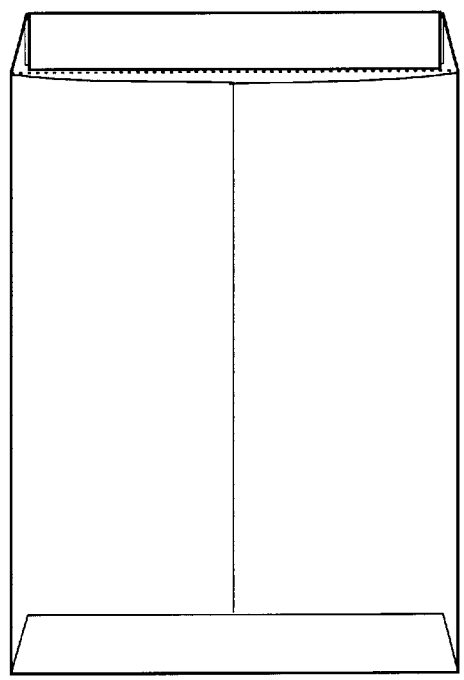

FIG. 45C: is a plan view of the envelope of FIG. 45B, further illustrating the first step of its configuration before use.

Figure 45D:
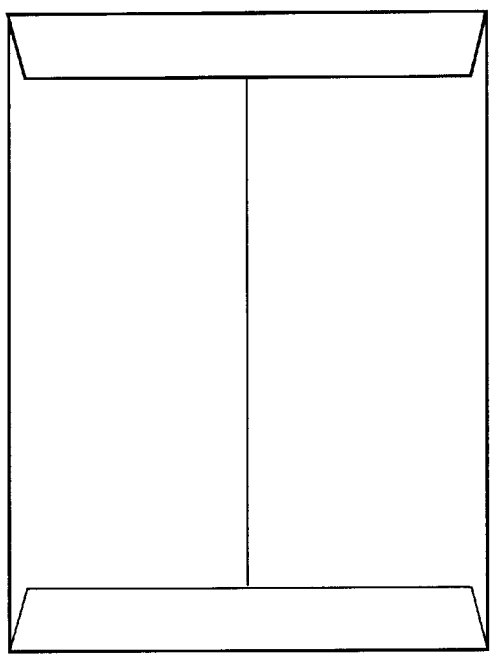

FIG. 45D: is a plan view of the envelope of FIG. 45C, showing its configuration before use.

Figure 45E:
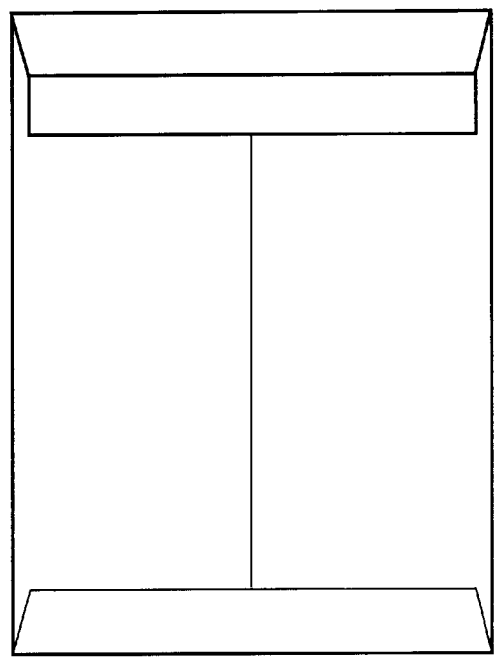

FIG. 45E: is a plan view of the envelope of FIG. 45D, further illustrating the envelope sealed.

Figure 46A:
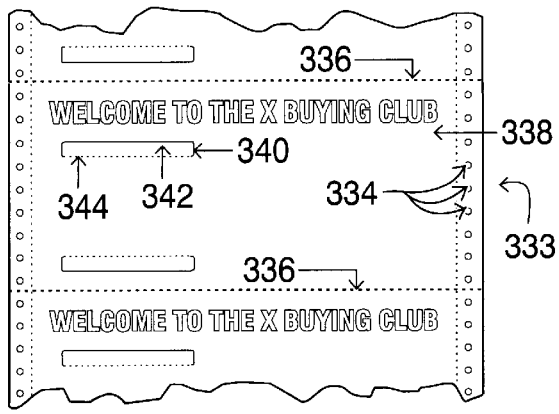

FIG. 46A: is a fragmentary plan view of a continuos assembly for carrying promotional cards, to be printed with customized information.

Figure 46B:
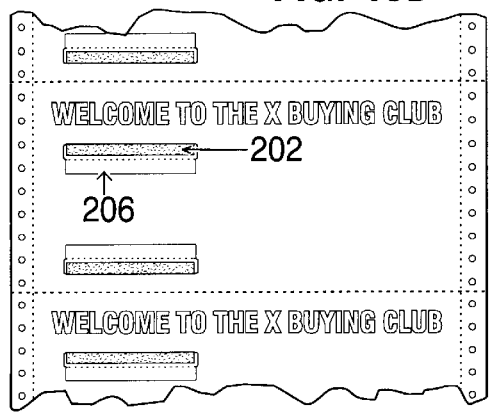

FIG. 46B: is a fragmentary plan view of the continuous assembly of FIG. 46A, further illustrating the layers used.

Figure 46C:
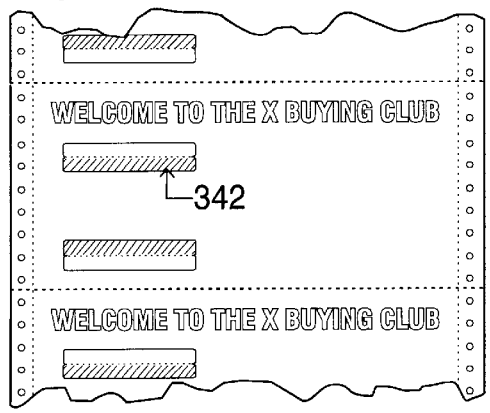

FIG. 46C: is a plan view of the continuous assembly of FIG. 46B, further illustrating its configuration before its use.

Figure 46D:
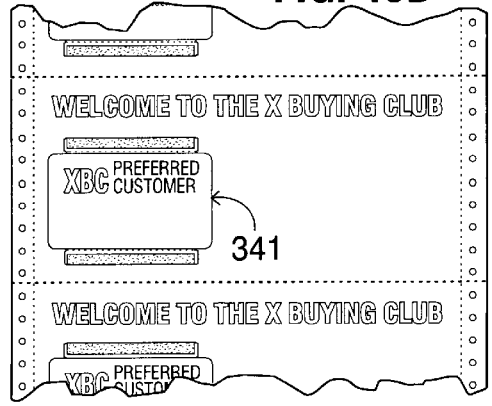

FIG. 46D: is a plan view of the continuous assembly of FIG. 46C, further illustrating the first stage of cards being attached to it.

Figure 46E:
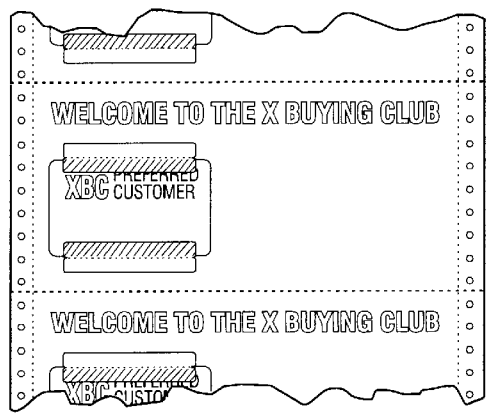

FIG. 46E: is a plan view of the continuous assembly of FIG. 46D, further illustrating the cards attached and secured.

Figure 46F:
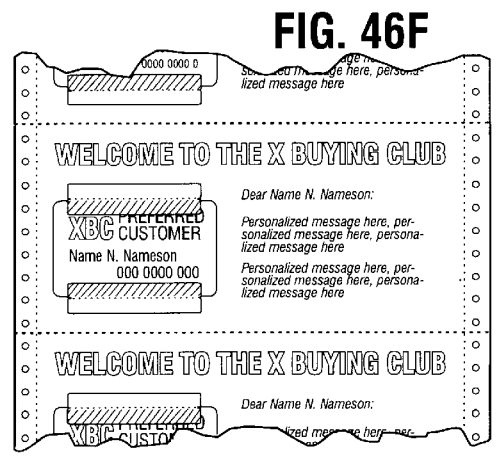

FIG. 46F: is a plan view of the of the continuous assembly and cards of FIG. 46E, after personalized printing.

Figure 46G:

FIG. 46G: is a card printed with customized information and detached from the assembly.

Figure 47A:
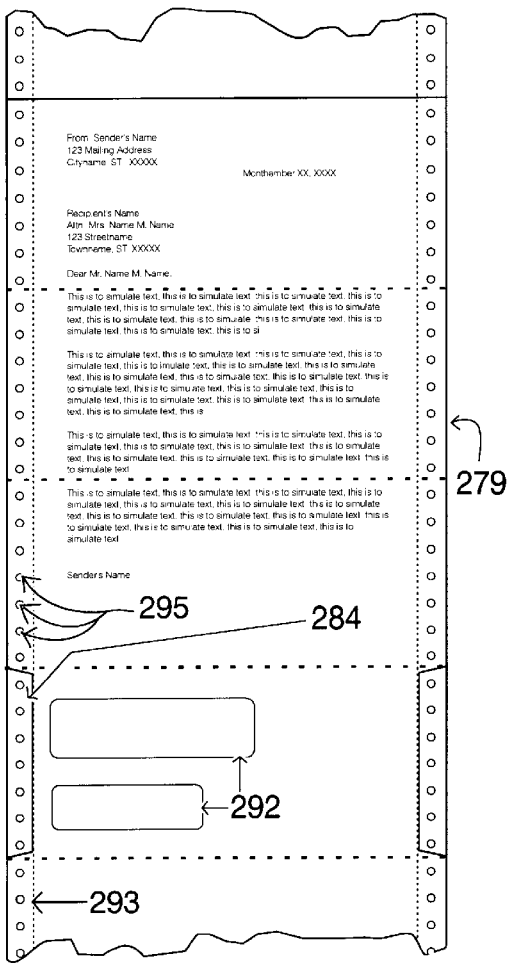

FIG. 47A is a fragmentary plan view of a continuous form assembly.

Figure 47B:
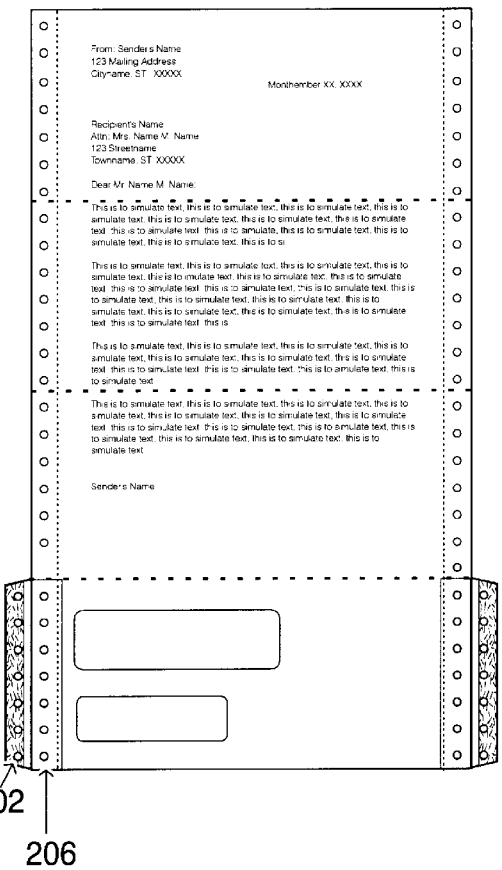

FIG. 47B: is a plan view of an individual form detached from assembly of FIG. 47A, illustrating the layers used.

Figure 47C:
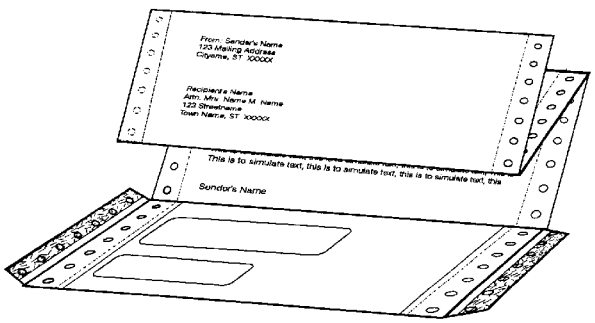

FIG. 47C: is a perspective view of the form of FIG. 47B, further illustrating the folding pattern for sealing the form.

Figure 47D:
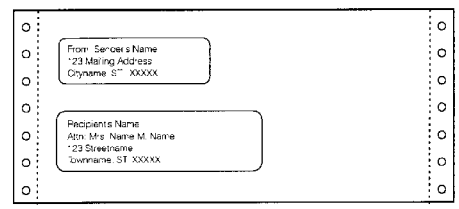

FIG. 47D: is a plan view of the form of FIG. 47C, further illustrating the form sealed.

Figure 47E:
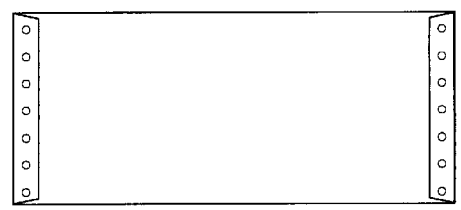

FIG. 47E: is a reverse plan view of the sealed form of FIG. 47D.

Figure 48A:
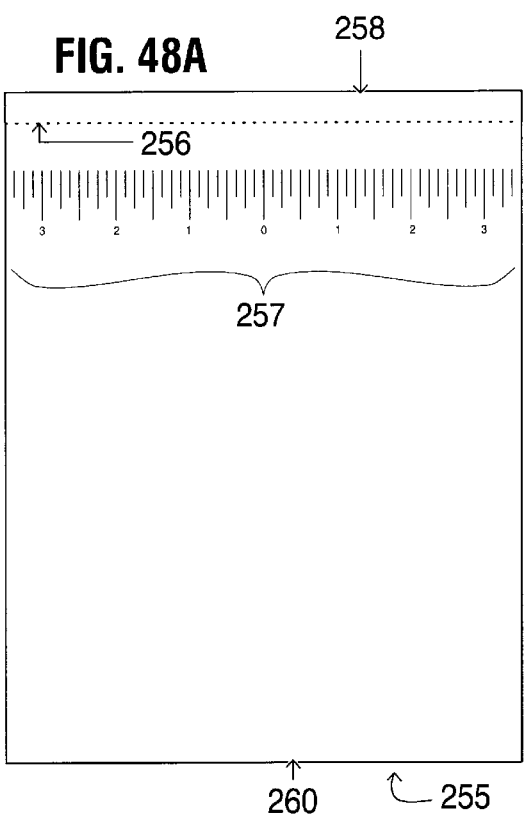

FIG. 48A: is a plan view of a forms carrier, having some printed guide lines.

Figure 48B:
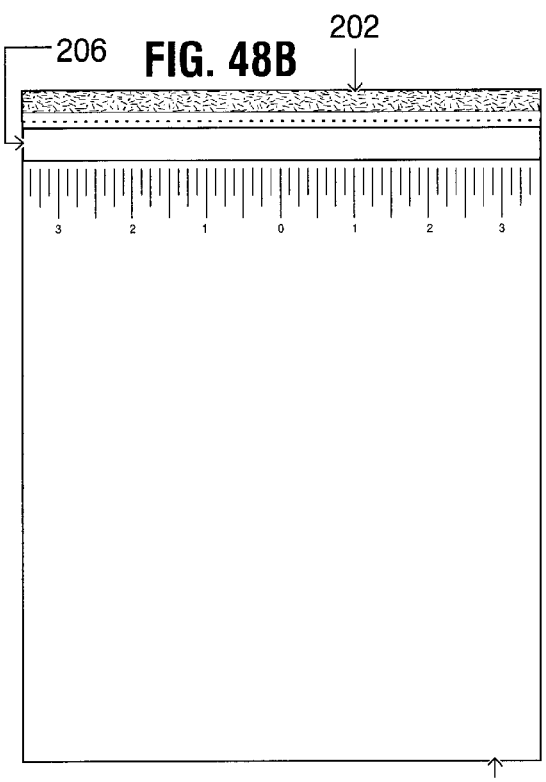

FIG. 48B: is a plan view of the forms carrier of FIG. 48A, further illustrating the layers used.

Figure 48C:
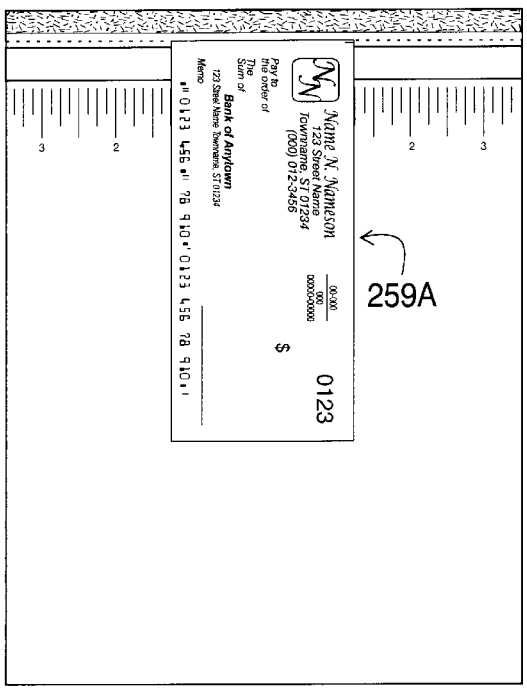

FIG. 48C: is a plan view of the forms carrier of FIG. 48B, further illustrating the positioning of a blank check for printing.

Figure 48D:
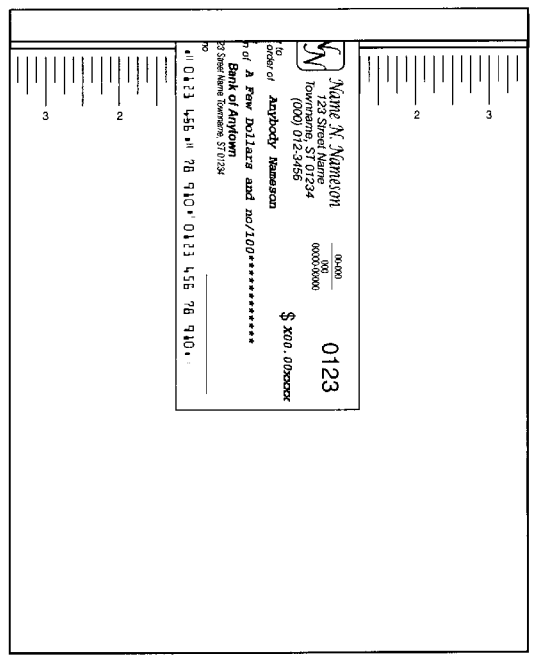

FIG. 48D: is a plan view of the forms carrier of FIG. 48C, further illustrating the check secured after printing has taken place.

Figure 49A:
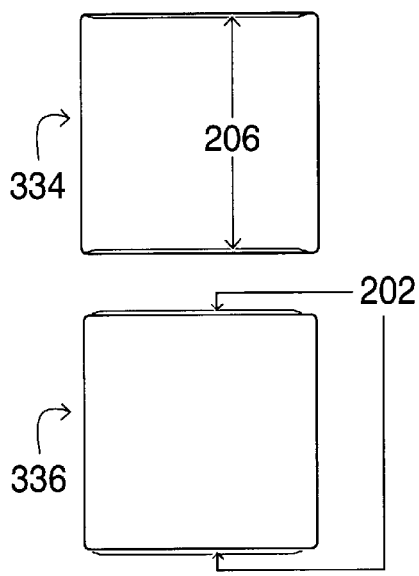

FIG. 49A: is a plan view of the two parts of a container showing the layers used.

Figure 49B:
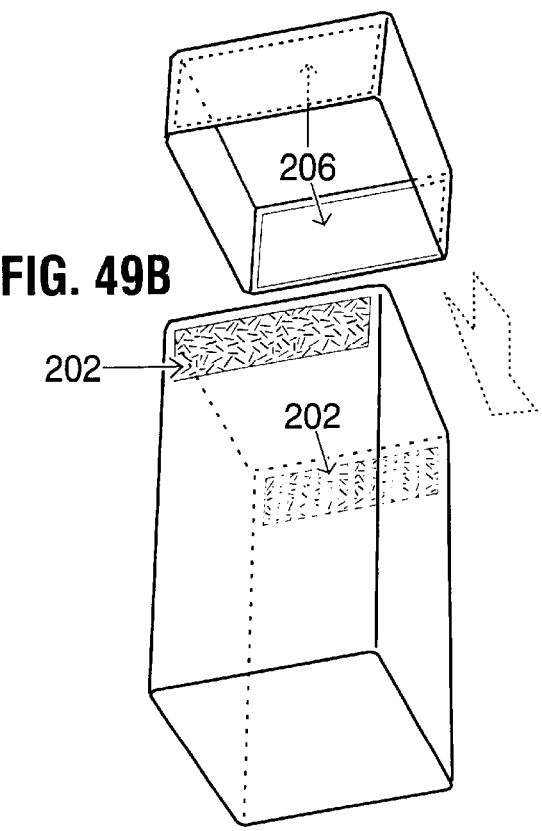

FIG. 49B: is a perspective view of the two parts of the container of FIG. 49A.

Figure 49C:
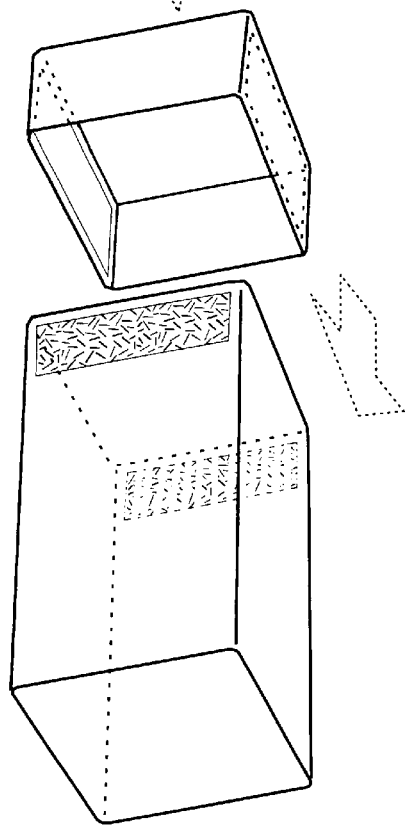

FIG. 49C: is a perspective view of the container of FIG. 49B, further indicating the rotation of the top part of the container.

Figure 49D:
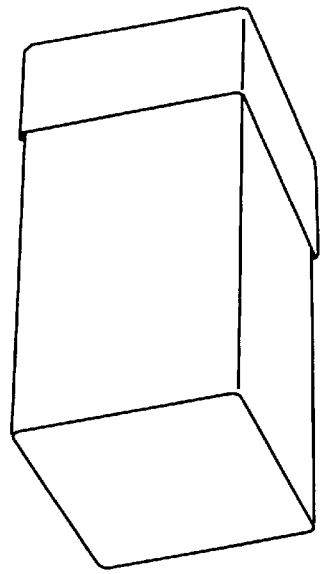

FIG. 49D: is a perspective view of the container of FIG. 49C further illustrating the container sealed.

REFERENCE NUMERALS IN DRAWINGS 202 fastener layer
204 optional and alternate lower strength fastener layer
206 fastener inhibitor layer

DETAILED DESCRIPTION OF THE DRAWINGS

FIGS. 1 through 16 inclusive illustrate the different layers and different pattern arrangements of the layers used to achieve different fastening effects that enable the production of multiple embodiments of this invention. It is to be understood that these pattern arrangements merely represent some examples. Different needs may require different patterns, and accordingly, a specific pattern or a combination of patterns will result obvious within the scope of this invention.

REFERRING TO FIG. 1: It shows in plan view a fastener layer 202, which as an example could be a pressure sensitive adhesive; a lower strength fastener layer 204, which as an example could be a lower strength pressure sensitive adhesive; and a fastener inhibitor layer 206, which as an example could be a release substance. Properties of fastener layers 202 and fastener inhibitor layers 206 may vary to suit different purposes, including the purpose of removably connecting a fastener layer 202 to a fastener inhibitor layer 206.

REFERRING TO FIG. 2: It shows in perspective view a singular fastener layer 202 on plane 201, facing a singular fastener inhibitor layer 206 on plane 203. In this and subsequent references, planes 201 and 203 represent a face or surface.

REFERRING TO FIG. 3: It shows in perspective view a sequence of fastener layers 202 alternated with fastener inhibitor layers 206 on plane 201, facing another sequence of fastener layers 202 alternated with fastener inhibitor layers 206 on plane 203, arranged so the fastener layers of one plane face the fastener inhibitor layers of the other plane and vice versa.

REFERRING TO FIG. 4: It shows in perspective view a fastener layer 202 parallel to a fastener inhibitor layer 206, on plane 201 facing another fastener layer 202, parallel to another fastener inhibitor layer 206 on plane 203, arranged so the fastener layer of one plane faces the fastener inhibitor layer of the other plane, and vice versa.

REFERRING TO FIG. 5: It shows in perspective view a sequence of fastener layers 202, alternated with fastener inhibitor layers 206, lower strength fastener layers 204, and a blank space on plane 201 facing another sequence of fastener layers 202, alternated with fastener inhibitor layers 206, lower strength fastener layers 204 and blank spaces on plane 203, arranged so the fastener layers of one plane face the fastener inhibitor layers of the other and vice versa and the lower strength fastener layers of one plane face the blank space(s) of the other and vice versa.

Figure 6:
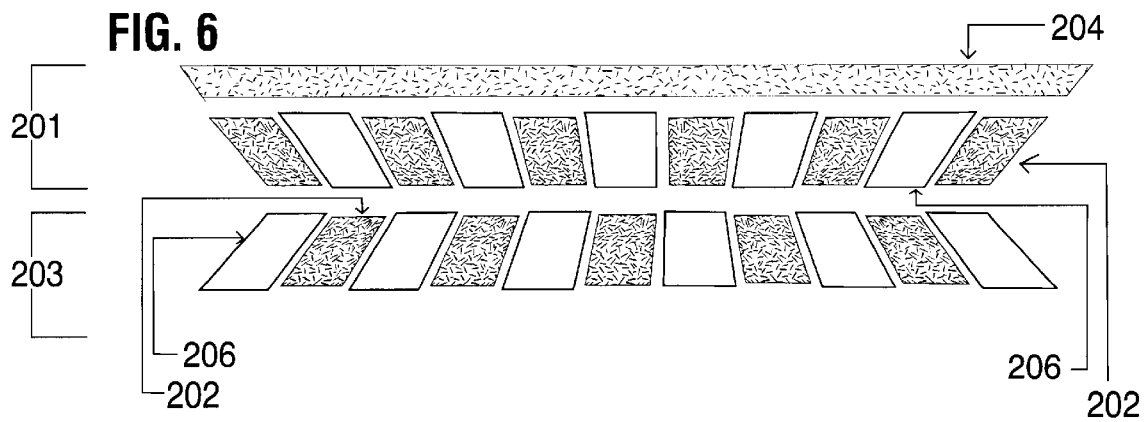
FIG. 6: is a perspective view of a pattern arrangement of layers.

REFERRING TO FIG. 6: It shows in perspective view a sequence of fastener layers 202 alternated with fastener inhibitor layers 206, and extending along this sequence, a lower strength fastener layer 204 on plane 201; facing a sequence of fastener layers 202 alternated with fastener inhibitor layers 206 on plane 203, and arranged so the fastener layers of one plane face the fastener inhibitor layers of the other plane and vice versa and the lower strength fastener of the plane 201 face the blank space on plane 203.

Figure 7:
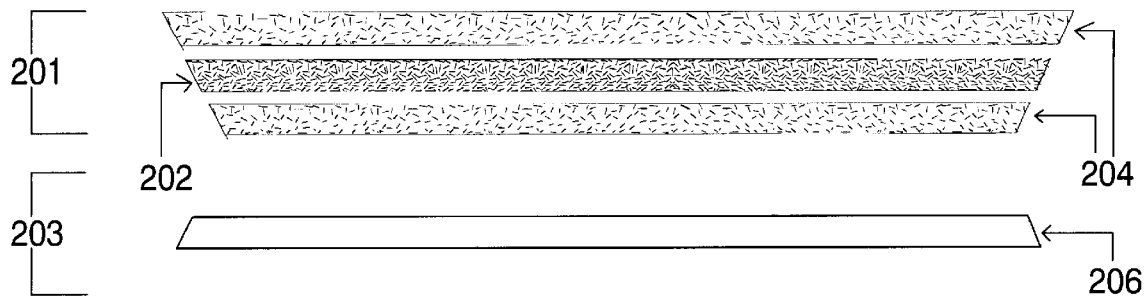
FIG. 7: is a perspective view of a pattern arrangement of layers.

REFERRING TO FIG. 7: It shows in perspective view a singular fastener layer 202, and two lower strength fastener layers 204 on plane 201; facing a singular fastener inhibitor layer 206 on plane 203, arranged so the fastener layer of plane 201 faces the fastener inhibitor layer of plane 203, and the lower strength fastener layers of plane 201 face the blank spaces on plane 203.

Figure 8:
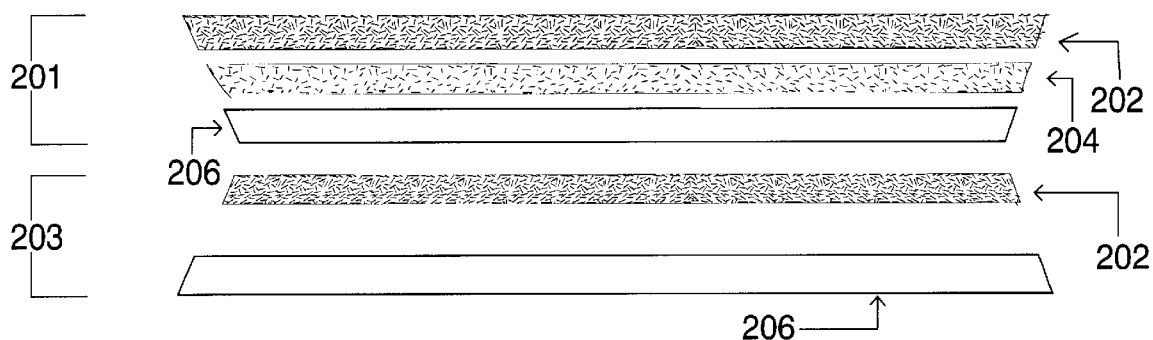
FIG. 8: is a perspective view of a pattern arrangement of layers.

REFERRING TO FIG. 8: It shows in perspective view a fastener layer 202 parallel to a lower strength fastener layer 204, parallel to a fastener inhibitor layer 206 on plane 201, facing a fastener layer 202 parallel to a fastener inhibitor layer 206 across a blank space on plane 203, arranged so the fastener layer of one plane faces the fastener inhibitor layer of the other and vice versa while the lower strength fastener on plane 201 faces the blank space on plane 203.

Figure 9:
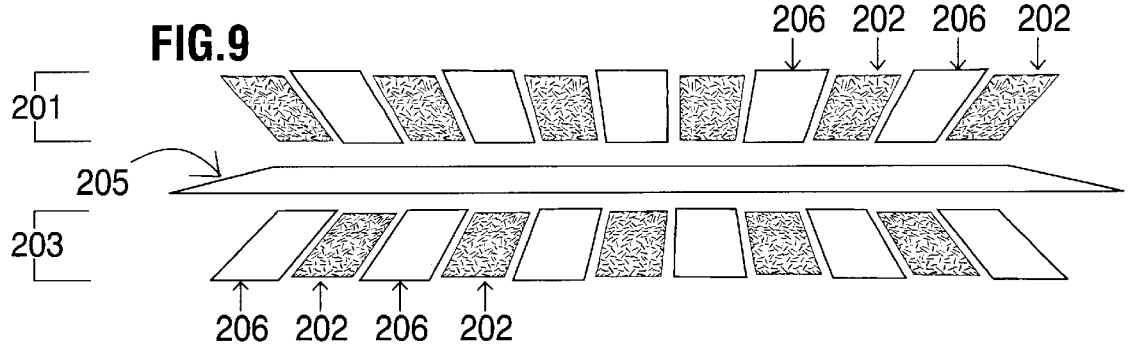
FIG. 9: is a perspective view of a pattern arrangement of layers.

REFERRING TO FIG. 9: It shows in perspective view a sequence of fastener layers 202 alternated with fastener inhibitor layers 206 on plane 201; a sequence of fastener layers 202 alternated with fastener inhibitor layers 206 on plane 203; arranged so the fastener areas of one plane face the fastener inhibitor areas of the other plane and vice versa and between them, plane 205, having two faces or surfaces without any layer, arranged in a sandwich like manner.

Figure 10:
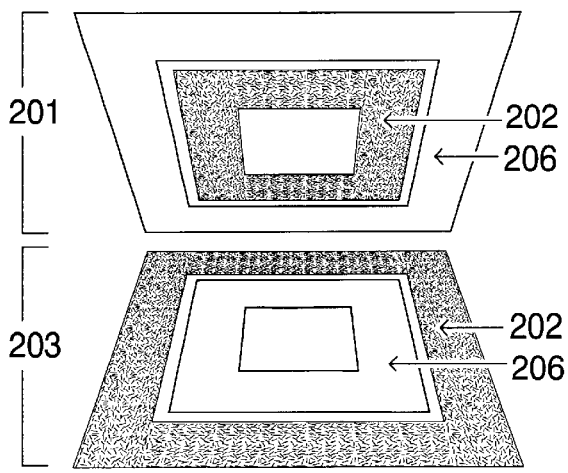
FIG. 10: is a perspective view of a pattern arrangement of layers.

REFERRING TO FIG. 10: It shows, in a perspective view a blank space surrounded by a rectangular frame shaped fastener layer 202, which is surrounded by a rectangular frame shaped fastener inhibitor layer 206 on plane 201, facing a blank space surrounded by a rectangular frame shaped fastener inhibitor layer 206, which is surrounded by a rectangular frame shaped fastener layer 202 on plane 203, arranged so the fastener areas of one plane face the fastener inhibitor of the other plane and vice versa.

Figure 11:
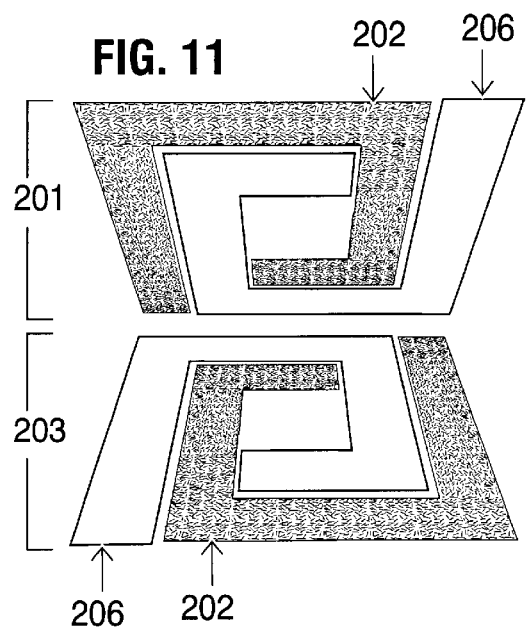
FIG. 11: is a perspective view of a pattern arrangement of layers.

REFERRING TO FIG. 11: It shows in a perspective view a blank space surrounded by a "p" shaped fastener layer 202, which interlocks with a "d" shaped fastener inhibitor layer 206 on plane 201, facing a blank space surrounded by a "p" shaped fastener inhibitor layer 206, which interlocks with a "d" shaped fastener layer 202 on plane 203, arranged so the fastener inhibitor layer of one plane faces the fastener inhibitor layer of the other plane and vice versa.

Figure 12:
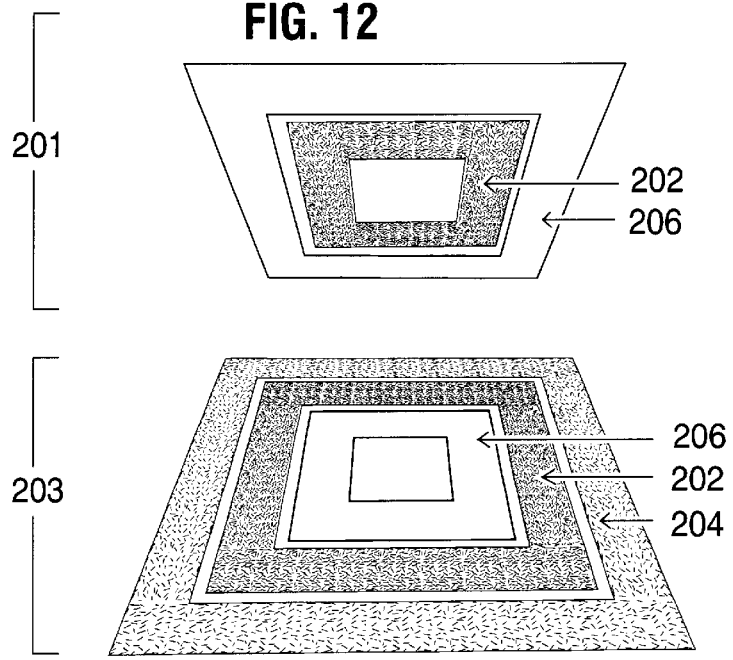
FIG. 12: is a perspective view of a pattern arrangement of layers.

REFERRING TO FIG. 12: It shows in a perspective view a blank space surrounded by a rectangular frame fastener layer 202, which is surrounded by a rectangular frame shaped fastener inhibitor layer 206 on plane 201, facing a blank space surrounded by a rectangular frame shaped fastener inhibitor layer 206, which is surrounded by a rectangular frame shaped fastener layer 202, which is surrounded by a rectangular frame shaped lower strength fastener layer 204 on plane 203; arranged so the fastener layer of one plane faces the fastener inhibitor layer of the other plane and vice versa while the lower strength fastener of plane 203 faces a blank area on plane 201.

Figure 13:
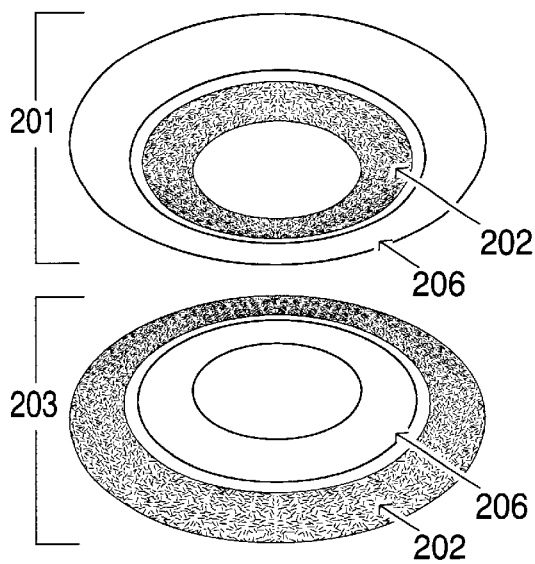
FIG. 13: is a perspective view of a pattern arrangement of layers.

REFERRING TO FIG. 13: It shows in a perspective view a blank space surrounded by an elliptical frame shaped fastener layer 202, which is surrounded by an elliptical frame shaped fastener inhibitor layer 206 on plane 201, facing a blank space surrounded by an elliptical frame shaped fastener inhibitor layer 206, which is surrounded by an elliptical frame shaped fastener layer 202 on plane 203; arranged so the fastener layer of one plane faces the fastener inhibitor layer of the other plane and vice versa.

Figure 14:
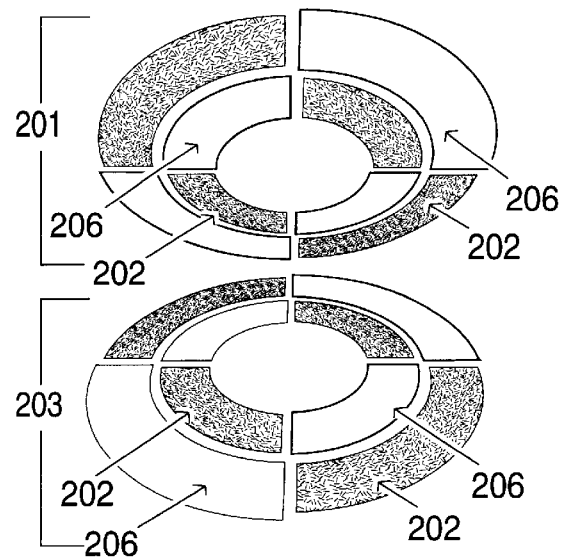
FIG. 14: is a perspective view of a pattern arrangement of layers.

REFERRING TO FIG. 14: It shows in a perspective view a blank space surrounded by two arcs of fastener layers 202 alternated by two arcs of fastener inhibitor layers 206 forming an elliptical shape and surrounded by a similar arrangement, forming an outer elliptical shape where the fastener layers and the fastener inhibitor layers are in an inverse position, on plane 201, facing a blank space surrounded by two arcs of fastener inhibitor layers 206, alternated by two arcs of fastener layers 202 forming an elliptical shape and surrounded by a similar arrangement forming an outer elliptical shape where the fastener inhibitor layers and the fastener layers are in an inverse position, on plane 203; arranged so the fastener layers of one plane face the fastener inhibitor layers of the other plane and vice versa.

Figure 15:
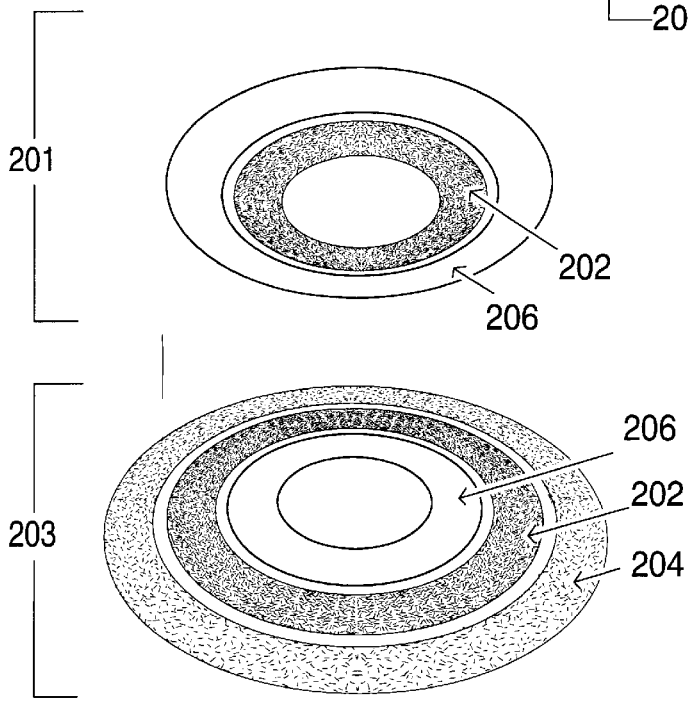
FIG. 15: is a perspective view of a pattern arrangement of layers.

REFERRING TO FIG. 15: It shows, in a perspective view a blank space surrounded by an elliptical frame shaped fastener layer 202, which is surrounded by an elliptical frame shaped fastener inhibitor layer 206 on plane 201, facing a blank space surrounded by an elliptical frame shaped fastener inhibitor layer 206, which is surrounded by an elliptical frame shaped fastener layer 202, surrounded by an elliptical frame shaped lower strength fastener layer 204 on plane 203, arranged so the fastener layers of one plane face the fastener inhibitor layers of the other plane and vice versa and the lower strength fastener layer of plane 203 faces a blank space on plane 201.

REFERRING TO FIG. 16: It shows in a perspective view a blank space surrounded by three fastener layers 202 alternated by three lower strength fastener layers 204, forming an elliptical shape, and surrounded by three fastener inhibitor layers 206, alternated by three blank spaces on plane 201; facing a blank space surrounded by three fastener inhibitor layers 206, alternated by three blank spaces, forming an elliptical shape, surrounded by three fastener layers 202 alternated by three lower strength fastener layers 204 forming an elliptical shape on plane 203; arranged so the fastener layers of one plane face the fastener inhibitor layers of the other plane and vice versa and the lower strength fastener layers of one plane face the blank spaces of the other plane and vice versa.

Figure 17:
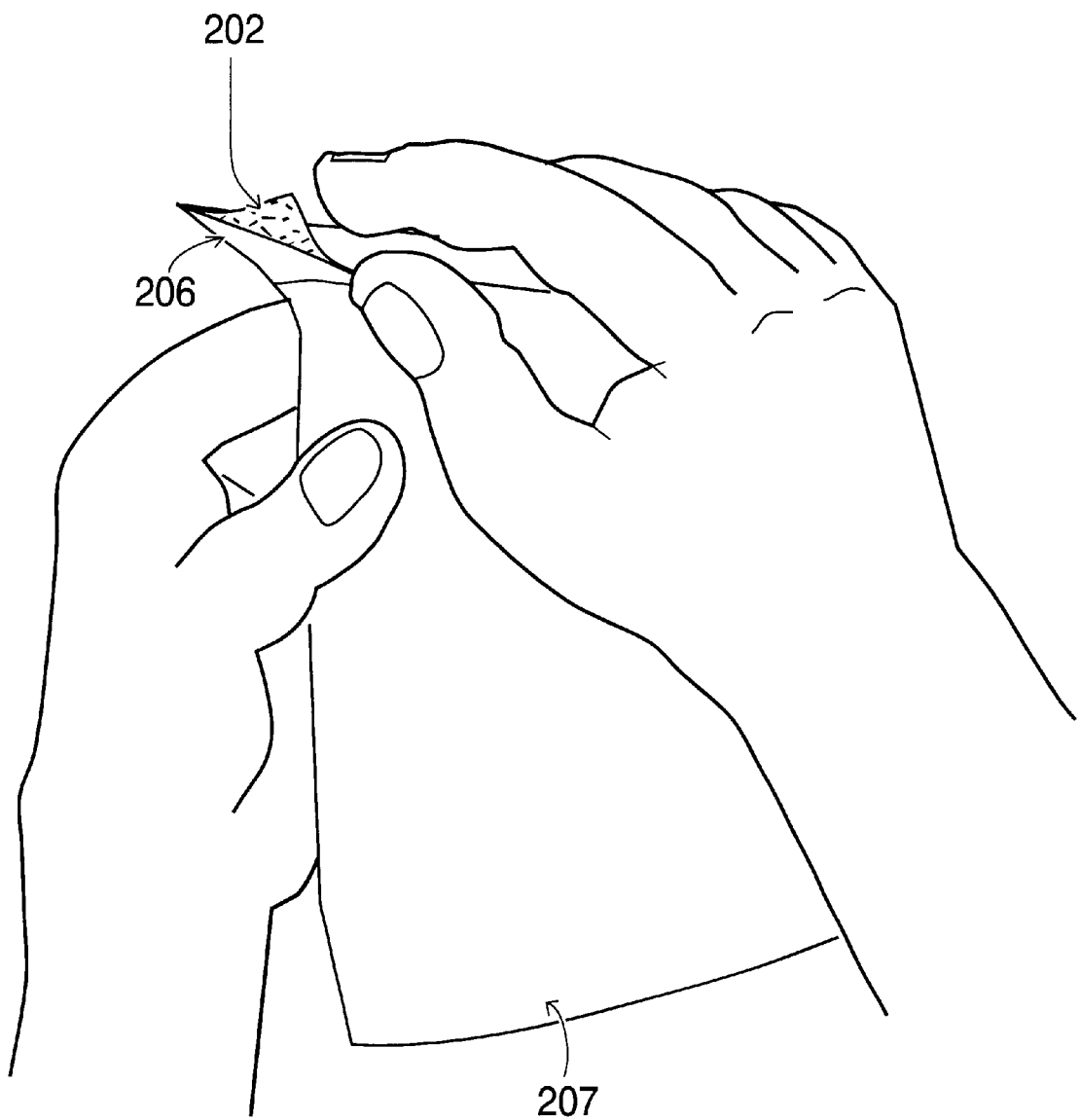
FIG. 17: is a perspective view illustrating the bending of a sheet material to separate surfaces temporarily fastened.

FIG. 17: It shows in perspective view the bending of a sheet material 207 for the easy separation of a portion coated with an adhesive substance 202 and a portion coated with an adhesive inhibitor substance 206, that had been temporarily fastened to one another.

EMBODIMENT EXAMPLES

It is to be understood that the described and illustrated embodiments merely represent some examples. After applying the principles described, and in combination with the multiple pattern arrangements of layers possible, illustrated with examples of FIGS. 2–16, and any combination thereof, other embodiments and combination of embodiments will result obvious within the scope of this invention.

Closely related embodiment figures have the same number but different alphabetic suffixes.

The meaning of the terms used in the description of embodiments is intended to be exemplifying, and by no means to be restrictively construed, as obvious equivalents may be applied and substitutions may take place within the scope of the invention.

For instance: "score" or "score lines" is an illustrative example of any means of weakening a sheet material for subsequent folding; "die cut" is an illustrative example of cutting a sheet material into a shape or to remove a shape out of a sheet material; "perforation lines" is an illustrative example of any means of weakening a sheet material for subsequent detachment of a portion thereof.

1st Embodiment Example

FIG. 18A through FIG. 18E inclusive illustrate in a progressive manner the application of this invention to produce a self sealing container, such as an envelope, making unnecessary the moistening of dry adhesives, or the affixing and subsequent removal of pressure sensitive adhesive protective liners.

REFERRING TO FIG. 18A: An envelope 207 is produced so it has a surface 208 acting as its front wall; across from score line 210 a flap 212 is divided in two sections 214 and 216 by score line 218.

REFERRING TO FIG. 18B: A sequence of adhesive layers 202 alternated by adhesive inhibitor layers 206 is applied to section 214. Another sequence of adhesive layers 202 alternated by adhesive inhibitor layers 206 is applied to a marginal portion of surface 208.

REFERRING TO FIG. 18C: Flap 212 is folded by score line 210, remaining unattached to surface 208 by the effect of the adhesive inhibitor layers, establishing thereby the configuration of the envelope before its use.

Figure 18D:
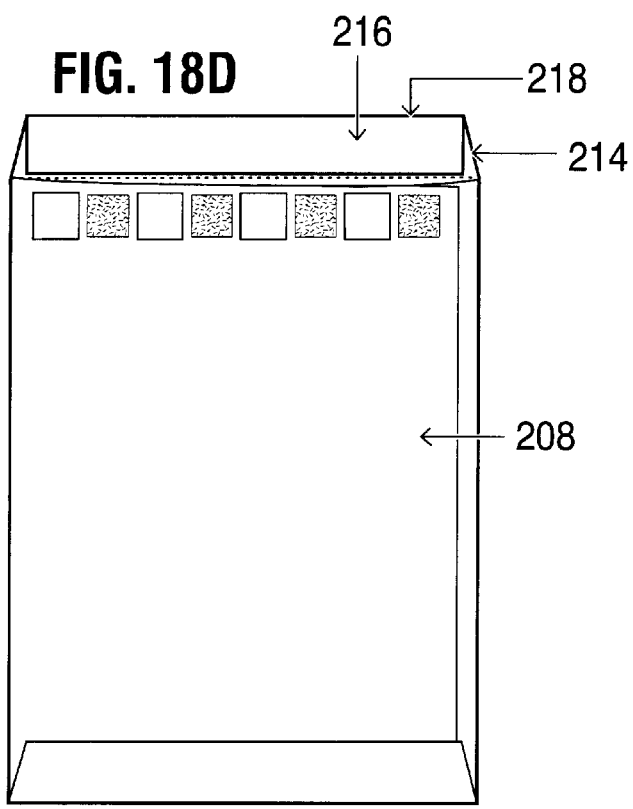
FIG. 18D: is a plan view of the envelope of FIG. 18C, further illustrating the first step of sealing.

REFERRING TO FIG. 18D: Section 216 is folded towards section 214 by score line 218, and its front connects to adhesive layers on section 214.

Figure 18E:
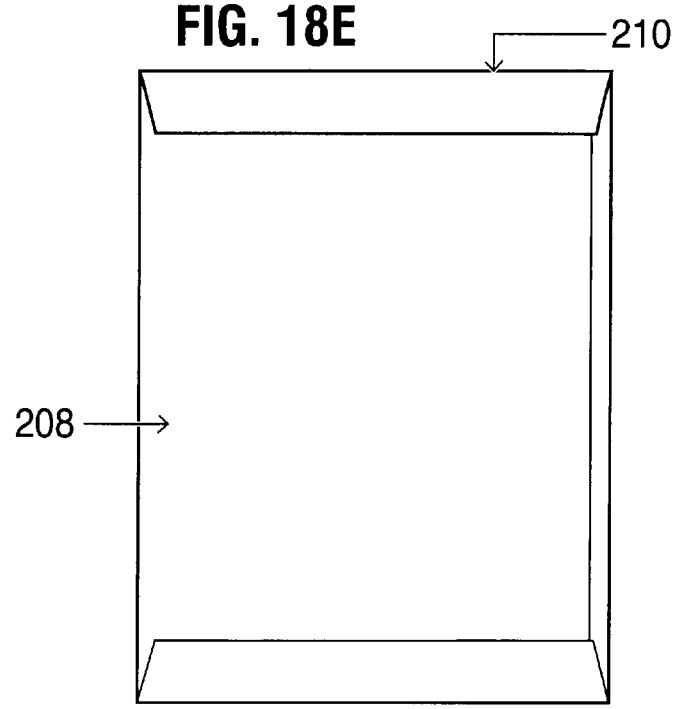
FIG. 18E: is a plan view of the envelope of FIG. 18D, further illustrating the second and final step of sealing.

REFERRING TO FIG. 18E: Sections 214 and 216 adhered together are folded across score line 210 towards the top marginal section of surface 208 connecting to the adhesive layers, sealing thereby the envelope.

2nd Embodiment Example

FIG. 19A through FIG. 19E inclusive illustrate in a progressive manner the application of this invention to produce a container, such as an envelope that is sealed by the insertion of an article, such as a message bearing sheet, which is discretionarily detachable.

Figure 19A:
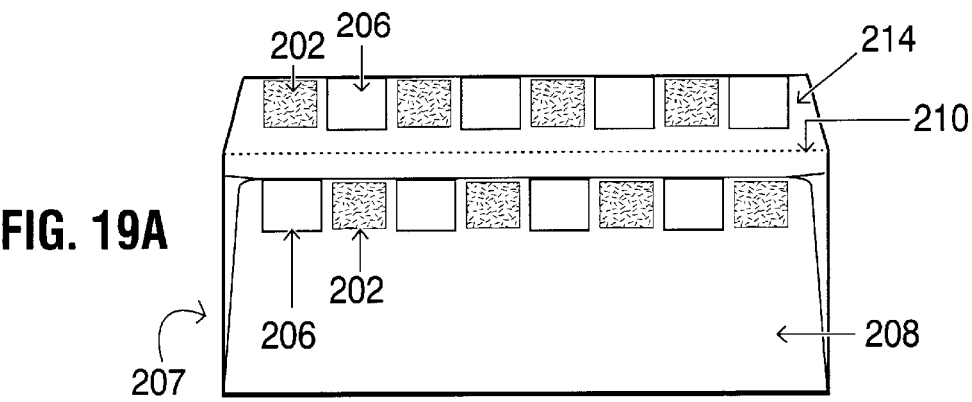
FIG. 19A: is a plan view of an envelope, illustrating the different layers used.

REFERRING TO FIG. 19A: An envelope 207 is produced so it has a surface 208 acting as one of its walls, having a flap 214 across score line 210. A sequence of adhesive layers 202 alternated by adhesive inhibitor layers 206 is applied to the flap and a similar sequence is applied to a marginal portion of surface 208.

Figure 19B:
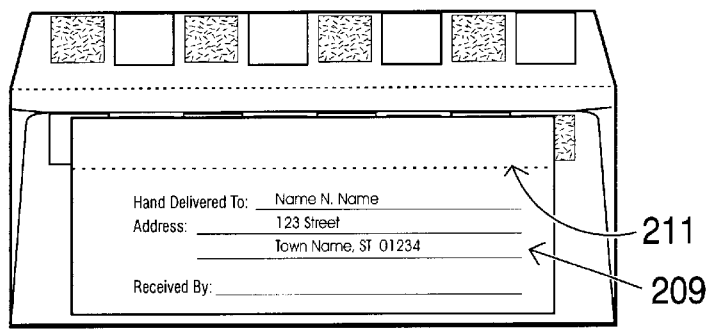
FIG. 19B: is a plan view of the envelope of FIG. 19A, further illustrating the attachment of a piece of paper to the envelope.

REFERRING TO FIG. 19B: A piece of paper 209 having a perforation line 211 containing a message is positioned so its back connects to the adhesive layers on surface 208.

Figure 19C:
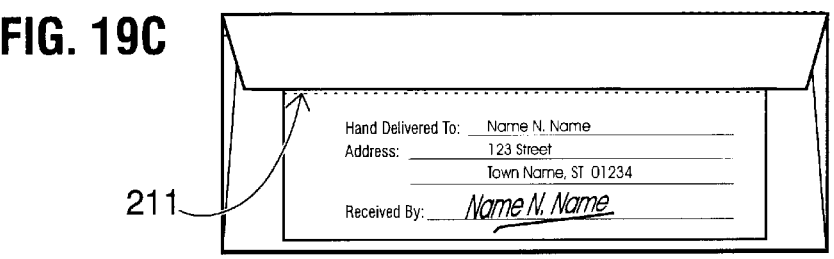
FIG. 19C: is a plan view of the envelope of FIG. 19B, further illustrating the sealing of the envelope, as the piece of paper remains attached to it.

REFERRING TO FIG. 19C: The flap is folded towards the piece of paper adhered to surface 208, so it adheres to the front side of said piece of paper, sealing the envelope and securing the piece of paper. Perforation line 211 is left outside for its detachment.

Figure 19D:
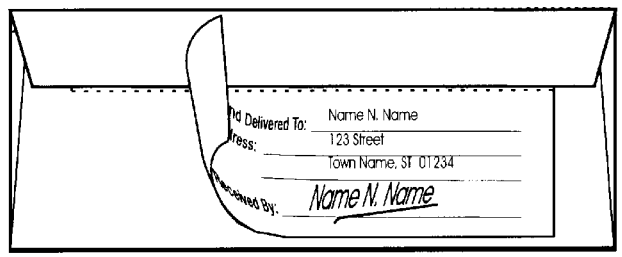
FIG. 19D: is a plan view of the envelope of FIG. 19C, further illustrating the detachment of the piece of paper.

REFERRING TO FIG. 19D: The piece of paper is being detached

Figure 19E:
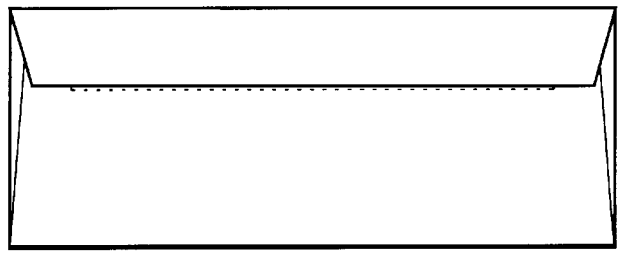
FIG. 19E: is a plan view of the envelope of FIG. 19D, further illustrating the envelope sealed and the piece of paper removed.

REFERRING TO FIG. 19E: The piece of paper is fully detached and envelope remains sealed.

3rd Embodiment Example

Figure 20A:
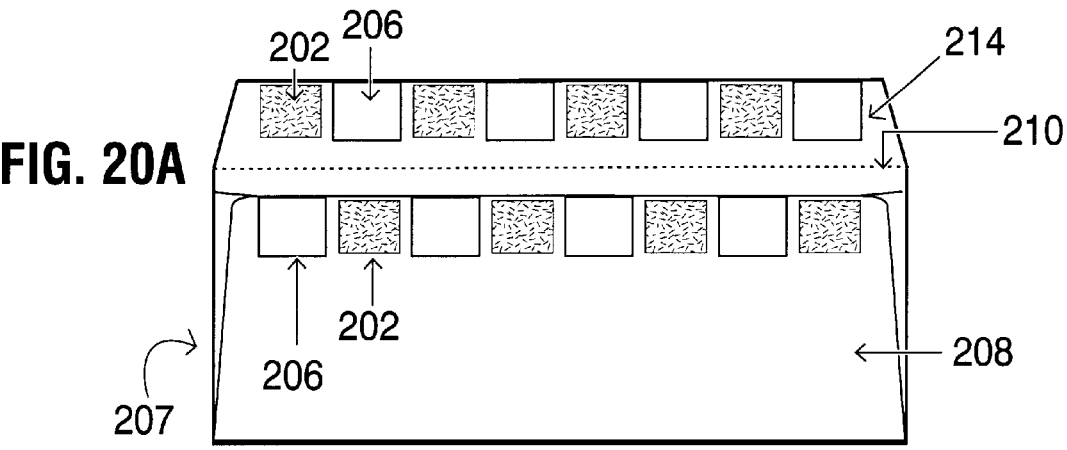
FIG. 20A: is a plan view of an envelope, illustrating the different layers used.
Figure 20B:
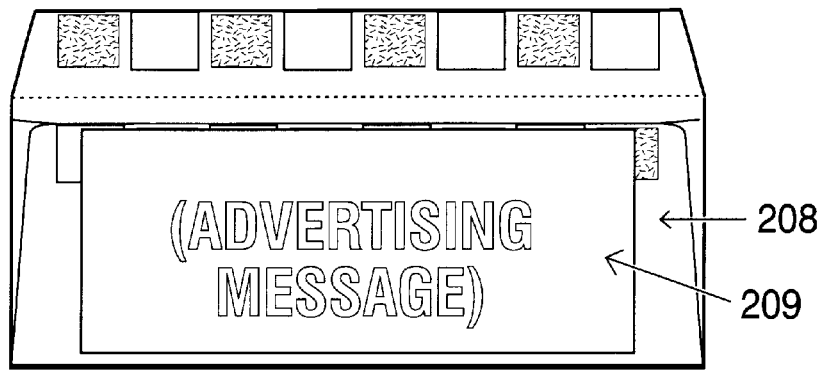
FIG. 20B: is a plan view of the envelope of FIG. 20A, further illustrating the attachment of a piece of paper to the envelope.
Figure 20C:
FIG. 20C: is a plan view of the envelope of FIG. 20B, illustrating the envelope sealed, and the piece of paper remaining attached to it.

FIG. 20A through FIG. 20C inclusive illustrate in a progressive manner the application of this invention to produce a self sealing container, such as an envelope, and also having an advertising message inserted thereto.

REFERRING TO FIG. 20A: An envelope 207 is produced so it has a surface 208, acting as one of its walls, and a flap 214 across score line 210. A sequence of adhesive layers 202 alternated by adhesive inhibitor layers 206 is applied to the flap and a similar sequence is applied to a marginal portion of surface 208.

REFERRING TO FIG. 20B: A piece of paper 209, containing an advertising message is positioned so its back connects to the adhesive layers on surface 208.

REFERRING TO FIG. 20C: The flap is folded towards the piece of paper, so it adheres to the front side of said piece of paper, sealing the envelope and securing the piece of paper thereto.

4th Embodiment Example

FIG. 21A through FIG. 21D inclusive illustrate in a progressive manner the application of this invention to produce a self sealing container such as an envelope, making unnecessary the moistening of dry adhesive coatings or the use of foreign liners.

Figure 21A:
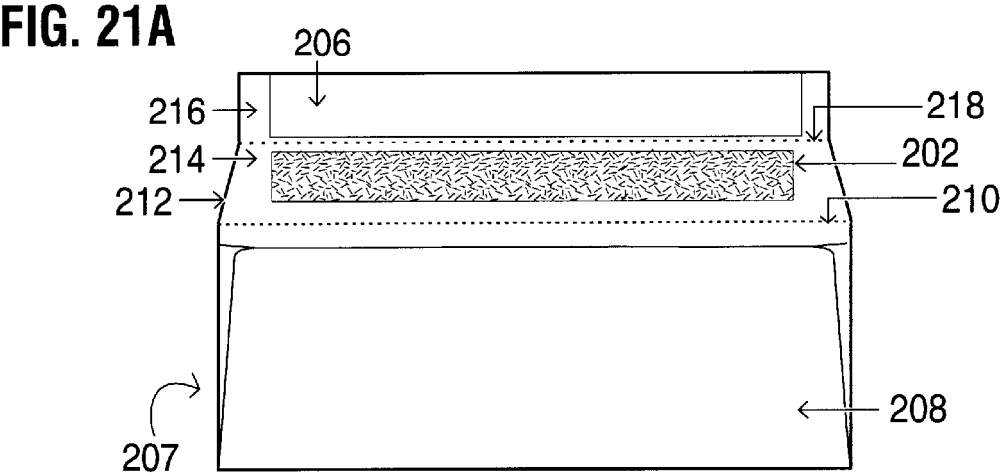
FIG. 21A: is a plan view of an envelope showing the different layers used.

REFERRING TO FIG. 21A: An envelope 207 is produced so it has a surface 208 acting as one of its walls, across from score line 210 a flap 212 is divided into sections 214 and 216 by perforation line 218. A Layer of adhesive 202 is applied to section 214. A layer of adhesive inhibitor 206 is applied to section 216.

Figure 21B:
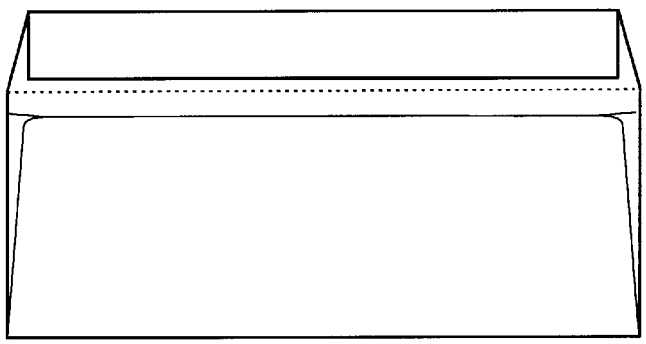
FIG. 21B: is a plan view of the envelope of FIG. 21A, further illustrating the first folding to produce the envelope's configuration before its use.

REFERRING TO FIG. 21B: Section 216 is folded towards section 214 remaining unattached due to the effect of the adhesive inhibitor.

Figure 21C:
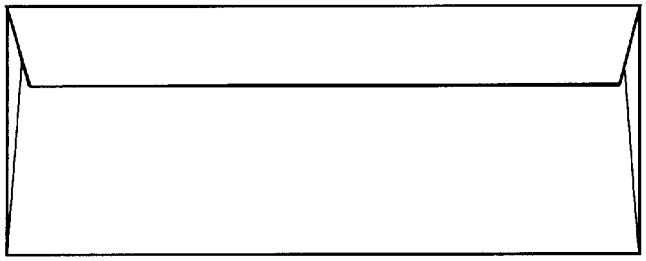
FIG. 21C: is a plan view of the envelope of FIG. 21B, further illustrating the envelope's configuration before its use.

REFERRING TO FIG. 21C: Sections 214 and 216 folded together are folded towards section 208, all sections remaining unattached, establishing thereby the configuration of the envelope before its use.

Figure 21D:
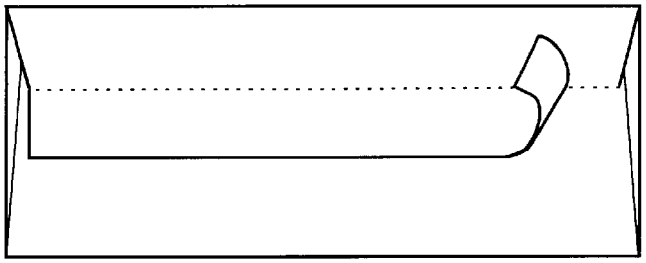
FIG. 21D: is a plan view of the envelope of FIG. 21C, further illustrating the sealing of the envelope, and the detachment of a portion of its flap.

REFERRING TO FIG. 21D: Section 216 is unfolded, exposing the adhesive on section 214, which attaches to section 208. Section 216 is removed at discretion of user by perforation lines.

5th Embodiment Example

FIG. 22A through FIG. 22E inclusive illustrate in a progressive manner the application of this invention to produce a self sealing container such as a box, acting as a security seal that would make evident any tampering with the packaging.

Figure 22A:
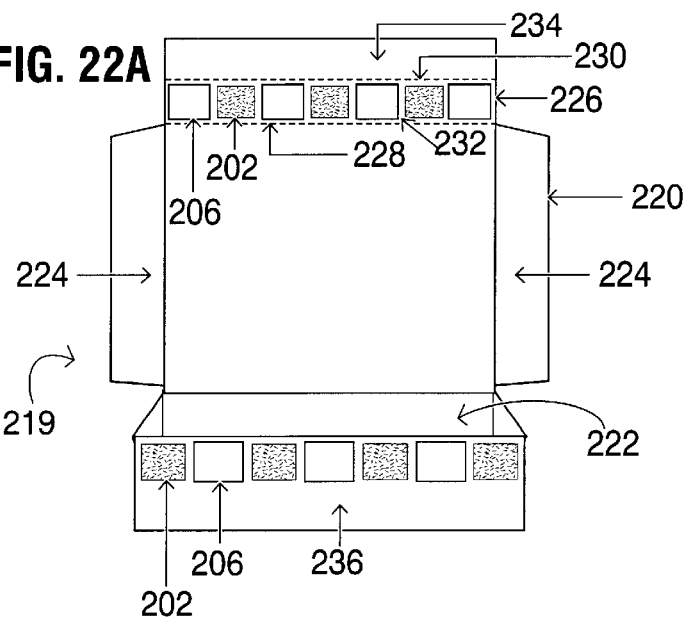
FIG. 22A: is an isometric frontal view of an open box illustrating the different layers used.

REFERRING TO FIG. 22A: A box 219 is produced so it has a lid 220, and a container 222. The lid has two side flaps 224 and a front flap 226, defined by score line 228. The front flap is divided by score line 230 into sections 232 and 234. A sequence of adhesive layers 202 alternated by adhesive inhibitor layers 206 is applied to section 232. The container 222 has a front or inner wall 236, which has a sequence of adhesive layers 202 alternated by adhesive inhibitor layers 206 on its upper half.

Figure 22B:
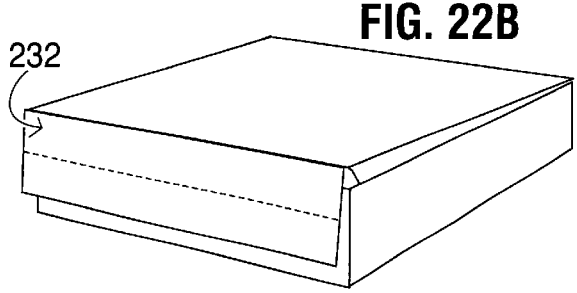
FIG. 22B: is a perspective view of the box of FIG. 22A, further illustrating the box's configuration before its use.

REFERRING TO FIG. 22B: The lid is folded towards container remaining section 232 unattached to the adhesive layers on wall 236 by the effect of the adhesive inhibitor layers, establishing thereby the configuration of the box before its use.

Figure 22C:
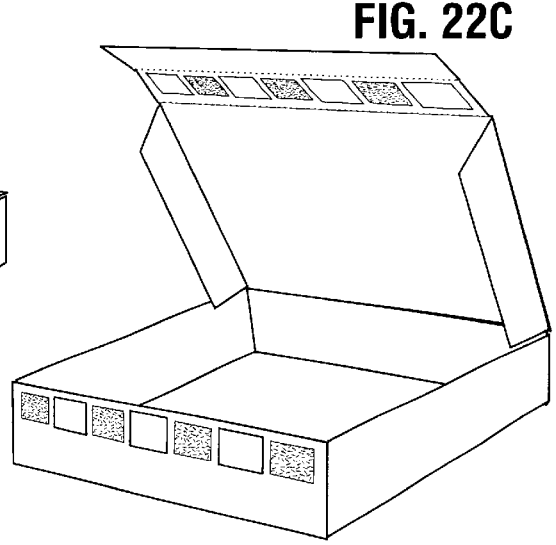
FIG. 22C: is a perspective view of the box of FIG. 22B, further illustrating the first step of the sealing of the box.

REFERRING TO FIG. 22C: The side flaps are folded, so they are oriented towards the inside of the container.

Figure 22D:
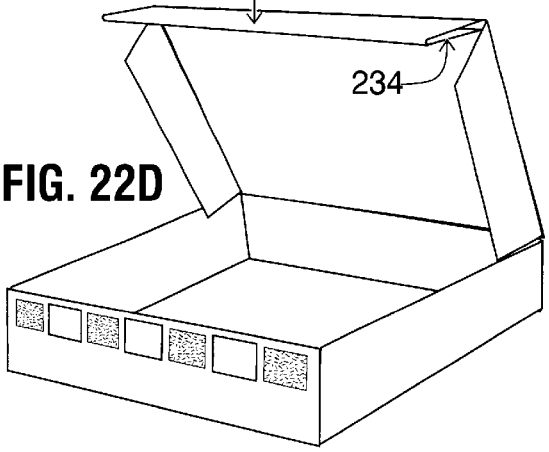
FIG. 22D: is a perspective view of the box of FIG. 22C, further illustrating the second step of the sealing of the box.

REFERRING TO FIG. 22D: Section 234 is folded, so it attaches to adhesive layers on section 232.

Figure 22E:
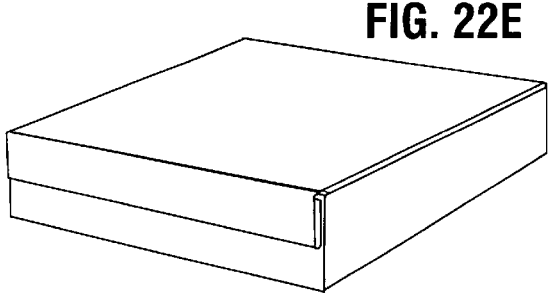
FIG. 22E: is a perspective view of the box of FIG. 22D, further illustrating the box sealed.

REFERRING TO FIG. 22E: The lid is folded towards container, so side flaps are fully inside it, back side of section 234 is applied against front panel so it attaches to adhesive layers, sealing the box.

6th Embodiment Example

FIG. 23A through FIG. 23D inclusive illustrate in a progressive manner the application of this invention to produce a self sealing wrap.

Figure 23A:
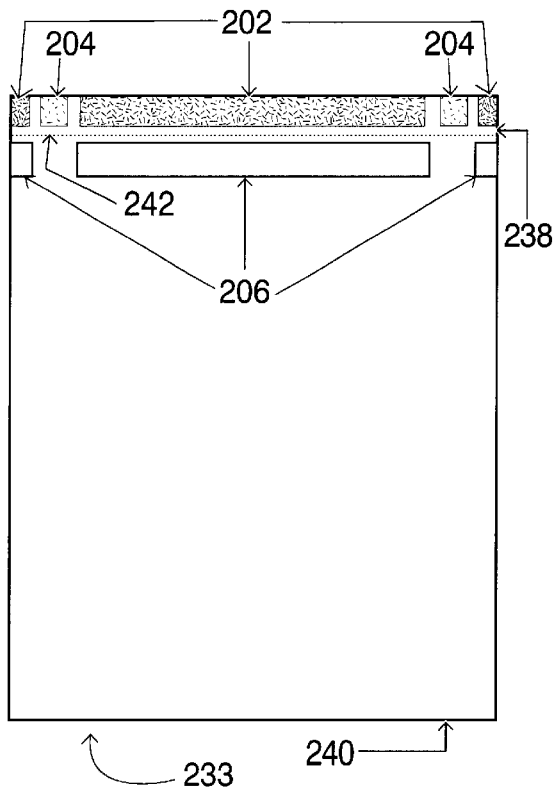
FIG. 23A: is a plan view of a piece of wrap material, illustrating the different layers used.

REFERRING TO FIG. 23A: A piece of a sheet material 233 is divided into two sections, 238 and 240 by score line 242. Layers of adhesive 202, and layers of lower strength adhesive 204 are applied to section 238. layers of adhesive inhibitor 206 are applied to a top marginal portion of section 240.

Figure 23B:
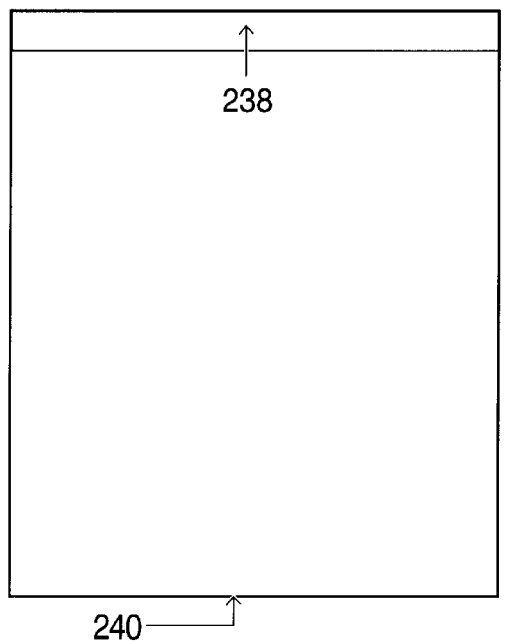
FIG. 23B: is a plan view of the wrap material of FIG. 23A, further illustrating its configuration before its use.

REFERRING TO FIG. 23B: Section 238 is folded towards section 240, being connected only by the lower strength adhesive layers, in a temporary manner, while adhesive layer remain unattached by effect of the adhesive inhibitor layers on section 240.

Figure 23C:
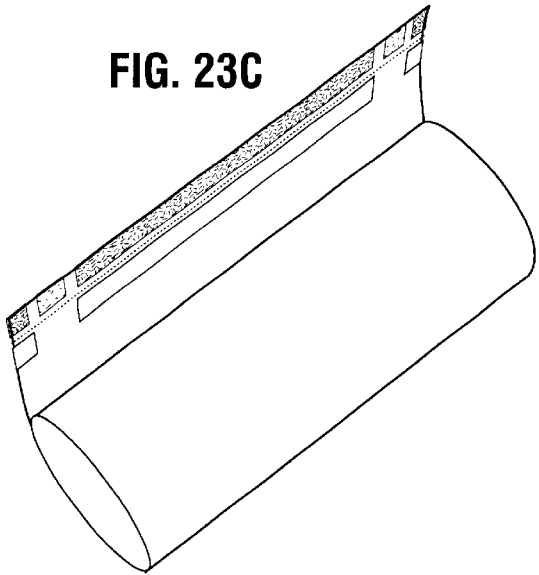
FIG. 23C: is an isometric view of the wrap material of FIG. 23B, further illustrating the first step of the sealing.

REFERRING TO FIG. 23C: Sections 238 and 240 are separated and sheet material is being rolled.

Figure 23D:
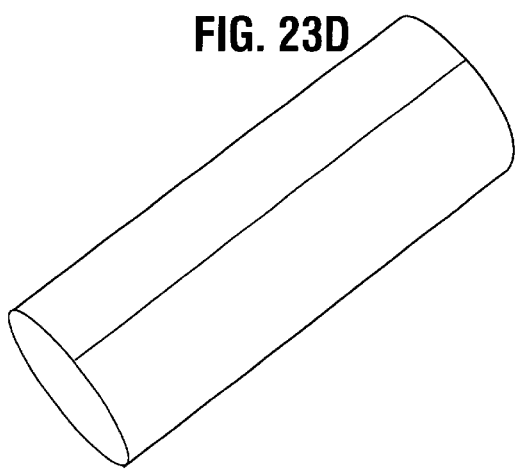
FIG. 23D: is an isometric view of the wrap material of FIG. 23C, further illustrating it after it has been sealed.

REFERRING TO FIG. 23D: Section 238 is connected to the back of section 240 by the action of the adhesive layers.

7th Embodiment Example

FIG. 24A through FIG. 24G inclusive, illustrate in a progressive manner the application of this invention to affix a shipment receipt card to an envelope.

Figure 24A:
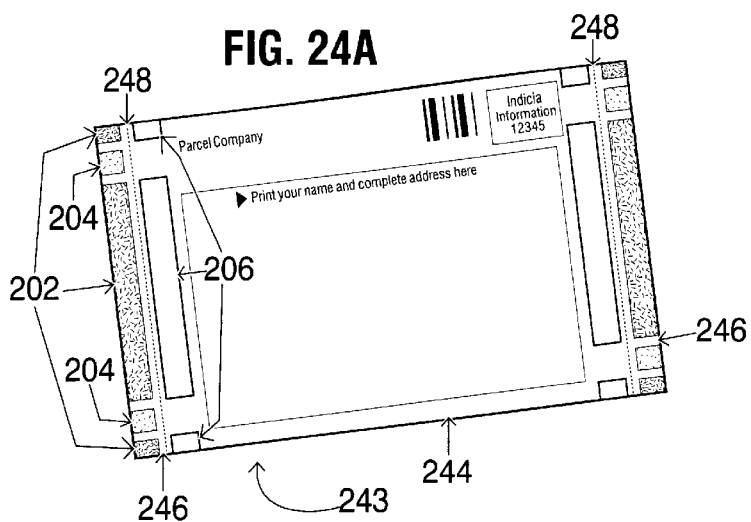
FIG. 24A: is a plan front view of a shipment receipt card, illustrating the layers used.

REFERRING TO FIG. 24A: A shipment or mailing receipt card 243 is divided into section 244 and sections 246 by perforation lines 248. Layers of adhesive 202 and layers of lower strength adhesive 204 are applied to sections 246. Layers of adhesive inhibitor 206 are applied to marginal portions of section 244.

Figure 24B:
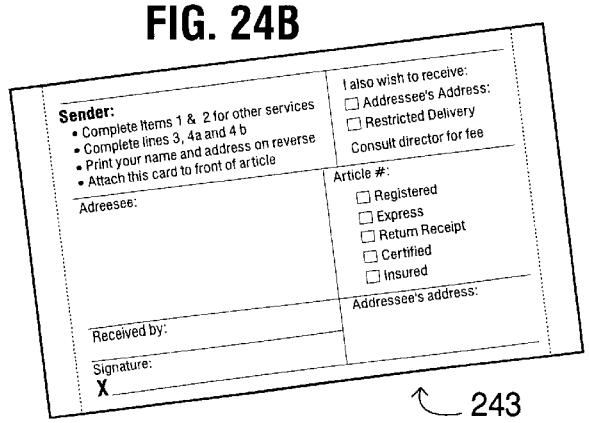
FIG. 24B: is a plan reverse view of the card of FIG. 24A.

REFERRING TO FIG. 24B: Reverse side of card 243 is shown.

Figure 24C:
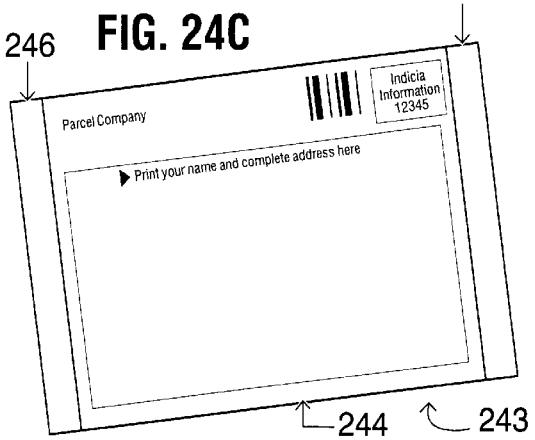
FIG. 24C: is a plan front view of the card of FIG. 24B, further illustrating its configuration before its use.

REFERRING TO FIG. 24C: Sections 246 are folded towards section 244, being connected only by the lower strength adhesive layers, until affixing the card is necessary, while adhesive layers remain unattached by effect of the adhesive inhibitor layers on section 244.

Figure 24D:
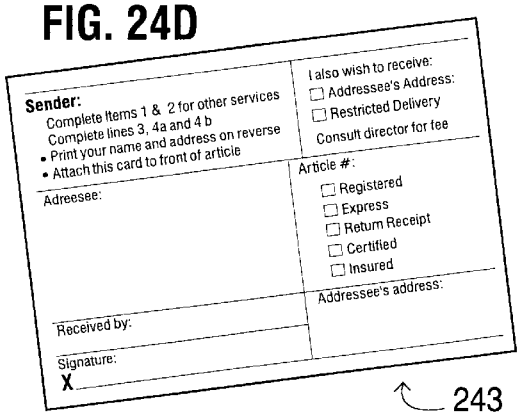
FIG. 24D: is a plan reverse view of the card of FIG. 24C.

REFERRING TO FIG. 24D: Reverse side of the card is illustrated, with sections 246 not visible due to their folding towards section 244.

Figure 24E:
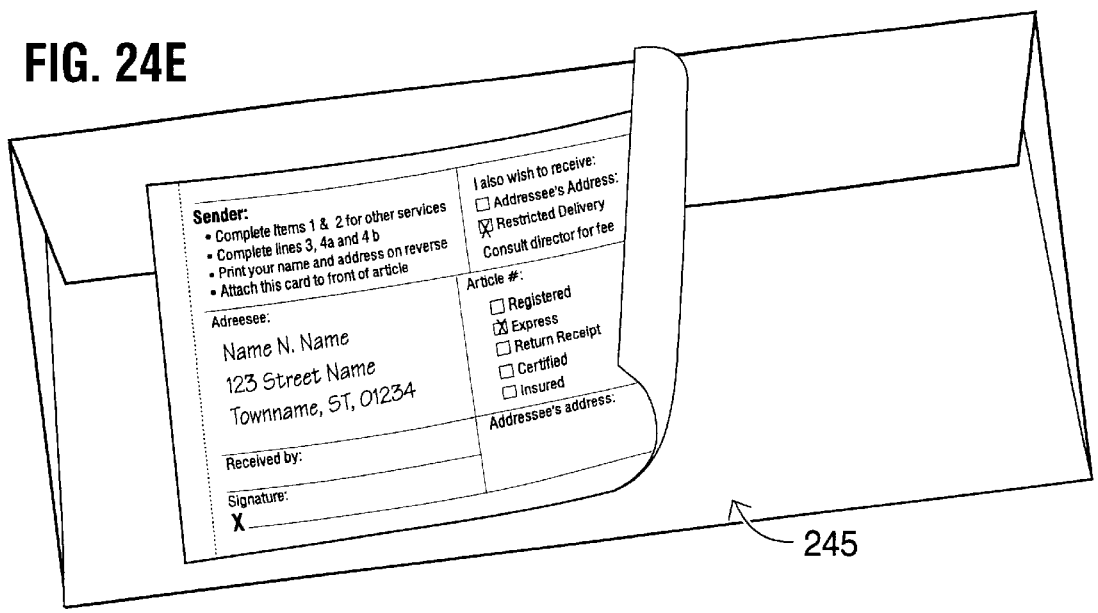
FIG. 24E: is a perspective view of the shipment card of FIG. 24D, also in reverse view being attached to an envelope.

REFERRING TO FIG. 24E: The receipt card is being affixed to an envelope 245.

Figure 24F:
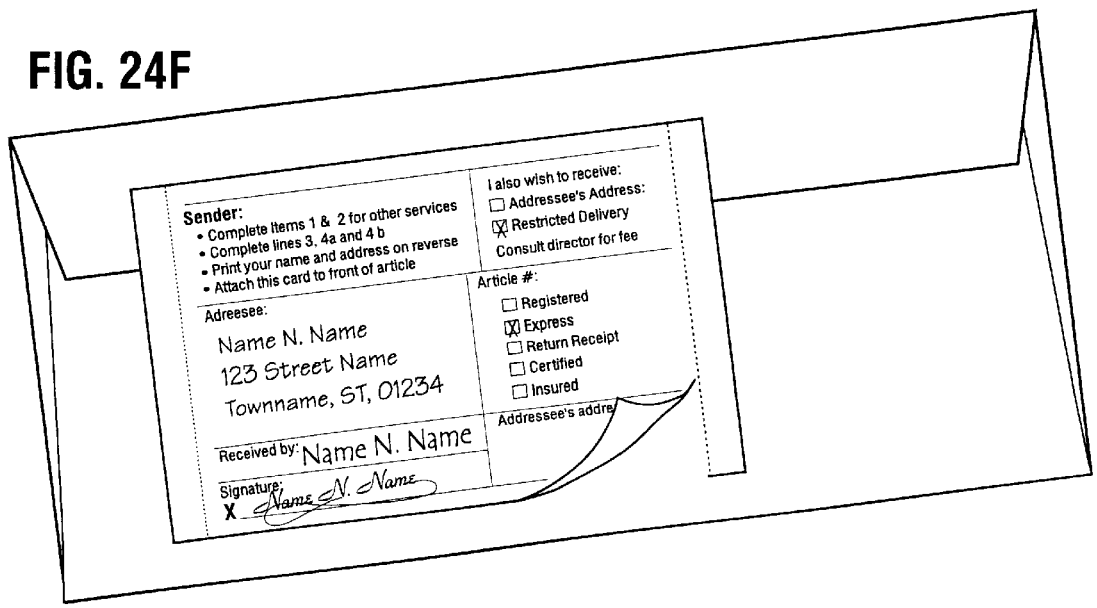

REFERRING TO FIG. 24F: Section 244 of the receipt card is being detached from the envelope by perforation lines.

Figure 24G:
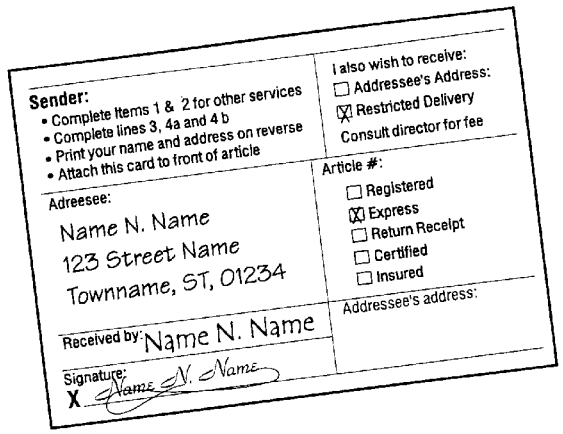
FIG. 24G: is a plan reverse view of the card of FIG. 24F, after it has been removed from the envelope.

REFERRING TO FIG. 24G: The card is fully detached from the envelope.

8th Embodiment Example

FIG. 25A through FIG. 25E inclusive, illustrate in a progressive manner the application of this invention to produce a money holding greeting card.

Figure 25A:
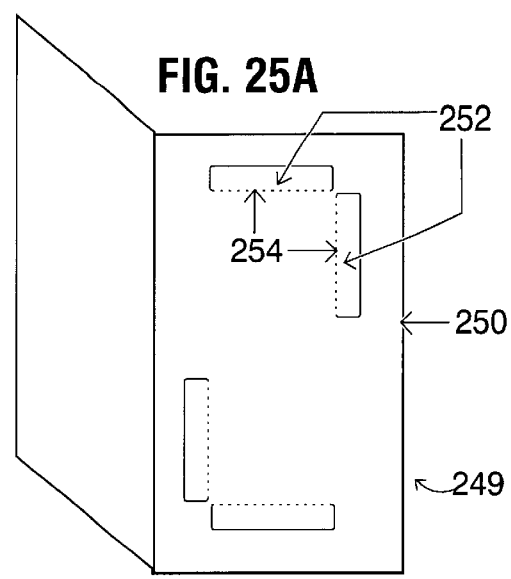
FIG. 25A: is an isometric view of a greeting card, illustrating incisions and score lines.

REFERRING TO FIG. 25A: A greeting card 249 has one of its two panels 250 with four incisions, creating flaps 252, which remain integral to the card respectively by sides 254, where respectively four score lines are applied.

Figure 25B:
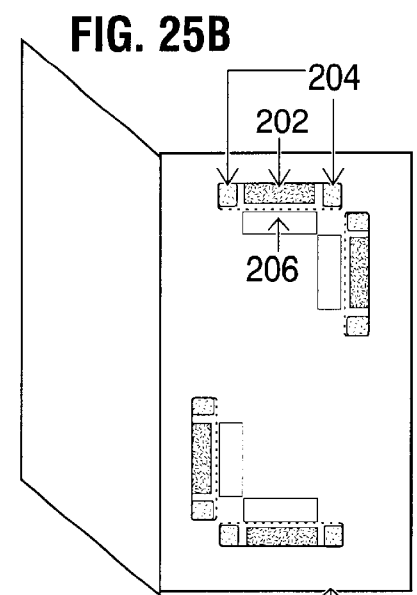
FIG. 25B: is an isometric view of the card of FIG. 25A, further illustrating the layers used.

REFERRING TO FIG. 25B: A layer of adhesive 202, and two layers of lower strength adhesive 204 are applied to each flap. Layers of adhesive inhibitor 206 are applied to panel 250 in front of each flap.

Figure 25C:
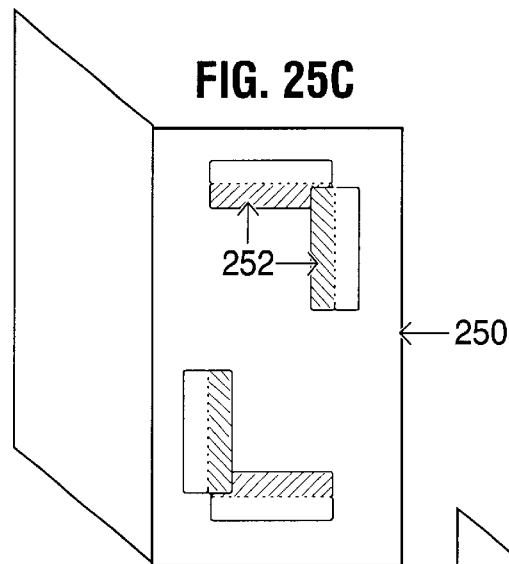
FIG. 25C: is an isometric view of the card of FIG. 25B, further illustrating its configuration before its use.

REFERRING TO FIG. 25C: The four flaps are folded on score lines towards the center of panel 250, connecting to it only by the lower strength adhesive layers, while adhesive layers remain unattached by effect of the adhesive inhibitor layers on panel 250, so the reverse of the flaps 252 are visible in the front, establishing thereby the configuration of the card before its use.

Figure 25D:
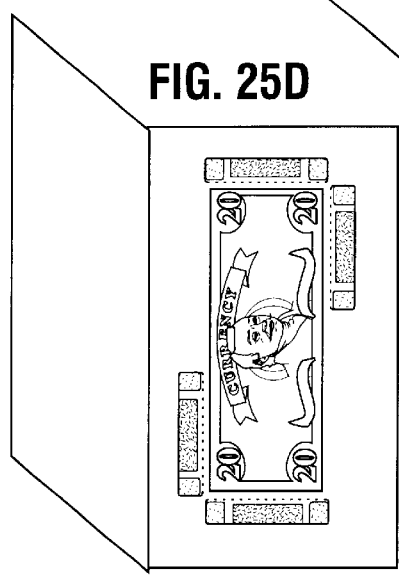
FIG. 25D: is an isometric view of the card of FIG. 25C, further illustrating the positioning of paper money.

REFERRING TO FIG. 25D: One or more bills are positioned within the angles created by the four flaps.

Figure 25E:
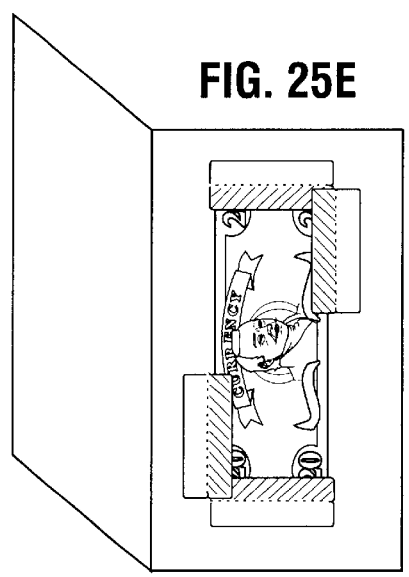
FIG. 25E: is an isometric view of the card of FIG. 25D, further illustrating the paper money secured.

REFERRING TO FIG. 25E: The four flaps are folded towards the center of the panel 250. The adhesive layers attach to the bills or checks, thereby securing them.

9th Embodiment Example

FIG. 26A through FIG. 26D inclusive illustrate in a progressive manner the application of this invention to produce a forms carrier to feed pieces of paper that are too small or too unsteady into printers, faxes, copiers, typewriters and other machines.

REFERRING TO FIG. 26A: The carrier 255 is produced by first having a piece of a sheet material divided by score line 256 into sections 258 and 260.

REFERRING TO FIG. 26B: A sequence of re-positionable adhesive layers 202 alternated by adhesive inhibitor layers 206 and discontinued only by three lower strength adhesive layers 204 is applied to section 258. A sequence of re-positionable adhesive layers 202 alternated by adhesive inhibitor layers 206 and discontinued only by three blank spaces is applied to section 260.

REFERRING TO FIG. 26C: Three rotary filing cards 259 are fastened to section 260 aligning with score line 256, for its feeding into a printer.

REFERRING TO FIG. 26D: Section 258 is folded towards the rotary filing cards, offering additional support. The rotary filing cards are shown after printing took place.

10th Embodiment Example

FIG. 27A through FIG. 27F inclusive illustrate in a progressive manner the application of this invention to produce a variation of the 9th embodiment example to feed sheet articles having a silhouetted shape through printers and other machines.

Figure 27A:
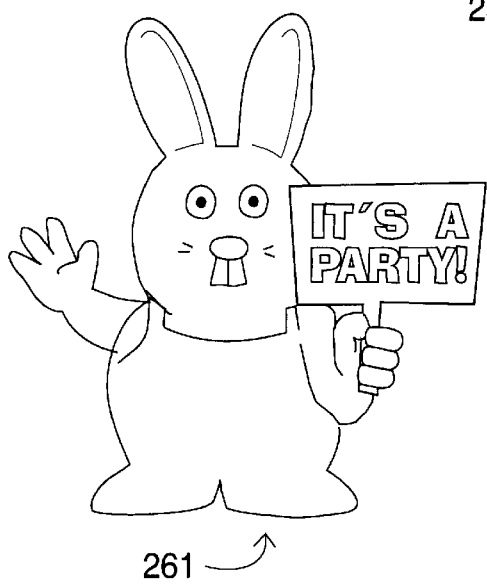
FIG. 27A: is a plan view of a die or otherwise cut invitation card having a silhouetted shape.

REFERRING TO FIG. 27A: A card 261 having a silhouetted shape is shown.

Figure 27B:
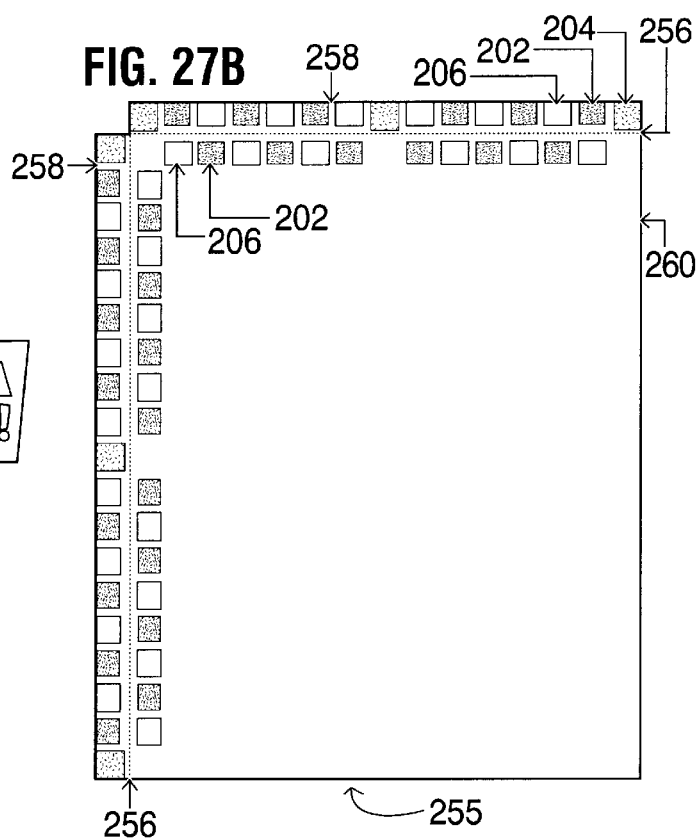
FIG. 27B: is a plan view of a form carrier illustrating the layers used.

REFERRING TO FIG. 27B: A carrier 255 as described in the 8th embodiment example, having similar arrangements of re-positionable adhesive layers 202 alternated by adhesive inhibitor layers 206 and discontinued only by three layers of lower strength adhesive 204 applied to each section 258, and across score lines 256, a sequence of re-positionable adhesive layers 202 alternated by adhesive inhibitor layers 206 and discontinued only by five blank spaces arranged in a right angle shape on section 260.

Figure 27C:
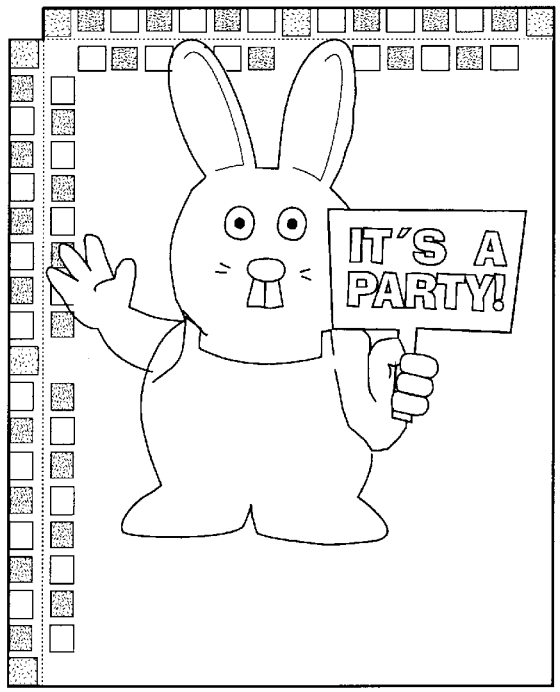
FIG. 27C: is a plan view of the invitation card of FIG. 27A, being secured to the forms carrier of FIG. 27B.

REFERRING TO FIG. 27C: The silhouetted card is fastened to section 260, aligning with score lines 256.

Figure 27D:
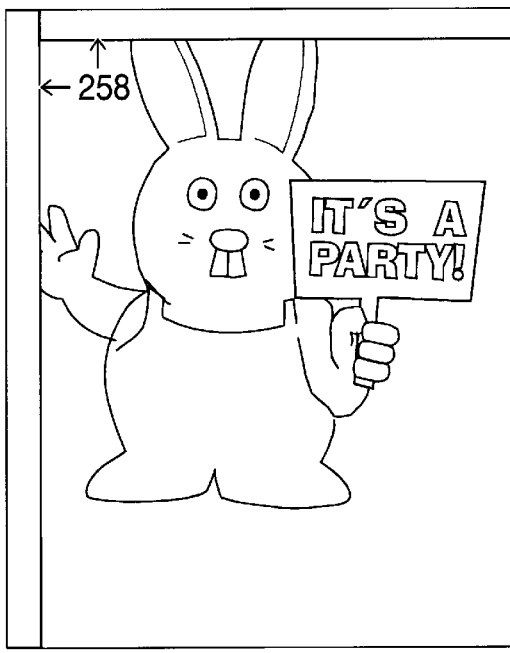
FIG. 27D: is a plan view of the card and carrier of FIG. 27C, further illustrating the card secured.

REFERRING TO FIG. 27D: Sections 258 are folded towards section 260, securing the card, for feeding into the printer.

Figure 27E:
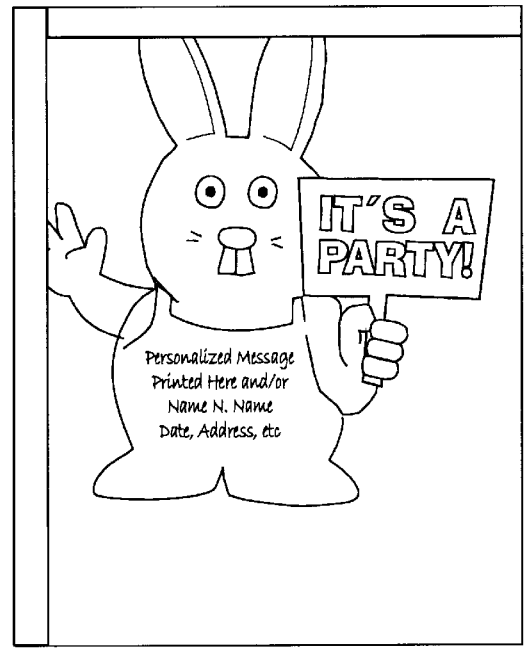
FIG. 27E: is a plan view of the card and carrier of FIG. 27D, further illustrating the card printed.

REFERRING TO FIG. 27E: Card is printed.

Figure 27F:
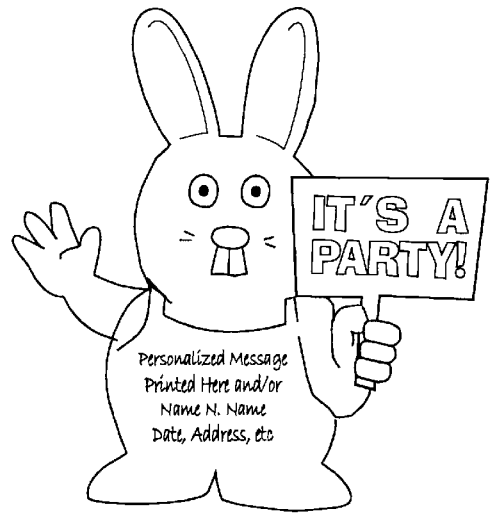
FIG. 27F: is a plan view of the card of FIG. 27E printed and removed from the forms carrier.

REFERRING TO FIG. 27F: Printed card is removed from carrier.

11th Embodiment Example

FIG. 28A through FIG. 28E inclusive illustrate in a progressive manner the application of this invention to produce a self contained binder.

Figure 28A:
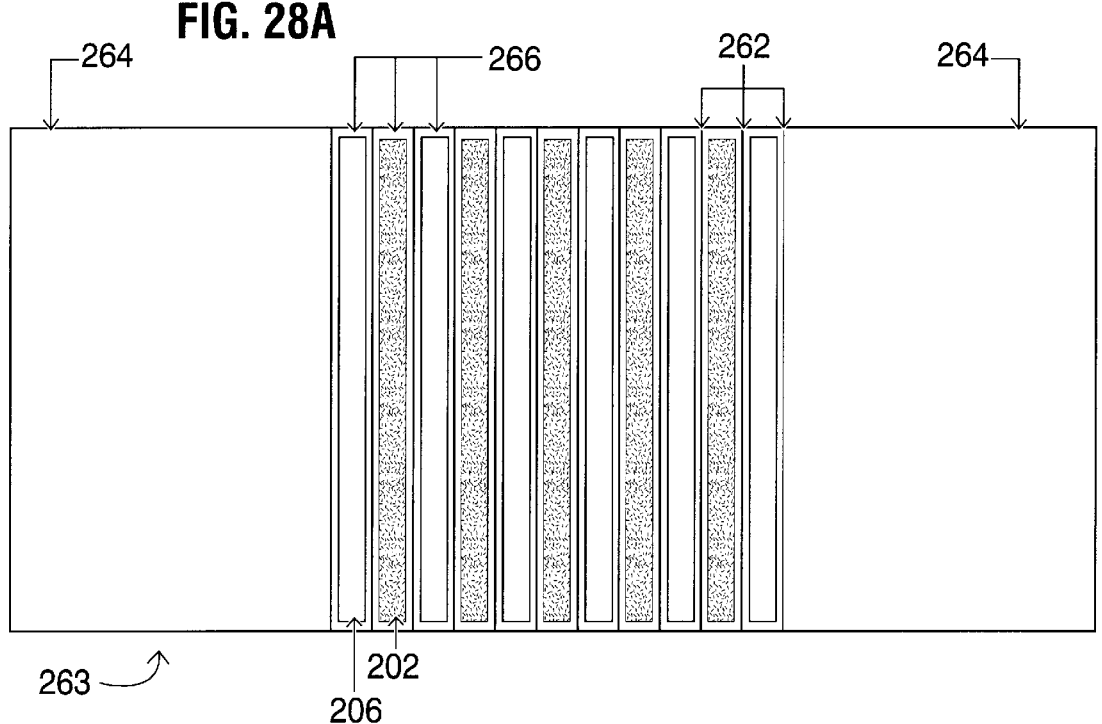
FIG. 28A: is a plan view of the interior of a binder, illustrating the layers used.

REFERRING TO FIG. 28A: Assembly 263 is made of a piece of sheet material or a flat flexible material having score lines or folding guides 262, defining thereby covers 264, and panels 266, where re-positionable adhesive layers 202 and adhesive inhibitor layers 206 are applied.

Figure 28B:
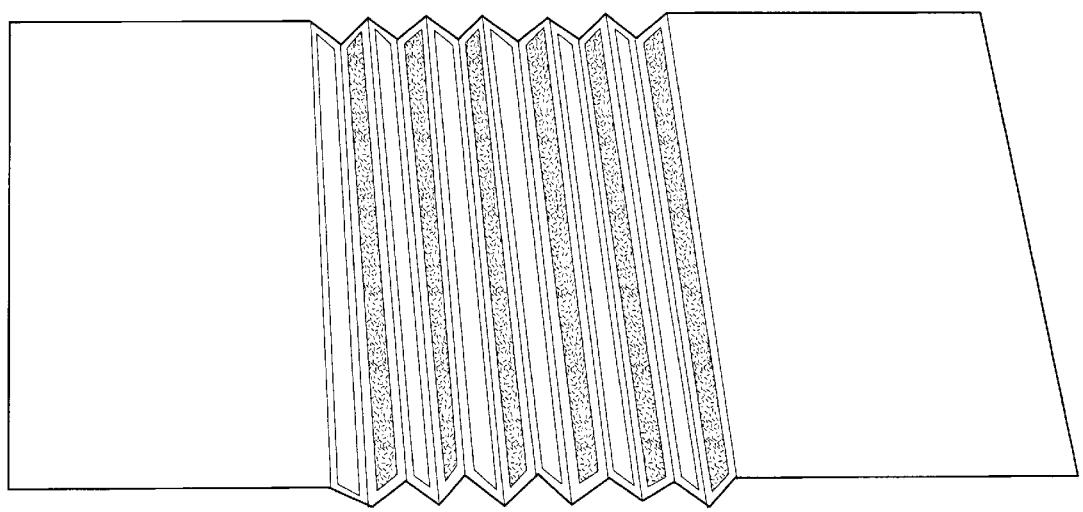
FIG. 28B: is an isometric view of the binder of FIG. 28A, further illustrating the folding of the panels.

REFERRING TO FIG. 28B: Panels 266 are folded in a zig-zag pattern.

Figure 28C:
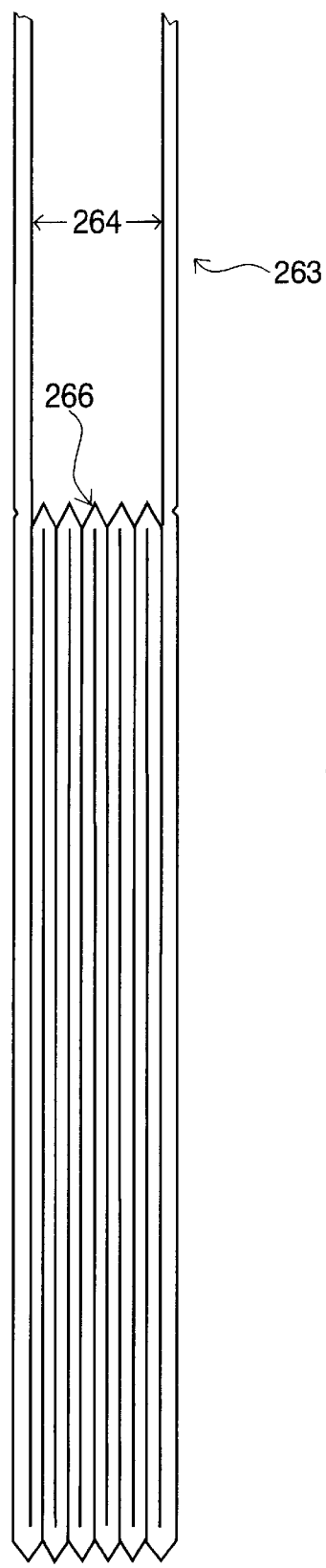
FIG. 28C: is a fragmentary side view on a larger scale of the binder of FIG. 28B.

REFERRING TO FIG. 28C: This is a fragmentary side view on a larger scale of assembly 263 illustrating the binder closed and showing all the panels 266 in contact, and between covers 264, remaining unattached due to the action of the adhesive inhibitor layers, establishing thereby the configuration of the binder before its use.

Figure 28D:
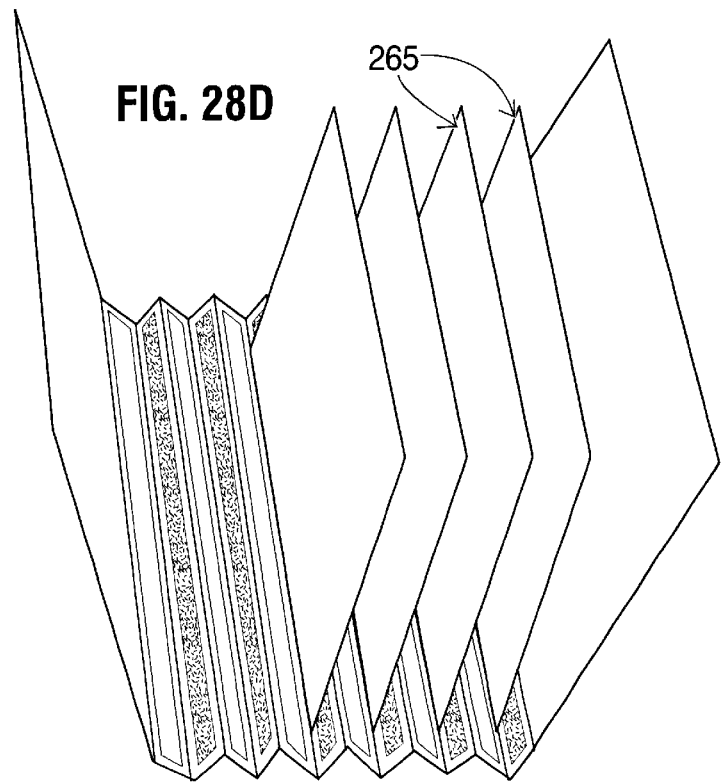
FIG. 28D: is a perspective view of the binder of FIG. 28C, further illustrating the positioning of articles for binding.

REFERRING TO FIG. 28D: Articles 265 to be bound are placed between adhesive layers and adhesive inhibitor layers for attachment thereto.

Figure 28E:
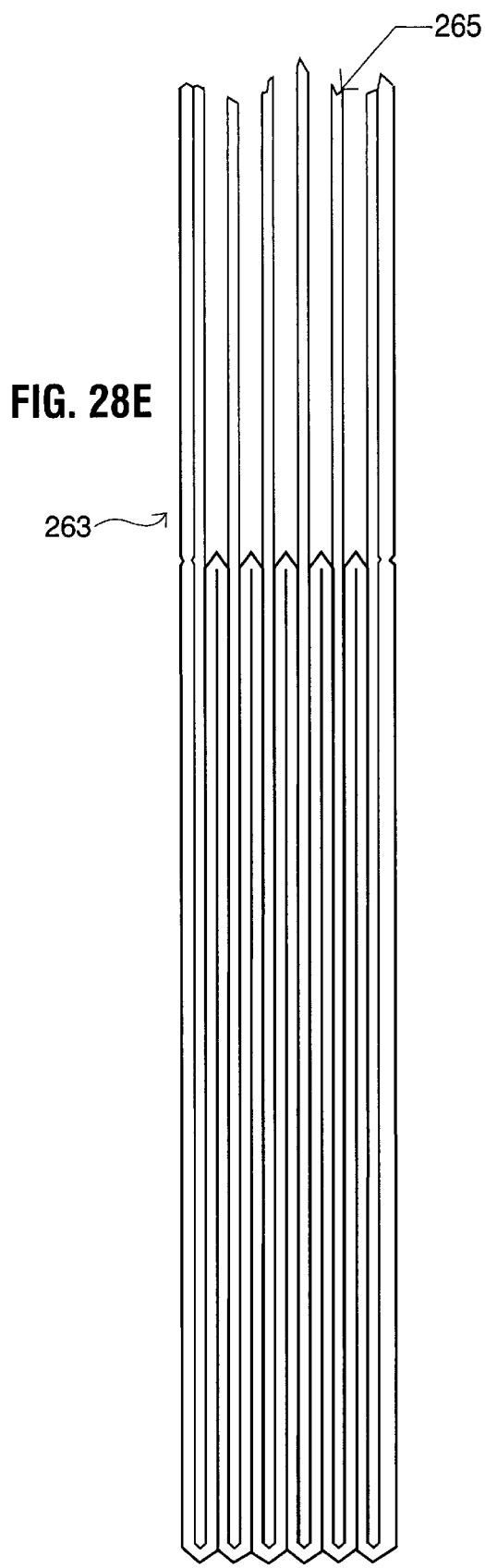
FIG. 28E: is a fragmentary side view on a larger scale of the binder of FIG. 28D, further illustrating articles positioned thereto, and the binder fully closed.

REFERRING TO FIG. 28E: This is a fragmentary side view on a larger scale of assembly 263. Articles 265 are bound, and binder is Hosed.

12th Embodiment Example

Figure 29:
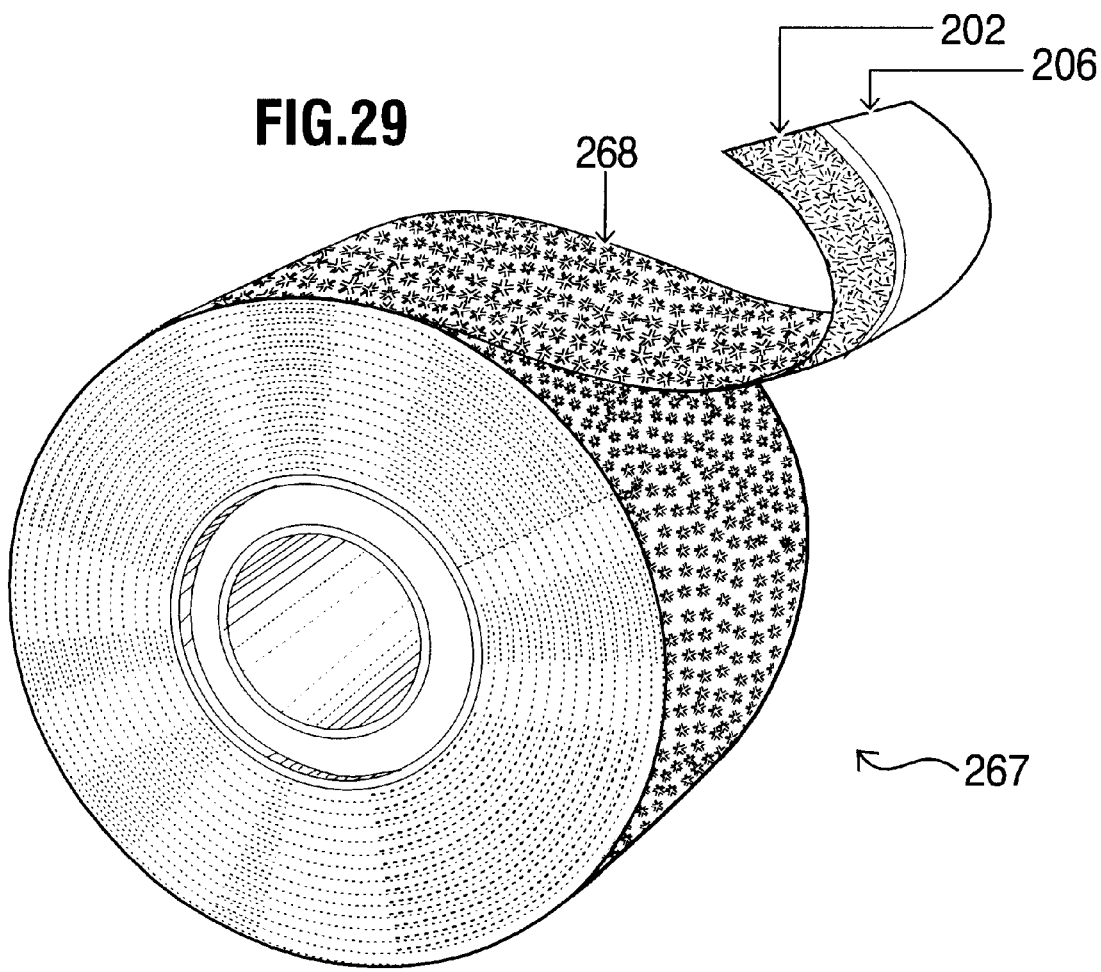
FIG. 29: is a perspective view of a roll of tape, illustrating the layers used.

FIG. 29 illustrates a means to customize some features of this invention, and their discretionary application to different articles and different uses.

REFERRING TO FIG. 29: A roll of tape 267 is coated with layers of adhesive 202 and layers of adhesive inhibitor 206 on one side, and the opposite side is totally coated with an adhesive layer 268. In a discretionary manner, sections of the tape are cut and adhered to different articles or different parts of one article so layers 202 and 206 are exposed and arranged in an inverse position, so the adhesive layers of one contacts the adhesive inhibitor layer of another and vice versa preventing their attachment before it is desired. The two sections are connected by positioning one or more articles or one or more parts of the same article free of adhesive inhibitor between them when connection is desired.

13th Embodiment Example

FIG. 30A through FIG. 30E inclusive illustrate in a progressive manner the application of this invention to produce a sign or bill holder.

Figure 30A:
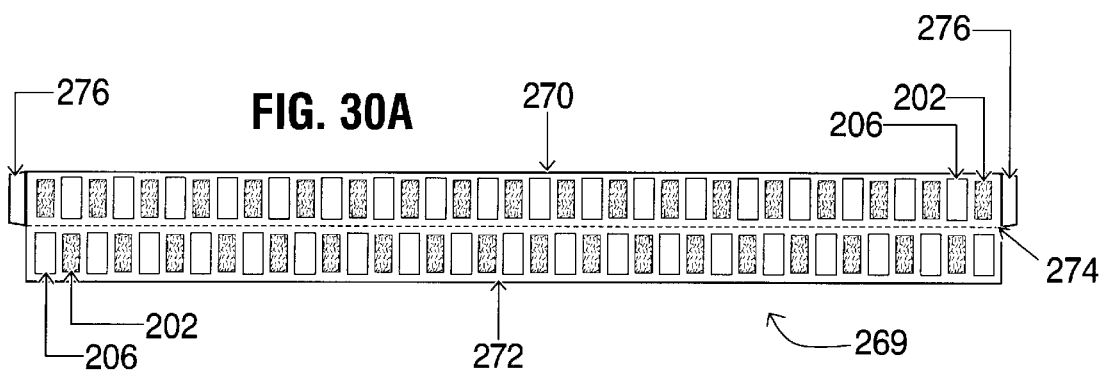
FIG. 30A: is a plan view of a piece of sheet material, illustrating the layers used.

REFERRING TO FIG. 30A: A sheet material is cut into a shape to produce assembly 269 with panel 270 and panel 272, having each panel a sequence of adhesive layers 202 alternated by adhesive inhibitor layers 206, dividing the two panels a score line 274 and at the ends of panel 270, flaps 276.

Figure 30B:
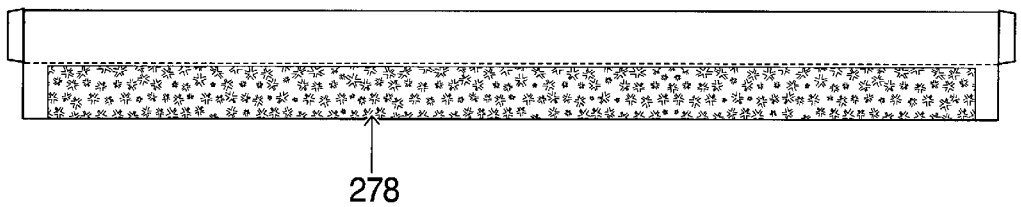
FIG. 30B: is a plan reverse view of the sheet material of FIG. 30A, further illustrating a layer of adhesive.

REFERRING TO FIG. 30B: A coating of adhesive 278 is applied to the back of panel 272.

Figure 30C:
FIG. 30C: is a plan view of the sheet material of FIG. 30B, further illustrating the configuration after an assembly is defined and before its use.

REFERRING TO FIG. 30C: Flaps 276 are folded towards the back of panel 272, closing the assembly. Panels 270 and 272 remain unattached due to the action of the adhesive inhibitors.

Figure 30D:
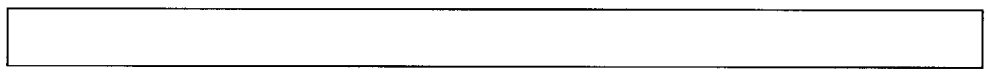
FIG. 30D: is a plan front view of the assembly of FIG. 30C.

REFERRING TO FIG. 30D: Assembly is in front view, showing its configuration when not in use.

Figure 30E:
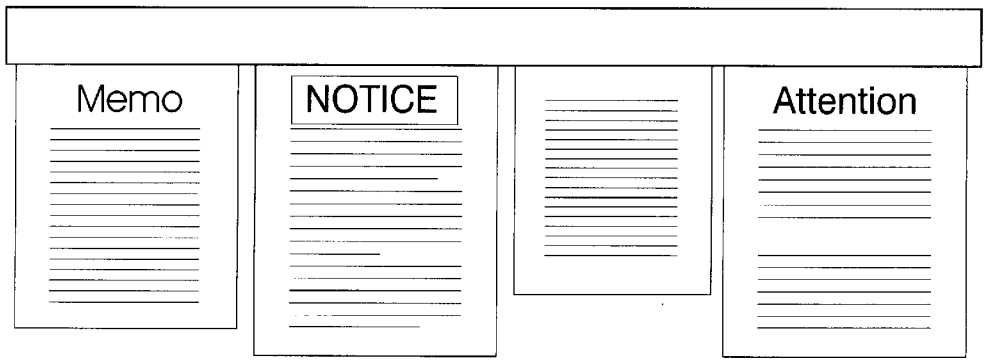
FIG. 30E: is a plan front view of the assembly of FIG. 30D, further illustrating signs posted.

REFERRING TO FIG. 30E: Signs and bills are posted by inserting them between the two panels, attaching to the layers of adhesive.

14th Embodiment Example

FIG. 31A through FIG. 31G inclusive illustrate in a progressive manner the application of this invention to build a three panel self contained form or self sealing form, for feeding into laser printers and other non continuous printers.

REFERRING TO FIG. 31A: A previously die or otherwise cut sheet material 279 has score lines 280 separating the body 282 from flaps 284. Another score line 286 separates the body from flap 288.

REFERRING TO FIG. 31B: Adhesive layers 202, and lower strength adhesive layers 204 are applied to the flaps. Adhesive inhibitor layers 206 are applied to the body. Score lines 290 are applied to body.

REFERRING TO FIG. 31C: Flaps are folded towards the body, being temporarily connected by the lower strength adhesive coatings, while other areas remain unattached due to the effect of adhesive inhibitor layers on body, enabling the form to be fed through a printer.

REFERRING TO FIG. 31D: Form is printed so a private message is on first two panels, while addressing information is printed on third panel.

REFERRING TO FIG. 31E: Flaps are unfolded.

REFERRING TO FIG. 31F: Panels are folded in its final pattern, so private message is covered and addressing information is visible and evident.

REFERRING TO FIG. 31G: Flaps are folded attaching to third panel, to seal the form.

An alternate three panel self contained form of this 14th embodiment is obtained by omitting the adhesive inhibitor layers 206 and using a dry adhesive substance as the adhesive layers 202, that is activated by its moistening, prior to permanently sealing the form.

Also, in this and all subsequent self sealing form embodiments, adhesive layers 202 can be in an inverse position with respect to adhesive inhibitor layers 206, and can also be in an intertwined or alternated arrangement.

15th Embodiment Example

FIG. 32A through FIG. 32D inclusive illustrate in a progressive manner the application of this invention to build a two panel self contained form or self sealing form for feeding into laser printers and other non-continuous printers.

Figure 32A:
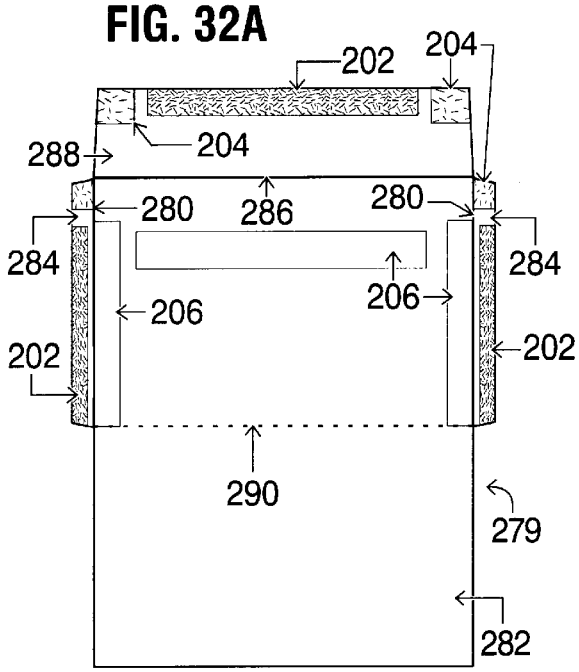
FIG. 32A: is a plan view of a sheet material cut into a shape to produce a self contained form, illustrating the layers used.

REFERRING TO FIG. 32A: A previously die or otherwise cut sheet material 279 has score lines 280 separating the body 282 from flaps 284. Another score line 286 separates the body from flap 288. Adhesive layers 202 are applied to the flaps. Lower strength adhesive layers 204 are applied to the flaps. Adhesive inhibitor layers 206 are applied to the body. Score line 290 is applied to the body.

Figure 32B:
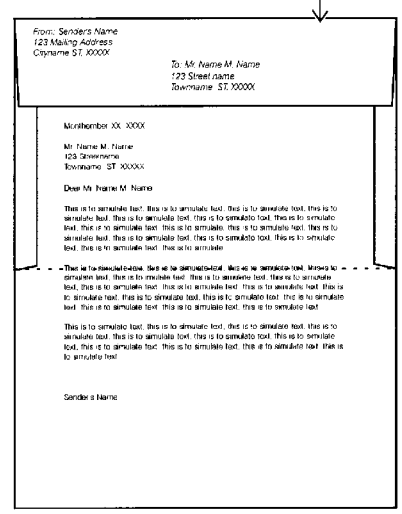
FIG. 32B: is a plan view of the sheet of FIG. 32A, defined as a form, further illustrating the form temporarily folded and printed.

REFERRING TO FIG. 32B: Flaps are folded towards the body for temporary fastening so form is fed through printer. Adhesive layers are in contact with adhesive inhibitor layers, remaining thereby temporarily inactive. Printing takes place so addressing information appears on back of flap 288, while private message appears on body.

Figure 32C:
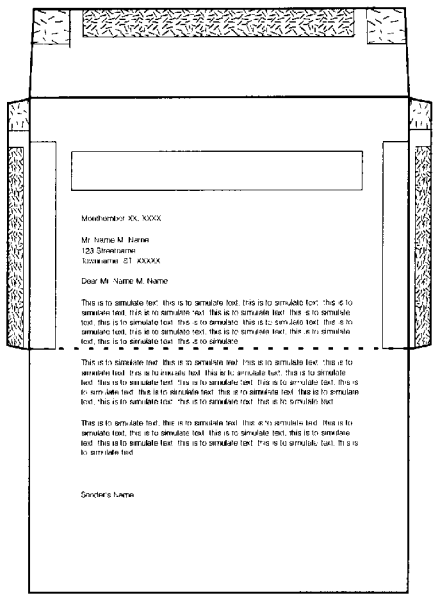
FIG. 32C: is a plan view of the form of FIG. 32B, further illustrating the flaps unfolded.

REFERRING TO FIG. 32C: Flaps are unfolded.

Figure 32D:
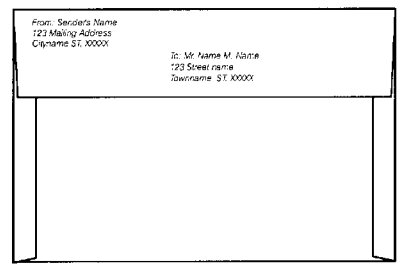
FIG. 32D: is a plan view of the form of FIG. 32C, further illustrating the form sealed.

REFERRING TO FIG. 32D: Form is folded in final pattern, adhesive layers of flaps attach to back of folded body, sealing thereby the form.

An alternate two panel self contained form of this 15th embodiment is obtained by omitting the adhesive inhibitor layers 206 and using a dry adhesive substance as the adhesive layers 202, that is activated by its moistening, prior to permanently sealing the form.

16th Embodiment Example

FIG. 33A through FIG. 33D inclusive, illustrate in a progressive manner the application of this invention to produce a two panel self contained form or self sealing form for feeding into laser printers and other non continues printers.

Figure 33A:
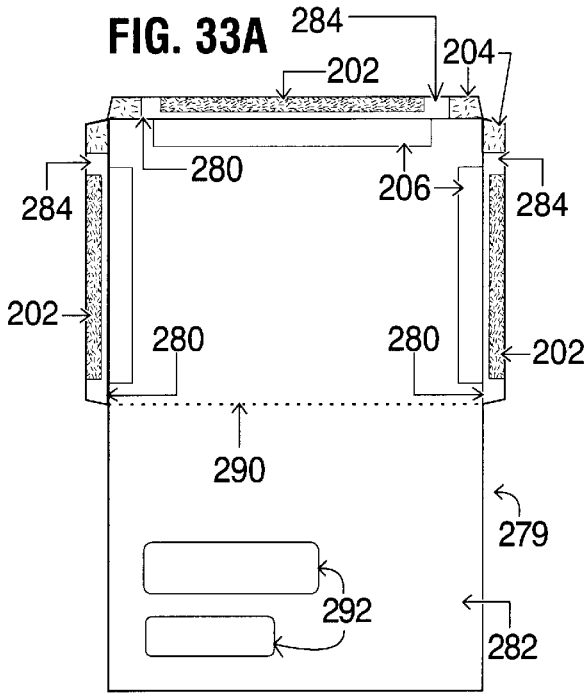
FIG. 33A: is a plan view of a sheet material [die] cut into a shape to produce a self contained form.

REFERRING TO FIG. 33A: A previously die or otherwise cut sheet material 279 has score lines 280 separating thereby the body 282 from flaps 284. Adhesive layers 202, and lower strength adhesive layers 204 are applied to the flaps. Adhesive inhibitor layers 206 are applied to the body. Score line 290 is applied to the body. Die or otherwise cut apertures are applied to the body to produce windows 292.

Figure 33B:
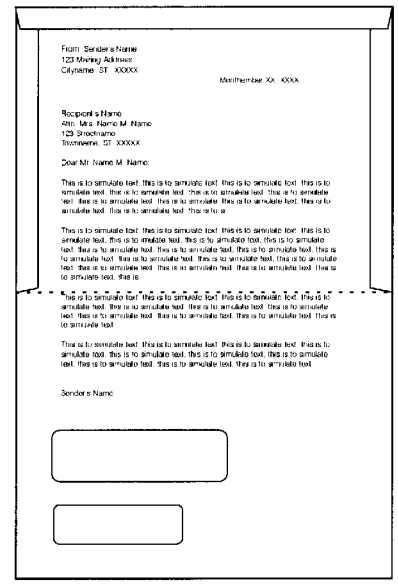
FIG. 33B: is a plan view of the sheet of FIG. 33A, defined as a form, further illustrating it after temporarily folded and after printing.

REFERRING TO FIG. 33B: Flaps are folded towards the body. Form is printed, so addressing information appears on top part of body, and private information appears under addressing information.

Figure 33C:
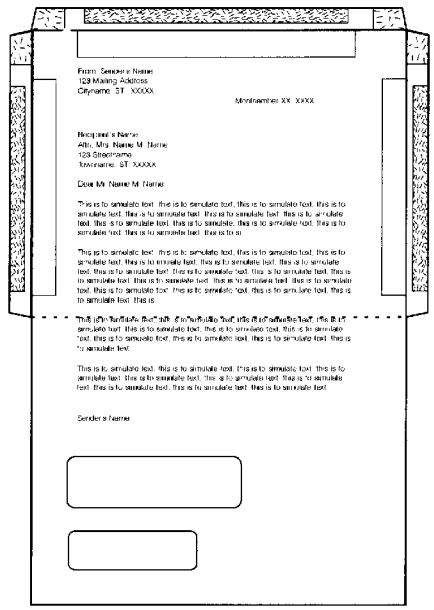
FIG. 33C: is a plan view of the form of FIG. 33B, further illustrating the flaps unfolded.

REFERRING TO FIG. 33C: Flaps are unfolded.

Figure 33D:
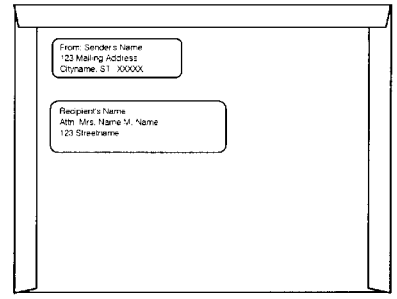
FIG. 33D: is a plan view of the form of FIG. 33C, further illustrating the form sealed.

REFERRING TO FIG. 33D: Form is folded, in its final pattern. Private information is covered. Addressing information shows through windows.

An alternate two panel self contained form of this 16th embodiment is obtained by omitting the adhesive inhibitor layers 206 and using a dry adhesive substance as the adhesive layers 202, that is activated by its moistening, prior to permanently sealing the form.

17th Embodiment Example

FIG. 34A through FIG. 34F inclusive illustrate in a progressive manner the application of this invention to produce a four panel self contained form or self sealing form for feeding into laser printers or other non continuous printers.

Figure 34A:
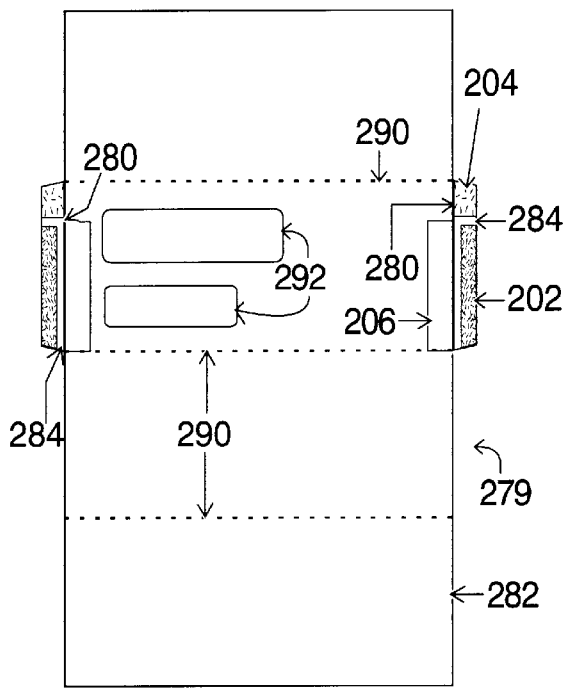
FIG. 34A: is a plan view of a sheet material cut into a shape to produce a self contained form, illustrating the layers used.

REFERRING TO FIG. 34A: A previously die or otherwise cut sheet material 279 has score lines 280 separating the body 282 from flaps 284. Adhesive layers 202, and lower strength adhesive layers 204 are applied to the flaps. Adhesive inhibitor layers 206 are applied to the body. Score lines 290 are applied to the body. Die or otherwise cut apertures are applied to the body to produce windows 292.

Figure 34B:
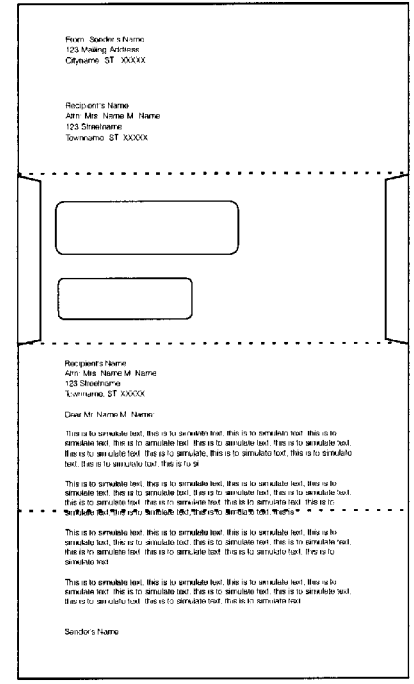
FIG. 34B: is a plan view of the sheet of FIG. 34A, defined as a form, further illustrating the form temporarily folded and printed.

REFERRING TO FIG. 34B: Flaps are folded towards the body, temporarily attaching to body. Form is printed. Addressing information is on first panel. Private information is on third and fourth panel.

Figure 34C:
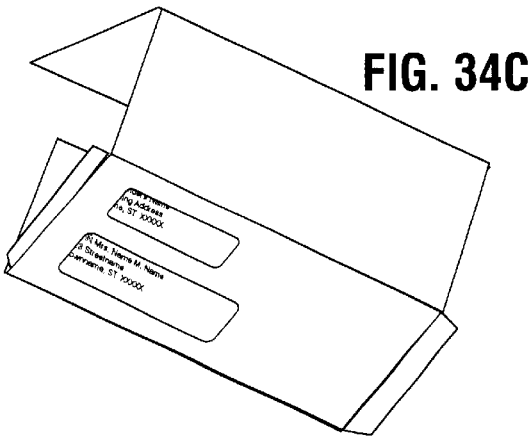
FIG. 34C: is a perspective view of the form of FIG. 34B, further illustrating the folding pattern of the form.

REFERRING TO FIG. 34C: The first panel is folded first towards the second panel, to show addressing information. Other panels are folded behind.

Figure 34D:
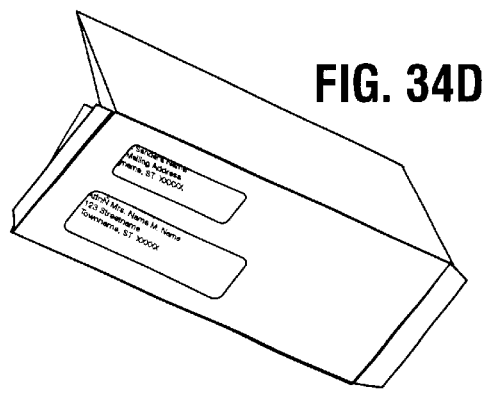
FIG. 34D: is a perspective view of the form of FIG. 34C, further illustrating a later stage of the folding.

REFERRING TO FIG. 34D: A later stage of folding is shown.

Figure 34E:
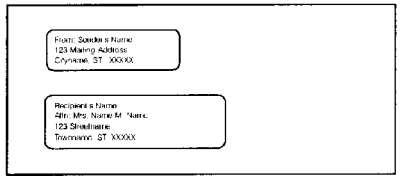
FIG. 34E: is a plan view of the form of FIG. 34D, further illustrating the form sealed.

REFERRING TO FIG. 34E: Form is folded and sealed in its final pattern. Addressing information shows through windows while private message remains covered.

Figure 34F:
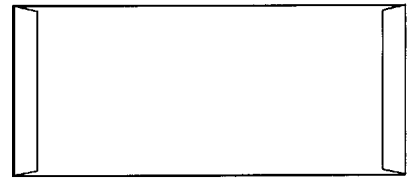
FIG. 34F: is a reverse plan view of the form of FIG. 34E.

REFERRING TO FIG. 34F: Rear view of the form after sealing.

An alternate four panel self contained form of this 17th embodiment is obtained by omitting the adhesive inhibitor layers 206 and using a dry adhesive substance as the adhesive layers 202, that is activated by its moistening, prior to permanently sealing the form.

18th Embodiment Example

FIG. 35A through FIG. 35E inclusive illustrate in a progressive manner the application of this invention to build another four panel self contained form or self sealing form for feeding into laser printers or other non-continuous printers.

Figure 35A:
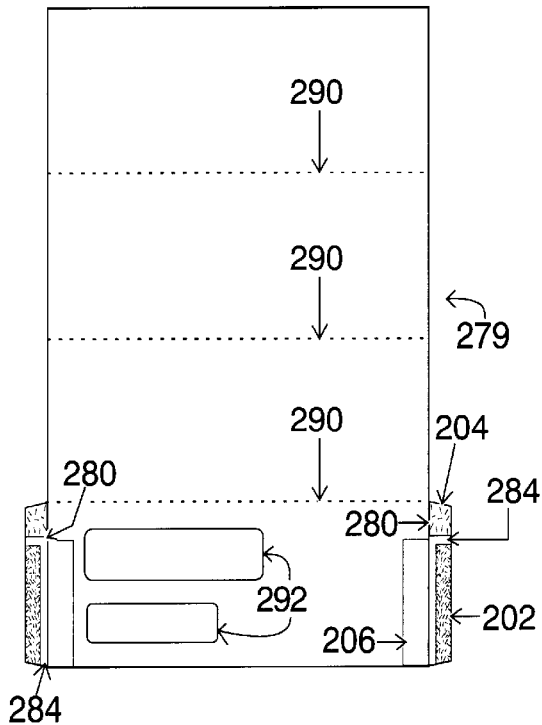
FIG. 35A: is a plan view of a sheet material cut into a shape to produce a self contained form, illustrating the layers used.

REFERRING TO FIG. 35A: A previously die or otherwise cut sheet material 279 has score lines 280 separating thereby the body 282 from flaps 284. Adhesive layers 202 and lower strength adhesive layers 204 are applied to the flaps. Adhesive inhibitor layers 206 are applied to the body. Score lines 290 are applied to the body. Die or otherwise cut apertures are applied to body to produce windows 292.

Figure 35B:
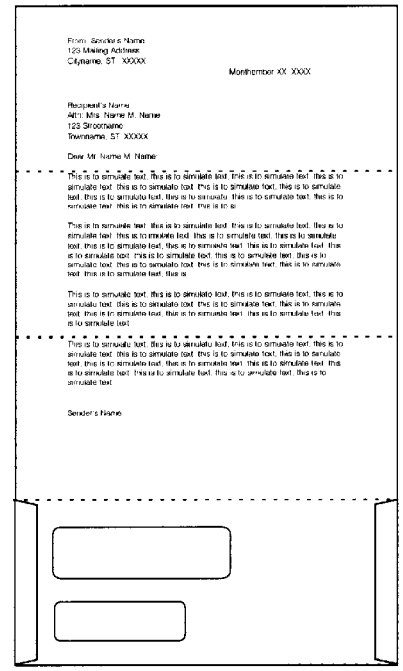
FIG. 35B: is a plan view of the sheet of FIG. 35A, defined as a form, further illustrating the form temporarily folded, and printed.

REFERRING TO FIG. 35B: Flaps are temporarily folded and attached to body. Form is printed. Addressing information appears on top area of body. Private information appears under addressing.

Figure 35C:
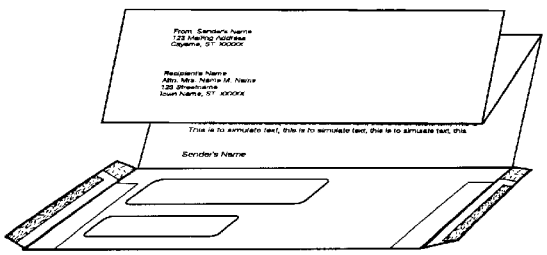
FIG. 35C: is a perspective view of the form of FIG. 35B, further illustrating the form being folded for its sealing.

REFERRING TO FIG. 35C: Form is folded so addressing information will show through windows.

Figure 35D:
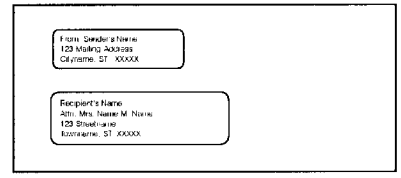
FIG. 35D: is a plan view of the form of FIG. 35C, further illustrating the form sealed.

REFERRING TO FIG. 35D: Form is sealed.

Figure 35E:
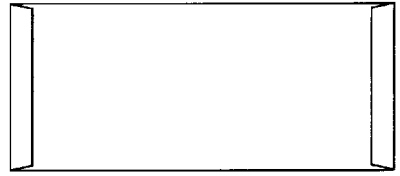
FIG. 35E: is a plan reverse view of the form of FIG. 35D.

REFERRING TO FIG. 35E: Rear view of the form after sealing. An alternate four panel self contained form of this 18th embodiment is obtained by omitting the adhesive inhibitor layers 206 and using a dry adhesive substance as the adhesive layers 202, that is activated by its moistening, prior to permanently sealing the form.

19th Embodiment Example

FIG. 36A through FIG. 36I inclusive illustrate in a progressive manner the application of this invention to build a three panel self contained form or self sealing form for feeding into continues and web printers.

REFERRING TO FIG. 36A: A fragmentary frontal view of a previously die or otherwise cut sheet material 279 has perforation lines 281 separating the form from other forms; score lines 280, separating thereby the body 282 from flaps 284 and 285. Score line 287 separates flap 285 into sections 289 and 291. Score lines 290 are applied to the body.

REFERRING TO FIG. 36B: Adhesive layers 202, and lower strength adhesive layers 204 are applied to the flaps. Adhesive inhibitor layers 206 are applied to the body.

REFERRING TO FIG. 36C: Flaps are folded towards the body, temporarily connected by the lower strength adhesive layers, so forms can be fed trough a printer.

REFERRING TO FIG. 36D: The continuous forms are printed, having a personalized private message on two first panels. And the addressing information on the third panel.

Figure 36F:
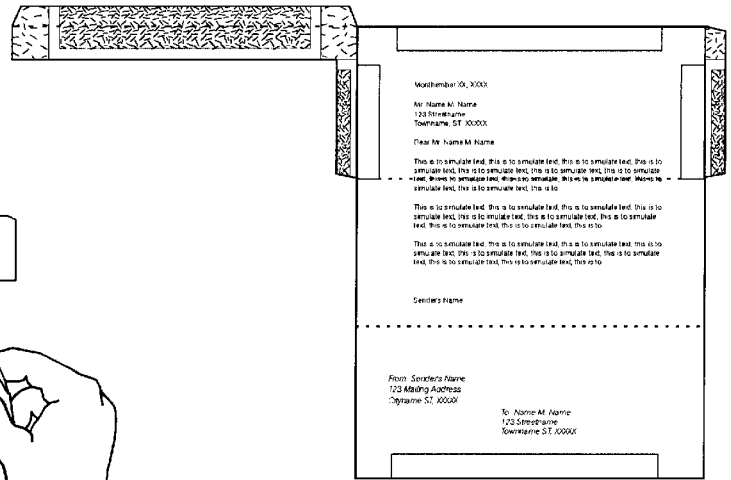
FIG. 36F: is a plan view of the individual form of FIG. 36E after detachment.
Figure 36E:
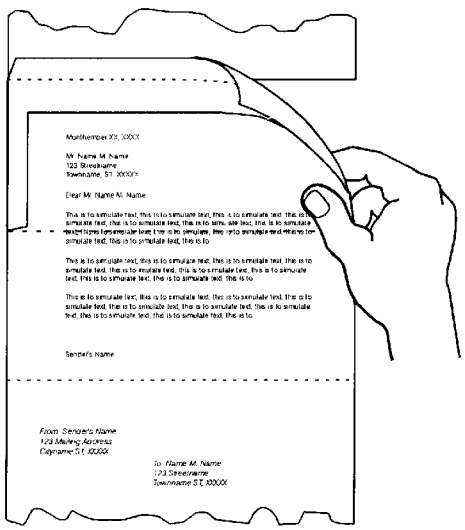
FIG. 36E: is a fragmentary perspective view of the form of FIG. 36D, further illustrating the detachment of an individual form.

REFERRING TO FIG. 36E: A form is being detached from the continues sheet material.

REFERRING TO FIG. 36F: The flaps are unfolded from individual form.

Figure 36H:
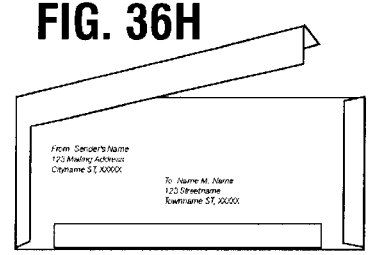
FIG. 36H: is a perspective view of the same form of FIG. 36G, further illustrating a later stage of folding.
Figure 36G:
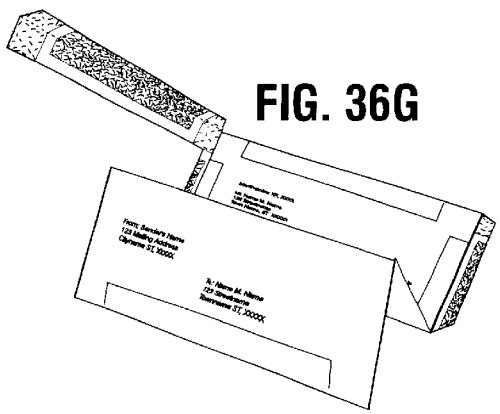
FIG. 36G: is a perspective view of the form of FIG. 36F being folded for sealing.

REFERRING TO FIG. 36G: The form is folded in final pattern, so private message is covered and addressing information remains visible and evident.

REFERRING TO FIG. 36H: A later stage of folding and sealing the form.

Figure 36I:
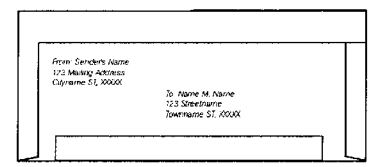
FIG. 36I: is a plan view of the same form of FIG. 36H, further illustrating the form sealed.

REFERRING TO FIG. 36I: The form is sealed and ready for distribution.

An alternate three panel self contained form of this 19th embodiment is obtained by omitting the adhesive inhibitor layers 206 and using a dry adhesive substance as the adhesive layers 202, that is activated by its moistening, prior to permanently sealing the form.

20th Embodiment Example

FIG. 37A through FIG. 37D inclusive illustrate in a progressive manner the application of this invention to produce a self contained form or self sealing form for tractor or pin fed continues printers, following the steps of the 19th embodiment example and further including additions to enable the form to be fed through such type of printers.

Figure 37A:
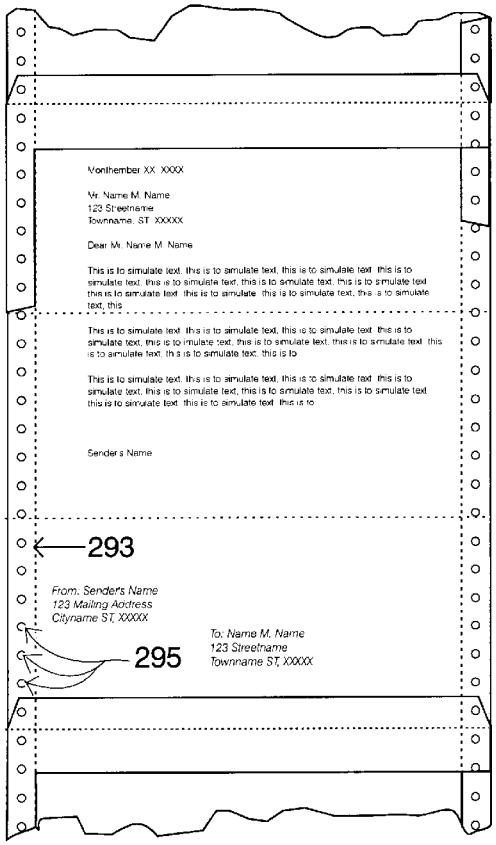
FIG. 37A: is a fragmentary plan view of a continuous form assembly.

REFERRING TO FIG. 37A: A fragmentary view of a previously die or otherwise cut sheet material having the flaps folded, and the forms already printed. Having discretionary perforation lines 293. for discretionary detachment by recipient of form; and sequential circular die or otherwise cut apertures 295, sized and spaced apart as per established industry standards for use of the form with tractor or pin fed continuous printers.

Figure 37B:
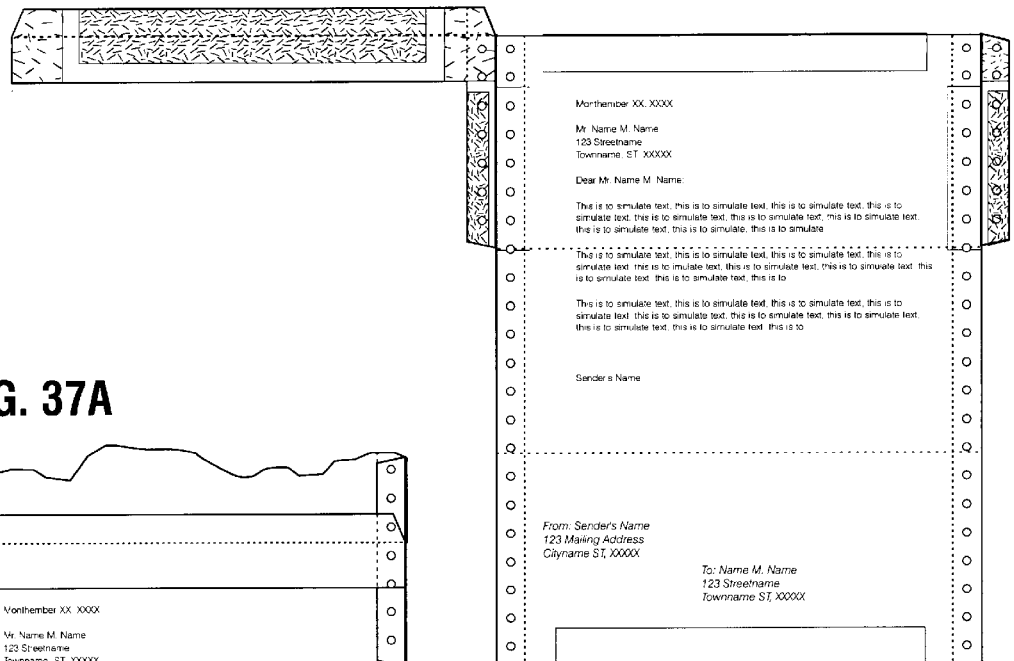
FIG. 37B: is a plan view of an individual form detached from the assembly of FIG. 37A.

REFERRING TO FIG. 37B: A form is detached from continuous sheet. Flaps are unfolded.

Figure 37C:
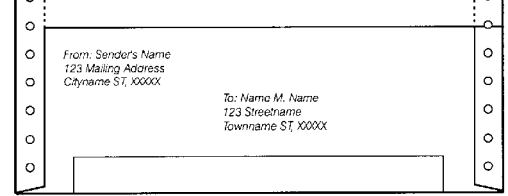
FIG. 37C: is a plan view of the form of FIG. 37B, further illustrating the form sealed.

REFERRING TO FIG. 37C: Form is folded and sealed in its final pattern. Private message is covered. Addressing information is visible and evident.

Figure 37D:
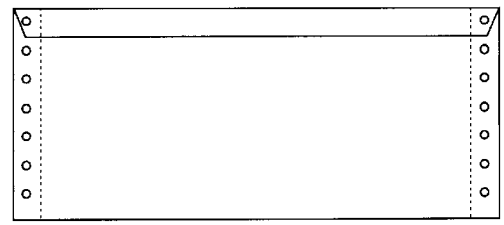
FIG. 37D: is a plan reverse view of the same form of FIG. 37C.

REFERRING TO FIG. 37D: Rear view of the sealed form.

An alternate self contained form of this 20th embodiment is obtained by omitting the adhesive inhibitor layers 206 and using a dry adhesive substance as the adhesive layers 202, that is activated by its moistening, prior to permanently sealing the form.

21st Embodiment Example

FIG. 38A through FIG. 38F Inclusive illustrate in a progressive manner the application of this invention to produce another four panel self contained form or self sealing form for feeding into web and continuous printers.

REFERRING TO FIG. 38A: A fragmentary frontal view of a previously die or otherwise cut sheet material 279 has perforation lines 281 separating a form from other forms; score lines 280, separating the body 282 from flaps 284. Score lines 290 are applied to the body. Die or otherwise cut apertures are applied to the body to produce windows 292.

REFERRING TO FIG. 38B: Flaps are temporarily folded. Form is printed. Addressing information appears on top of body. Personalized private message is under addressing.

REFERRING TO FIG. 38C: Flaps are unfolded.

REFERRING TO FIG. 38D: Form is being folded in final pattern, so addressing information will show through the windows and private message remains covered.

REFERRING TO FIG. 38E: Form is folded and sealed in its final pattern.

REFERRING TO FIG. 38F: Rear view of sealed form.

An alternate self contained form of this 21st embodiment for web and continuous printers is obtained by omitting the adhesive inhibitor layers 206 and using a dry adhesive substance as the adhesive layers 202, that is activated by its moistening, prior to permanently sealing the form.

22nd Embodiment Example

FIG. 39A through FIG. 39E inclusive illustrate in a progressive manner the application of this invention following the steps of the 21st embodiment example, further including additions to produce a self contained form or self sealing for tractor fed continuous printers.

REFERRING TO FIG. 39A: A fragmentary view of a previously die or otherwise cut sheet material having the flaps temporarily folded, and the forms already printed. Having discretionary perforation lines 293 for discretionary detachment by the recipient of the form; and sequential die or otherwise cut apertures 295, sized and spaced apart according to established industry standards for tractor or pin fed printers.

REFERRING TO FIG. 39B: Form is detached from continuous sheet. Flaps are unfolded.

REFERRING TO FIG. 39C: Form is folded in its final pattern, so address will show through windows and private message remains covered.

REFERRING TO FIG. 39D: Form is folded and sealed in its final pattern.

REFERRING TO FIG. 39E: Rear view of sealed form.

23rd Embodiment Example

FIG. 40A through FIG. 40J inclusive illustrate in a progressive manner the application of this invention to produce a self sealing container, such as an envelope making unnecessary the moistening of dry adhesive, or the affixing and subsequent removal of pressure sensitive adhesive protective strips.

REFERRING TO FIG. 40A: A sheet material 293 is cut into a shape. Score lines 294, 296 and 298 are applied to define sections 300, 302, 304 and 306. Score lines 308 are applied to define flaps 310. An adhesive layer 202 is applied. An adhesive inhibitor layer 206 is applied. Sections 300 and 302 constitute the front wall of the envelope, and sections 304 and 306 constitute the back wall of the envelope.

REFERRING TO FIG. 40B: Flaps 310 are folded towards section 304 and layers of glue 311 used to assemble the envelope are shown.

REFERRING TO FIG. 40C: Sections 300 and 302 are folded towards section 304 and adhering to the layers of glue on flaps, defining thereby the envelope.

REFERRING TO FIG. 40D: Section 300 is folded towards section 302.

REFERRING TO FIG. 40E: Section 306 is folded towards section 304.

REFERRING TO FIG. 40F: Sections 300 and 306 appear parallel to each other establishing the configuration of the envelope before its use. Adhesive layer on section 306 connects in a removable manner to adhesive inhibitor layer on section 304.

REFERRING TO FIG. 40G: It shows the first step of sealing the envelope. Section 300 is first folded towards section 304.

REFERRING TO FIG. 40H: Section 300 rests against section 304. Section 306 is then folded towards section 300.

REFERRING TO FIG. 40I: It shows a more advanced stage of the folding of section 306.

REFERRING TO FIG. 40J: It shows the envelope fully sealed.

24th Embodiment Example

FIG. 41A through FIG. 41E inclusive illustrate in a progressive manner the application of this invention to produce a self mounting mat frame.

REFERRING TO FIG. 41A: A Sheet material is die or otherwise cut to produce a mat frame 313. A score line 314 defines sections 316 and 318. An oval opening 320 was obtained from said cut. Facing layers of adhesive 202 and adhesive inhibitor 206 are applied.

REFERRING TO FIG. 41B: It shows a plan view of a photograph 321.

REFERRING TO FIG. 41C: The mat frame 313 is being folded, showing the configuration before its use. Sections 316 and 318 are removably attached, due to the action of the adhesive inhibitor layers.

REFERRING TO FIG. 41D: The photograph was mounted against adhesive layers on section 316. Section 318 is folded showing the photograph through the oval opening.

REFERRING TO FIG. 41E: The mounting is complete and photograph is shown through the oval opening.

25th Embodiment Example

FIG. 42A through FIG. 42D inclusive, illustrate in a progressive manner a different way to produce the self sealing wrap of 6th EMBODIMENT EXAMPLE, where the adhesive inhibitor layers permit a removable fastening, and no lower strength fasteners are necessary for temporary fastening.

REFERRING TO FIG. 42A: A piece of a sheet material 233 is divided into sections 238 and 240 by score line 242. A layer of adhesive 202 and a layer of adhesive inhibitor 206 are applied.

REFERRING TO FIG. 42B: Section 238 is folded towards section 240, connecting temporarily to each other by the removable fastening permitted by the adhesive inhibitor.

REFERRING TO FIG. 42C: Sections 238 and 240 are separated and sheet material is being rolled.

REFERRING TO FIG. 42D: Section 238 is connected to the back of section 240 to seal wrap material.

26th Embodiment Example

FIG. 43A through FIG. 43G inclusive illustrate in a progressive manner a different version of the affixing of a shipment card of the 7th EMBODIMENT EXAMPLE, where the adhesive inhibitor layers permit a removable fastening, and no lower strength fasteners are necessary for temporary fastening.

REFERRING TO FIG. 43A: A shipment or mailing receipt card 243 is divided into section 244 and sections 246, by perforation lines 248. Layers of adhesive 202 are applied to sections 246. Layers of adhesive inhibitor 206 are applied to section 244.

REFERRING TO FIG. 43B: Reverse side of card 243 is shown.

REFERRING TO FIG. 43C: Sections 246 are folded towards section 244, connecting temporarily to each other by the removable fastening permitted by the adhesive inhibitor.

REFERRING TO FIG. 43D: Reverse side of the card is illustrated, with sections 246 not visible due to their folding towards section 244.

REFERRING TO FIG. 43E: The receipt card is being affixed to an envelope 245.

REFERRING TO FIG. 43F: Section 244 of the receipt card is being detached from the envelope by perforation lines.

REFERRING TO FIG. 43G: The card is fully detached from the envelope.

27th Embodiment Example

FIG. 44A through FIG. 44G inclusive illustrate in a progressive manner a variation of the three panel self contained form of 14th EMBODIMENT EXAMPLE, where the adhesive inhibitor layers permit a removable fastening, and no lower strength fasteners are necessary for temporary fastening.

REFERRING TO FIG. 44A: A previously die or otherwise cut sheet material 279 has score lines 280 separating the body 282 from flaps 284, another score line 286 separates the body from flap 288.

REFERRING TO FIG. 44B: Adhesive layers 202 are applied to the flaps. An adhesive inhibitor layer 206 is applied to the body. Score lines 290 are applied to the body.

REFERRING TO FIG. 44C: Flaps are folded towards the body, temporarily connecting to one another by the removable fastening permitted by the adhesive inhibitor.

REFERRING TO FIG. 44D: Form is printed so a private message is printed on first two panels, while addressing information is printed on third panel.

REFERRING TO FIG. 44E: Flaps are unfolded.

REFERRING TO FIG. 44F: Panels are folded in final pattern, so private message is covered and addressing information is visible and evident.

REFERRING TO FIG. 44G: Flaps are folded attaching to third panel, to seal the form.

28th Embodiment Example

FIG. 45A through FIG. 45E inclusive illustrate in a progressive manner the application of this invention to produce a self sealing container, such as an envelope, making unnecessary the moistening of dry adhesive coatings or the affixing and subsequent removal of adhesive protective liners.

REFERRING TO FIG. 45A: An envelope 323 has a section 324, acting as its front wall; score lines 326 and 328 that produce sections 330 and 332.

REFERRING TO FIG. 45B: A layer of adhesive 202 is applied. A layer of adhesive inhibitor 206 is applied.

REFERRING TO FIG. 45C: Section 332 is folded towards section 330, as the first step to define the configuration of the envelope before its use. Sections 332 and 330 are removably connected by the action of the adhesive inhibitor.

REFERRING TO FIG. 45D: Sections 332 and 330 folded as one, are then folded towards section 324, establishing the configuration of the envelope before its use.

REFERRING TO FIG. 45E: Section 332 is unfolded and pressed against section 324 sealing the envelope.

29th Embodiment Example

FIG. 46A through FIG. 46G inclusive illustrate in a progressive manner the application of this invention to produce a forms carrier for a tractor or pin type of printer.

REFERRING TO FIG. 46A: A continuous sheet 333 has sequential openings 334 to enable traction into printer. Perforation lines 336 define parameters of individual rectangular panels 338. Die or otherwise cut lines 340 produce flaps 342 that remain connected to the sheet by score lines 344.

REFERRING TO FIG. 46B: Layers of adhesive 202 are applied. Layers of adhesive inhibitor 206 are applied.

REFERRING TO FIG. 46C: It shows the configuration of the continuos assembly when not in use. The flaps 342 are folded, so their reverse side is the one that is visible now, and they are removably fastened to the adhesive inhibitor layers.

REFERRING TO FIG. 46D: It shows the first step of the mounting and securing of the cards 341.

REFERRING TO FIG. 46E: It shows the cards secured to the assembly and ready for feeding into the printer.

REFERRING TO FIG. 46F: It shows the cards secured to the assembly after printing has taken place.

REFERRING TO FIG. 46G: It shows a printed card after detachment from the continuous assembly.

30th Embodiment Example

FIG. 47A through FIG. 47E inclusive illustrate in a progressive manner a different version of the four panel self contained personalized form of the 22nd EMBODIMENT EXAMPLE, where the adhesive inhibitor layers permit a removable fastening, and no lower strength fasteners are necessary for temporary fastening.

REFERRING TO FIG. 47A: A fragmentary view of a previously die or otherwise cut sheet material 279 having the flaps 284 already folded, and the forms already printed. Having windows 292. Having discretionary perforation lines 293, for discretionary detachment by the recipient of the form, and sequential openings 295 for traction into the printer.

REFERRING TO FIG. 47B: A form is detached from continuous assembly. Flaps are unfolded.

REFERRING TO FIG. 47C: The form is being folded in its final pattern, so address will show through windows and private message will remain covered.

REFERRING TO FIG. 47D: Form is folded and sealed in final pattern.

REFERRING TO FIG. 47E: It shows a rear view of the sealed form.

31st Embodiment Example

FIG. 48A through FIG. 48D inclusive illustrate in a progressive manner the application of this invention to produce a variation of the forms carrier of the 9th EMBODIMENT EXAMPLE, where the adhesive inhibitor layer permits a removable fastening, making unnecessary the lower strength fasteners for temporary fastening.

REFERRING TO FIG. 48A: The carrier 255 is produced by first having a piece of a sheet material divided by score line 256 into sections 258 and 260. Additionally, optional indicia 257 is printed to assist in positioning of the materials to be fed.

REFERRING TO FIG. 48B: An adhesive layer 202 is applied. An adhesive inhibitor layer 206 is applied.

REFERRING TO FIG. 48C: A personal size blank check 259A is positioned and fastened to the forms carrier.

REFERRING TO FIG. 48D: Section 258 is folded towards the check. Printing has taken place.

32nd Embodiment Example

FIG. 49A through FIG. 49D inclusive illustrate in a progressive manner the application of this invention to produce a self sealing container, such as a shipping tube.

REFERRING TO FIG. 49A: it shows in plan view the top part 334 and bottom part 336 of a container; and layers of adhesive 202 and layers of adhesive inhibitor 206.

REFERRING TO FIG. 49B: it illustrates the rotation of the top with respect to the bottom, that is necessary so the adhesive layers of the bottom face the adhesive inhibitor layers of the top when in direct contact, permitting thereby the temporary fastening of the container, establishing the configuration before its use.

REFERRING TO FIG. 49C: it shows the rotation of the top with respect to the bottom that is necessary so the adhesive layers of the bottom face blank areas of the top when in direct contact, permitting thereby the permanent sealing of the container.

REFERRING TO FIG. 49D: The top and bottom are connected to seal the container. It is to be understood that the scope of this invention is in no way restricted to the previous embodiment examples. and that many variations and permutations are possible when applying the principles described.

I claim:

1. A method to fasten a first article to a second article selected from the group consisting of: a money holding greeting card and a forms carrier, comprising the steps of:
    a) providing at least two surface sections to said second article,
    b) providing at least one fastener area to at least one of said two surface sections,
    c) providing a predetermined level of fastening strength to said at least one fastener area to achieve a predetermined fastening task,
    d) providing at least one fastener inhibitor area to at least one of said two surface sections,
    e) providing a predetermined level of fastening inhibiting strength to said at least one fastener inhibitor area, to achieve a predetermined fastening inhibiting task,
    f) arranging said at least one fastener area and said at least one fastener inhibitor area so when one of said at least two surface sections is in contact with another one of said at least two surface sections, said at least one fastener area faces said at least one fastener inhibitor area,
        whereby said at least two surface sections are prevented from permanently attaching to one another and said at least one fastener area is protected when fastening is not desired,
    g) positioning of said first article between said at least two surface sections,
    whereby said first article will be fastened to said at least one fastener area when fastening is desired.

2. The method of claim 1 wherein each of said at least two surface sections is one side of a sheet material, said at least one fastener area is an adhesive substance layer, and said at least one fastener inhibitor area is an adhesive inhibitor substance layer.

3. The method of claim 2 wherein said sheet material is paper, said adhesive substance is a pressure sensitive adhesive substance, and said adhesive inhibitor substance is a release coating.

4. A method to connect one surface to another surface of an article selected from the group consisting of: an envelope, a box, a shipping tube, and a self sealing form, comprising the steps of:
    a) providing at least one fastener area and at least one fastener inhibitor area to each one of said one surface and said another surface,
    b) arranging said at least one fastener area and said at least one fastener inhibitor area so when said one surface is in contact with said another surface, said at least one fastener area of said one surface faces said at least one fastener inhibitor area of said another surface, and said at least one fastener inhibitor area of said one surface faces said at least one fastener area of said another surface, whereby said at least one fastener area of said one surface and said at least one fastener area of said another surface are protected, and said one surface and said another surface are prevented from permanently attaching to one another when fastening is not desired, c) positioning of another portion of said article in contact with said one surface and said another surface so said another portion of said article attaches to said at least one fastener area of said one surface and to said at least one fastener area of said another surface, whereby said one surface and said another surface will be connected together.

5. The method of claim 4 wherein said one surface and said another surface are one side of a sheet material, said at least one fastener area of said one surface and said at least one fastener area of said another surface are adhesive substance layers, said at least one fastener inhibitor area of said one surface and said at least one fastener inhibitor area of said another surface are adhesive inhibitor substance layers.

6. The method of claim 5 wherein said sheet material is paper, said adhesive substance is a pressure sensitive adhesive substance, and said adhesive inhibitor substance is a release coating.

7. A method to temporarily fasten two surfaces prior to a more permanent fastening of said two surfaces, comprising the steps of:

a) providing at least one dry adhesive layer to at least one of said two surfaces, b) providing at least one low tack pressure sensitive adhesive layer to at least one of said two surfaces, c) arranging said at least one dry adhesive layer and said at least one low tack pressure sensitive adhesive layer so when said two surfaces contact one another, said at least one dry adhesive layer and said at least one low tack pressure sensitive adhesive layer face a blank area, whereby said two surfaces will be temporarily connected by the action of said low tack pressure sensitive adhesive layer, when permanent fastening is not desired, d) separation of said two surfaces, e) moistening of said dry adhesive layer, f) positioning of said two surfaces in contact to one another, whereby said two surfaces will be connected to one another in a more permanent manner.

8. The method of claim 7 wherein each of said two surfaces is one side of a sheet material, said dry adhesive is glue that is activated by moistening, and said low tack pressure sensitive adhesive is a lower strength adhesive substance.

9. The method of claim 7 wherein said method is used to fasten a surface section to another surface section.

10. The method of claim 9 wherein said surface section and said another surface sections are each one side of a sheet material, said dry adhesive is glue that is activated by moistening, and said low tack pressure sensitive adhesive is a lower strength adhesive substance.

11. The method of claim 7 wherein one of said two surfaces of step f) is bent so another section of said one of said two surfaces is in contact with the other surface.

12. A method to temporarily fasten two surface sections of an article selected from the group consisting of: a shipping tube, a money holding greeting card, a form carrier, a self sealing wrap, and a self sealing form, comprising the steps of:

a) providing at least one fastener area to at least one of said two surface sections, b) providing at least one fastener inhibitor area to at least one of said two surface sections, c) having said at least one fastener inhibitor area predetermined attributes to permit a removable fastening to said at least one fastener area, e) arranging said at least one fastener area and said at least one fastener inhibitor area so when one of said two surface sections is in contact with the other one of said two surface sections, said at least one fastener area faces said at least one fastener inhibitor area, g) positioning of said two surfaces in contact to one another, Whereby said two surfaces will be temporarily connected.

13. The method of claim 12 wherein each of said two surfaces is one side of a sheet material, said fastener is an adhesive substance and said fastener inhibitor is an adhesive inhibitor substance.

14. The method of claim 13 wherein said sheet material is paper, said adhesive substance is a pressure sensitive adhesive substance and said adhesive inhibitor substance is a release coating.

15. A method of producing a self sealing form, comprising the steps of:

a) providing affront side and a back side to said self sealing form, b) providing at least one fastener area to said front side, c) providing at least one fastener inhibitor area to said front side, d) providing a first bending sequence of said form so said at least one fastener area faces said at least one fastener inhibitor area,
whereby said at least one fastener area is protected and removably attached to said fastener inhibitor area before sealing is desired, e) providing an unbending sequence of said form, f) providing a second bending sequence of said form, so at least another portion of said self sealing form can be placed between said at least one fastener area and said at least one fastener inhibitor area, Whereby said form is sealed.

16. The method of claim 15 wherein said at least another portion of said second bending sequence is a single ply portion of said form.

17. The method of claim 15 wherein said at least another portion of said second bending sequence is a multiple ply portion of said form.

18. The method of claim 15 wherein said self sealing form is a part of a continuous detachable assembly of forms, simultaneously produced as per steps a)-f), and the subsequent detachment of said forms, whereby individual forms are obtained.

19. A method of producing a self sealing container; comprising:

a) providing a front wall to said container, b) providing at least one fastener area to said front wall, c) providing at least one fastener inhibitor area to said front wall, d) providing a flap to said container, e) providing an inner side and an outer side to said flap, f) providing at least one fastener area to said inner side, g) providing at least one fastener inhibitor area to said inner side, h) arranging said at least one fastener area and said at least one fastener inhibitor area of said inner side so when said flap is against said front wall, said at least one fastener area of said inner side faces said at least one fastener inhibitor area of said front wall, said at least one fastener inhibitor area of said inner side faces said at least one fastener area of said front wall; and a portion of said flap free of any fastener area or fastener inhibitor area on both, said inner and outer sides extends outwardly,
  whereby said at least one fastener area on said front wall, and said at least one fastener area on said inner side of said flap are protected and the container is prevented from permanent sealing,
i) bending said flap so said inner side of said portion of said flap free of any fastener area or any fastener inhibitor area connects to said at least one fastener area on said flap,
j) positioning of said bent flap against said front wall so said outer side of said portion of said flap free of any fastener area or any inhibitor area connects to said at least one fastener area of said front wall,
whereby said container is sealed.

20. The method of claim 19 wherein said fastener is an adhesive substance and said fastener inhibitor is an adhesive inhibitor substance.

21. The method of claim 20 wherein said adhesive substance is a pressure sensitive adhesive substance and said adhesive inhibitor substance is a release coating.

22. The method of claim 19 wherein said container is an envelope.

23. The method of claim 22 wherein said fastener is an adhesive substance and said fastener inhibitor is an adhesive inhibitor substance.

24. The method of claim 23 wherein said adhesive substance is a pressure sensitive adhesive substance and said adhesive inhibitor substance is a release coating.

25. The method of claim 19 wherein said container is a box.

26. The method of claim 25 wherein said fastener is an adhesive substance and said fastener inhibitor is an adhesive inhibitor substance.

27. The method of claim 26 wherein said adhesive substance is a pressure sensitive adhesive substance and said adhesive inhibitor substance is a release coating.

28. A method of closing a container, comprising the steps of:
  a) providing two surface sections, that when are fastened, close said container,
  b) providing at least one fastener area to each one of said two surface sections,
  c) providing at least one fastener inhibitor area to each one of said two surface sections,
  d) arranging said at least one fastener area of each surface section and said at least one fastener inhibitor area of each surface section, so when said two surface sections are in contact, said at least one fastener area of each two surface sections faces said at least one fastener inhibitor area of the other surface section,
    whereby said at least one fastener area of each surface section is protected and permanent fastening is prevented,
  e) positioning of an article between said two surface sections,
whereby said container is closed.

29. The method of claim 28 wherein said fastener is an adhesive substance and said fastener inhibitor is an adhesive inhibitor substance.

30. The method of claim 29 wherein said adhesive substance is a pressure sensitive adhesive substance and said adhesive inhibitor substance is a release coating.

31. The method of claim 28 wherein said container is an envelope.

32. The method of claim 31 wherein said fastener is an adhesive substance and said fastener inhibitor is an adhesive inhibitor substance.

33. The method of claim 32 wherein said adhesive substance is a pressure sensitive adhesive substance and said adhesive inhibitor substance is a release coating.

34. The method of claim 28 wherein said article is an integral part of said container.

35. The method of claim 34 wherein said fastener is an adhesive substance and said fastener inhibitor is an adhesive inhibitor substance.

36. The method of claim 35 wherein said adhesive substance is a pressure sensitive adhesive substance and said adhesive inhibitor substance is a release coating.

37. A method of producing a self sealing envelope, comprising the steps of:
  a) providing two walls to said envelope,
  b) providing a supplementary portion to one of said two walls,
  c) providing said supplementary portion with at least one layer of adhesive and at least one layer of adhesive inhibitor, arranged in such a manner that when said supplementary portion is folded, said at least one layer of adhesive faces said at least one layer of adhesive inhibitor,
  d) providing a flap to the other one of said two walls,
  e) positioning of said flap between said at least one layer of adhesive and said at least one layer-of adhesive inhibitor,
  f) whereby said envelope is sealed.

38. The method of claim 37 wherein said fastener is an adhesive substance and said fastener inhibitor is an adhesive inhibitor substance.

39. The method of claim 38 wherein said adhesive substance is a pressure sensitive adhesive substance and said adhesive inhibitor substance is a release coating.

40. A method of producing a self sealing form, comprising the steps of:
  a) providing a blank of a sheet material,
  b) providing at least one flap to said blank of a sheet material,
  c) providing at least one layer of pressure sensitive adhesive to said at least one flap,
  d) providing at least one layer of a release substance to said blank of a sheet material,
  e) providing a first bending of said at least one flap so said at least one layer of pressure sensitive adhesive temporarily fastens to said at least one layer of a release substance,
    whereby said pressure sensitive adhesive is protected from exposure when permanent fastening is not desired and indicia can be inscribed on said blank of a sheet material,
  f) unbending of said flap,
    whereby said pressure sensitive adhesive is exposed,
  g) positioning of another section of said blank of a sheet material between said at least one pressure sensitive adhesive layer and said at least one release substance layer prior to a second bending of said flap,
whereby said self sealing form is produced.

41. The method of claim 40 wherein said another section of step g) is a multiple ply.

42. The method of claim 40 wherein said blank is one of a continuous sequence of detachable blanks, that are treated as per steps b)-g) and that are subsequently detached to produce individual forms.

43. A method to produce and use a self sealing form, comprising the steps of:
   a) providing a sheet material having a body and at least one flap,
   b) providing at least one layer of adhesive and at least one layer of adhesive inhibitor to said sheet material, arranged in such a manner that when said at least one flap is bent, and in contact with said body, said at least one layer of adhesive fastens in a removable fashion to said at least one layer of adhesive inhibitor,
   c) unbending of said flap,
   d) positioning of another portion of said sheet material between said at least one layer of adhesive and said at least one layer of adhesive inhibitor,
   e) re-bending of said flap,
whereby said form is sealed.

44. The method of claim 43 wherein said form is suitable for feeding into a printing system.

45. The method of claim 43 wherein said form has pre-printed indicia.

46. The method of claim 45 wherein said form is suitable for feeding into a printing system.

47. A method to produce and seal a form, comprising the steps of:
   a) providing at least one fastener area to said form,
   b) providing at least one fastener inhibitor area to said form,
   c) providing a first bending sequence of said form so said at least one fastener area faces said at least one fastener inhibitor area,
      whereby said at least one fastener area is protected and removably attached to said fastener inhibitor area before sealing is desired,
   d) providing an unbending sequence of said form,
   e) providing a second bending sequence of said form, so at least another portion of said form can be placed between said at least one fastener area and said at least one fastener inhibitor area,
whereby said form can be sealed.

48. The method of claim 47 wherein said at least another portion of said second bending sequence is a single ply portion of said form.

49. The method of claim 47 wherein said at least another portion of said second bending sequence is a multiple ply portion of said form.

50. A method to seal a form, comprising the steps of:
   a) providing a form,
   b) providing at least one flap to said form,
   c) providing at least one layer of pressure sensitive adhesive to said at least one flap,
   d) providing at least one layer of a release substance to said form,
   e) a first bending of said flap so said at least one layer of pressure sensitive adhesive temporarily fastens to said at least one layer of a release substance,
      whereby said pressure sensitive adhesive is protected from exposure when permanent fastening is not desired,
   f) unbending of said flap,
      whereby said pressure sensitive adhesive is exposed,
   g) positioning of another section of said form between said at least one pressure sensitive adhesive layer and said at least one release substance layer prior to a second bending of said flap,
whereby said form is sealed.

51. The method of claim 50 wherein said another section is a multiple ply.

52. The method of claim 50 wherein said form is one of a continuous sequence of detachable forms, that are produced in the described sequence, and then detached, whereby individual forms are produced and sealed.

53. A method of sealing a form, comprising the steps of:
   a) providing a sheet material cut so it has a body and at least one flap,
   b) providing at least one layer of adhesive and at least one layer of adhesive inhibitor to said sheet material, arranged in such a manner that when said at least one flap is bent, said at least one layer of adhesive fastens in a removable fashion to said at least one layer of adhesive inhibitor,
   c) unbending of said flap so another portion of said sheet material is positioned between said at least one layer of adhesive and said at least one layer of adhesive inhibitor,
   d) re-bending of said flap,
whereby said form is sealed.

54. The method of claim 53 wherein said form has pre-printed indicia.

55. The method of claim 53 wherein said form is suitable for feeding into a printer.

56. A method to fasten a first article to a second article selected from the group consisting of: a container and a sign holder, comprising the steps of:
   a) providing two surface sections to said second article,
   b) providing at least one fastener area to each of said two surface sections,
   c) providing a predetermined level of fastening strength to said at least one fastener area of each of said two sections to achieve a predetermined fastening task,
   d) providing at least one fastener inhibitor area to each of said two surface sections,
   e) providing a predetermined level of fastening inhibiting strength to said at least one fastener inhibitor area, of each of said two sections to achieve a predetermined fastening inhibiting task,
   f) arranging said at least one fastener area of each of said two surface sections and said at least one fastener inhibitor area of each of said two surface sections so when one of said two surface sections is in contact with the other one of said two surface sections, said at least one fastener area of each of said two surface sections faces said at least one fastener inhibitor area of the other one of said two surface sections,
      whereby said two surface sections are prevented from permanently attaching to one another and said at least one fastener area of each of said two surface sections is protected when fastening is not desired,
   g) positioning of said first article between said two surface sections,
      whereby said first article will be fastened to said at least one fastener area of each of said two surface sections when fastening is desired.

57. The method of claim 56 wherein each of said at least two surface sections is one side of a sheet material, said at least one fastener area is an adhesive substance layer, and said at least one fastener inhibitor area is an adhesive inhibitor substance layer.

58. The method of claim 57 wherein said sheet material is paper, said adhesive substance is a pressure sensitive adhesive substance, and said adhesive inhibitor substance is a release-coating.

59. The method of claim 56 wherein said container is an envelope.

60. The method of claim 56 wherein said container is a box.

61. The method of claim 56 wherein said container is a shipping tube.

62. A method to temporarily fasten two paper sections, prior to a more permanent fastening of said two paper sections, comprising the steps of:
   a) providing at least one pressure sensitive adhesive area to at least one of said two paper sections,
   b) providing at least one release area to at least one of said two paper sections,
   c) providing at least one lower strength pressure sensitive adhesive area to at least one of said two paper sections,
   d) providing at least one blank area to at least one of said two paper sections,
   e) arranging said at least one pressure sensitive adhesive area and said at least one release area, so when one of said two paper sections is in contact with the other one of said two paper sections, said at least one-pressure sensitive adhesive area faces said at least one release area,
   f) arranging said at least one lower strength pressure sensitive adhesive area and said at least one blank area so when one of said two paper sections is in contact with the other one of said two paper sections, said at least one lower strength pressure sensitive adhesive area faces said at least one blank area,
   g) positioning of said two paper sections in contact to one another,
   whereby said two paper sections will be temporarily connected.

* * * * *